United States Patent
Park et al.

(10) Patent No.: US 11,582,080 B2
(45) Date of Patent: Feb. 14, 2023

(54) METHOD AND DEVICE FOR APPLYING OPTIMIZED PHASE ROTATION IN WLAN ENVIRONMENT INCLUDING WIRELESS DEVICES HAVING MUTUALLY DIFFERENT MAXIMUM TRANSMITTABLE RF BANDWIDTHS

(71) Applicant: LG ELECTRONICS INC., Seoul (KR)

(72) Inventors: Eunsung Park, Seoul (KR); Dongguk Lim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 20 days.

(21) Appl. No.: 17/273,698

(22) PCT Filed: Aug. 21, 2019

(86) PCT No.: PCT/KR2019/010633
§ 371 (c)(1),
(2) Date: Mar. 4, 2021

(87) PCT Pub. No.: WO2020/050528
PCT Pub. Date: Mar. 12, 2020

(65) Prior Publication Data
US 2021/0344540 A1 Nov. 4, 2021

(30) Foreign Application Priority Data
Sep. 7, 2018 (KR) .................. 10-2018-0107416

(51) Int. Cl.
*H04L 27/26* (2006.01)
*H04L 5/00* (2006.01)
*H04W 84/12* (2009.01)

(52) U.S. Cl.
CPC ........ *H04L 27/2607* (2013.01); *H04L 5/0098* (2013.01); *H04L 27/261* (2013.01); *H04L 27/2603* (2021.01); *H04L 27/2614* (2013.01); *H04W 84/12* (2013.01)

(58) Field of Classification Search
CPC ............ H04L 27/2603; H04L 27/2607; H04L 27/261; H04L 27/2614; H04L 5/0098; H04W 84/12
See application file for complete search history.

(56) References Cited

U.S. PATENT DOCUMENTS

| 2013/0242963 | A1 | 9/2013 | Van Nee et al. |
| 2017/0288745 | A1* | 10/2017 | Seok .............. H04B 7/0413 |
| 2018/0175988 | A1 | 6/2018 | Sun et al. |

FOREIGN PATENT DOCUMENTS

WO 2020045910 3/2020

OTHER PUBLICATIONS

European Patent Office Application Serial No. 19856831.3, Search Report dated Aug. 24, 2021, 9 pages.

(Continued)

*Primary Examiner* — Melvin C Marcelo
*Assistant Examiner* — Natali Pascual Peguero
(74) *Attorney, Agent, or Firm* — Lee Hong Degerman Kang Waimey

(57) ABSTRACT

Proposed are a method and device for transmitting an EHT PPDU in a wireless LAN system. Specifically, a transmission device generates an EHT PPDU and transmits the EHT PPDU to a receiving device through a 320 MHz RF band. A legacy preamble includes an L-STF and an L-LTF. The legacy preamble is generated by applying a first phase rotation value. The first phase rotation value is determined on the basis of a first technique and a second technique. The first technique acquires an optimal PAPR in the L-STF and the L-LTF. The second technique acquires an optimal PAPR (Continued)

on the basis of the maximum transmission bandwidth supported by the RF. The first phase rotation value is acquired on the basis of a second phase rotation value and a third phase rotation value. The second phase rotation value is obtained by repeating a phase rotation value defined for an 80 MHz band in an 802.11ax system. The third phase rotation value is defined in 80 MHz band units in a 320 MHz band.

15 Claims, 21 Drawing Sheets

(56) References Cited

OTHER PUBLICATIONS

Kim, et al., "160 MHz Transmissions," IEEE 802.11-10/0774r0, Jul. 2010, 25 pages.
Park, et al., "Phase Rotation for 32MHz," IEEE 802.11-19/1493r1, Sep. 2019, 12 pages.
Park, et al., "Phase Rotation Follow-up," IEEE 802.11-19/1890r0, Nov. 2019, 18 pages.
PCT International Application No. PCT/KR2019/010633, International Search Report dated Nov. 26, 2019, 4 pages.
Noh, et.al., "Gamma Phase Rotation for HE PPDU", IEEE 802.11-16/0903r1, Jul. 2016, 28 pages.
Choi, et al. "View on EHT Objectives and Technologies", IEEE 802.11-18/1171r0, Jul. 2018, 15 pages.

* cited by examiner

FIG. 7
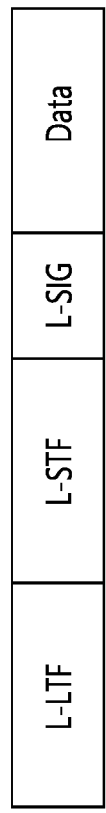
PPDU Format (IEEE 802.11a/g)
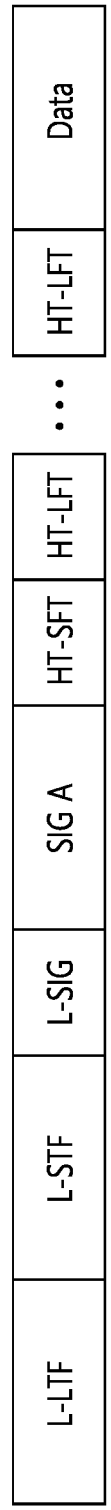
HT PPDU Format (IEEE 802.11n)
VHT PPDU Format (IEEE 802.11ac)
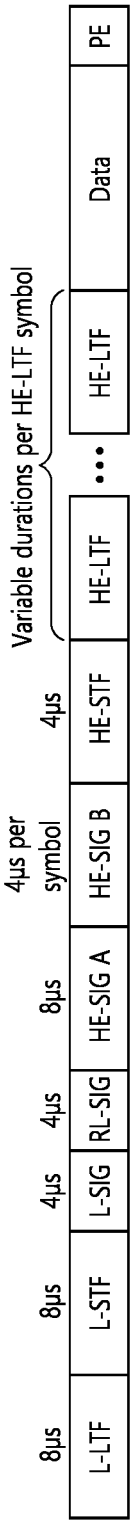

FIG. 13

| Legacy-Part (100) | SIG-Part (200) | STF-Part (300) | LTF-Part (400) | Data (500) |

METHOD AND DEVICE FOR APPLYING OPTIMIZED PHASE ROTATION IN WLAN ENVIRONMENT INCLUDING WIRELESS DEVICES HAVING MUTUALLY DIFFERENT MAXIMUM TRANSMITTABLE RF BANDWIDTHS

CROSS-REFERENCE TO RELATED APPLICATIONS

This application is the National Stage filing under 35 U.S.C. 371 of International Application No. PCT/KR2019/010633, filed on Aug. 21, 2019, which claims the benefit of earlier filing date and right of priority to Korean Application Nos. 10-2018-0107416, filed on Sep. 7, 2018, the contents of which are all hereby incorporated by reference herein in their entirety.

BACKGROUND OF THE DISCLOSURE

Field of the Disclosure

The present disclosure relates to a technique of transmitting a PPDU in a WLAN system and, more specifically, to a method and device for applying optimized phase rotation in a WLAN environment in which wireless devices having different maximum transmission bandwidths of RF are present.

Related Art

While current IEEE 802.11/Wi-Fi networks can provide low average latency in environments without traffic congestion, worst-case latency may considerably vary, and thus the performance is affected or utilization is limited when real-time applications and time sensitive applications are used through Wi-Fi. Accordingly, it is necessary to seek for solutions for controlling worst-case latency and jitter and providing more stable and reliable performance. Available improvement and required new functions of IEEE 802.11 WLAN which can satisfy such requirements for real-time applications are as follows.

Firstly, it is possible to satisfactorily support real-time applications on wireless media by extending TSN (Time Sensitive Networking) functions such that IEEE 802.1 TSN functions for supporting real-time application on the IEEE 802.3 wired Ethernet operate on IEEE 802.11 WLANs. Although TSN functions such as traffic stream identification, time synchronization, integration with Ethernet bridging, and the like have already been applied to IEEE 802.11 WLANs, Time-Aware Shaping (IEEE 802.1Qbv standards) present in Ethernet TSN and redundancy (a frame replication and elimination (FRE) function of the IEEE 802.1CB standard) through double/multiple links are functions that need to be newly extended, applied and supported in IEEE 802.11 WLANs in order to solve worst-case latency in current Wi-Fi networks. In addition, it is necessary to consider application of WLANs to other TSN functions such as alignment with a TSN management model defined in the IEEE 802.1Qcc standard.

Secondly, a multi-band operation is an important function for allowing coexistence with other high-throughput applications through traffic steering/separation as well as real-time application support.

Thirdly, it is necessary to improve MAC and PHY layers of IEEE 802.11 such that worst-case latency that is a requirement for most real-time applications is more predictable. Here, more predictable worst-case latency does not necessarily mean extremely low latency and capability of providing more predictable performance is a main requirement. However, in some use cases, not only predictable latency but also very low latency is important as a requirement. Since reliability is another important issue that needs to be improved for real-time application support, available functions for improving overall reliability of IEEE 802.11 links are required. According to such requirements, reduced PHY overhead, predictable and efficient media access, better support for transmission of time sensitive small packets, improvement of management for provision of more predictable performance, coexistence of time sensitive data, coordination between APs, double/multiple link transmission, etc. are included in available further improvements of the MAC and PHY layers of IEEE 802.11.

SUMMARY

The present disclosure provides a method and device for transmitting a PPDU through a broadband in a WLAN system including wireless devices having different maximum transmission bandwidths of RF.

An example of the present disclosure proposes a method for transmitting a PPDU through a broadband in a WLAN system including wireless devices having different maximum transmission bandwidths of RF.

The present embodiment may be performed in network environments in which a next-generation WLAN system is supported. The next-generation WLAN system is a WLAN system evolving from the 802.11ax system and may satisfy backward compatibility with the 802.11ax system. The next-generation WLAN system may correspond to an EHT (Extreme High Throughput) WLAN system or the 802.11be WLAN system.

The present embodiment may be performed in a transmitting device, and the transmitting device may correspond to an AP. A receiving device may correspond to an STA (non-AP STA).

The present embodiment proposes a method and device for setting phase rotation values by which an optimized PAPR can be obtained in consideration of a case in which there are wireless devices having different maximum transmission bandwidths supported by RF (Radio Frequency). That is, phase rotation values for minimizing a maximum PAPR in consideration of RF capabilities of wireless devices having different maximum transmission bandwidths of RF in a BSS are proposed. An EHT PPDU proposed in the present embodiment may be transmitted and received in 80/160/240/320 MHz bands. However, description will be limited to the 320 MHz band.

A transmitting device generates the aforementioned EHT PPDU (Physical Protocol Data Unit). The EHT PPDU includes a legacy preamble and an EHT field.

The transmitting device transmits the PPDU to a receiving device through a 320 MHz band based on an RF (Radio Frequency).

The legacy preamble includes an L-STF (Legacy-Short Training Field) and an L-LTF (Legacy-Long Training Field). In addition, the legacy preamble may further include an L-SIG (Legacy-Signal). The EHT field may include an EHT-SIG, an EHT-STF, an EHT-LTF, and a data field. The legacy field is a field supported by WLAN systems before 802.11be and the EHT field may be a field supported by the 802.11be WLAN system.

The legacy preamble is generated by applying first phase rotation values. That is, the first phase rotation values may be commonly applied to all fields included in the legacy preamble.

The first phase rotation values are determined based on a first method and a second method.

The first method is a method of acquiring an optimum PAPR in the L-STF and the L-LTF. The second method is a method of acquiring an optimum PAPR based on a maximum transmission bandwidth supported by an RF.

That is, the first phase rotation values are phase rotation values defined for an optimum PAPR of the L-STF and the L-LTF. When the PAPR of the L-STF and the L-LTF is large, the first phase rotation values may be applied to the legacy preamble in order to minimize the PAPR. Further, the first phase rotation values are also phase rotation values defined to minimize a maximum PAPR acquired in consideration of a maximum transmission bandwidth supported by the RF. That is, the first phase rotation values may be phase rotation values defined to acquire an optimum PAPR in the L-STF and the L-LTF in a situation in which various RF capabilities are considered.

The first phase rotation values are acquired based on second phase rotation values and third phase rotation values.

The second phase rotation values are obtained by repeating phase rotation values defined for an 80 MHz band in the 802.11ax system. Since the EHT PPDU is transmitted through the 320 MHz band, the second phase rotation values may be obtained by repeating phase rotation values of the 80 MHz band, which optimizes a PAPR in the L-STF and the L-LTF and is applied in units of 20 MHz, four times. If the PPDU is transmitted through a 160 MHz band, the second phase rotation values may be obtained by repeating the phase rotation values of the 80 MHz band (which optimizes a PAPR in the L-STF and the L-LTF and is applied in units of 20 MHz) twice. If the EHT PPDU is transmitted through a 240 MHz band, the second phase rotation values may be obtained by repeating the phase rotation values of the 80 MHz band (which optimizes a PAPR in the L-STF and the L-LTF and is applied in units of 20 MHz) three times.

The third phase rotation values are phase rotation values defined in units of 80 MHz in the 320 MHz band. Since the 320 MHz band can be divided into four 80 MHz bands, the third phase rotation values can be defined for each of the four 80 MHz bands. If the EHT PPDU is transmitted through the 160 MHz band, the third phase rotation values may be defined for each of two 80 MHz bands based on an optimum PAPR of the L-STF and the L-LTF. If the EHT PPDU is transmitted through the 240 MHz band, the third phase rotation values may be defined for each of three 80 MHz bands based on the optimum PAPR of the L-STF and the L-LTF.

That is, the present embodiment proposes a method of additionally performing phase rotation (third phase rotation values) in units of 80 MHz in the whole band while applying phase rotation values (second phase rotation values) defined in the 80 MHz band.

Hereinafter, a subcarrier range to which phase rotation values are applied will be described.

The aforementioned 320 MHz band may be composed of subcarriers having subcarrier indexes of −512 to 511.

The second phase rotation values may be [1 −1 −1 −1 1 −1 −1 −1 1 −1 −1 −1 1 −1 −1 −1] because it is obtained by repeating the phase rotation values [1 −1 −1 −1] of the 80 MHz band, defined above, four times.

The first value "1" in the second phase rotation values may be applied to subcarriers having subcarrier indexes of −512 to −449, the second value "−1" in the second phase rotation value may be applied to subcarriers having subcarrier indexes of −448 to −385, the third value "−1" in the second phase rotation value may be applied to subcarriers having subcarrier indexes of −384 to −321, and the fourth value "−1" in the second phase rotation value may be applied to subcarriers having subcarrier indexes of −320 to −257. That is, the first to fourth values [1 −1 −1 −1] in the second phase rotation values may be applied to the first 80 MHz band in the 320 MHz band.

The fifth value "1" in the second phase rotation values may be applied to subcarriers having subcarrier indexes of −256 to −193, the sixth value "−1" in the second phase rotation value may be applied to subcarriers having subcarrier indexes of −192 to −129, the seventh value "−1" in the second phase rotation value may be applied to subcarriers having subcarrier indexes of −128 to −65, and the eighth value "−1" in the second phase rotation value may be applied to subcarriers having subcarrier indexes of −64 to −1. That is, the fifth to eighth values [1 −1 −1 −1] in the second phase rotation values may be applied to the second 80 MHz band in the 320 MHz band.

The ninth value "1" in the second phase rotation values may be applied to subcarriers having subcarrier indexes of 0 to 63, the tenth value "−1" in the second phase rotation value may be applied to subcarriers having subcarrier indexes of 64 to 127, the eleventh value "−1" in the second phase rotation value may be applied to subcarriers having subcarrier indexes of 128 to 191, and the twelfth value "−1" in the second phase rotation value may be applied to subcarriers having subcarrier indexes of 192 to 255. That is, the ninth to twelfth values [1 −1 −1 −1] in the second phase rotation values may be applied to the third 80 MHz band in the 320 MHz band.

The thirteenth value "1" in the second phase rotation values may be applied to subcarriers having subcarrier indexes of 256 to 319, the fourteenth value "−1" in the second phase rotation value may be applied to subcarriers having subcarrier indexes of 320 to 383, the fifteenth value "−1" in the second phase rotation value may be applied to subcarriers having subcarrier indexes of 384 to 447, and the sixteenth value "−1" in the second phase rotation value may be applied to subcarriers having subcarrier indexes of 448 to 511. That is, the thirteenth to sixteenth values [1 −1 −1 −1] in the second phase rotation values may be applied to the fourth 80 MHz band in the 320 MHz band.

For example, the third phase rotation values may be [1 −j −j 1]. Since the 320 MHz band has four 80 MHz bands, the third phase rotation values may be defined for each of the four 80 MHz bands.

The first value "1" in the third phase rotation values may be applied to the first 80 MHz band in the 320 MHz band, the second value "−j" in the third phase rotation values may be applied to the second 80 MHz band in the 320 MHz band, the third value "−j" in the third phase rotation values may be applied to the third 80 MHz band in the 320 MHz band, and the fourth value "1" in the third phase rotation values may be applied to the fourth 80 MHz band in the 320 MHz band.

The first phase rotation values may be obtained based on products of the second phase rotation values and the third phase rotation values. That is, the first phase rotation values can be obtained by multiplying the second phase rotation values by the third phase rotation values in accordance with frequency bands (or subcarrier indexes). Here, the first phase rotation values are [1 −1 −1 −1 −j j j j −j j j j 1 −1 −1 −1]. By applying the first phase rotation values to the legacy preamble, an optimum PAPR with respect to the L-STF and the L-LTF can be ensured for transmission through the 320 MHz band in consideration of various RF capabilities.

As another example, the third phase rotation values may be [1 j j 1]. Since the 320 MHz band has four 80 MHz bands, the third phase rotation values may be defined for each of the four 80 MHz bands.

The first value "1" in the third phase rotation values may be applied to the first 80 MHz band in the 320 MHz band, the second value "j" in the third phase rotation values may be applied to the second 80 MHz band in the 320 MHz band, the third value "j" in the third phase rotation values may be applied to the third 80 MHz band in the 320 MHz band, and the fourth value "1" in the third phase rotation values may be applied to the fourth 80 MHz band in the 320 MHz band.

The first phase rotation values may be obtained based on products of the second phase rotation values and the third phase rotation values. That is, the first phase rotation values can be obtained by multiplying the second phase rotation values by the third phase rotation values in accordance with frequency bands (or subcarrier indexes). Here, the first phase rotation values are [1 −1 −1 −1 j −j −j −j j −j −j −j 1 −1 −1 −1]. By applying the first phase rotation values to the legacy preamble, an optimum PAPR with respect to the L-STF and the L-LTF can be ensured for transmission through the 320 MHz band in consideration of various RF capabilities.

The maximum transmission bandwidth supported by RF may be 80 MHz, 160 MHz, 240 MHz, or 320 MHz. When the maximum transmission bandwidth supported by RF is 80 MHz, the transmitting device may transmit a PPDU using one RF having 80 MHz capacity. When the maximum transmission bandwidth supported by RF is 160 MHz, the transmitting device may transmit the PPDU using two RFs each having 80 MHz capacity. When the maximum transmission bandwidth supported by RF is 240 MHz, the transmitting device may transmit the PPDU using three RFs each having 80 MHz capacity. When the maximum transmission bandwidth supported by RF is 320 MHz, the transmitting device may transmit the PPDU using four RFs each having 80 MHz capacity.

An optimum PAPR obtained based on the maximum transmission bandwidth supported by RF may be selected by comparing first to fourth PAPRs. That is, the transmitting device may extract maximum PAPR values by calculating PAPRs for RFs having various capacities and compare the extracted PAPR values to determine optimized phase rotation values. Here, the first phase rotation values have a unified form instead of a form having different values depending on the RFs having various capacities.

The first PAPR may be an optimum PAPR obtained when the maximum transmission bandwidth supported by RF is 80 MHz. The second PAPR may be an optimum PAPR obtained when the maximum transmission bandwidth supported by RF is 160 MHz. The third PAPR may be an optimum PAPR obtained when the maximum transmission bandwidth supported by RF is 240 MHz. The fourth PAPR may be an optimum PAPR obtained when the maximum transmission bandwidth supported by RF is 320 MHz.

The L-STF may be generated by applying the first phase rotation values to an L-STF sequence. Further, the L-LTF may be generated by applying the first phase rotation values to an L-LTF sequence.

The L-STF sequence may be a sequence obtained by repeating an L-STF sequence defined for a 20 MHz band. Since the L-STF is transmitted through the 320 MHz band, the L-STF sequence may be obtained by repeating the L-STF sequence of the 20 MHz band defined in legacy 802.11ax. Similarly, if the L-STF is transmitted through the 160 MHz band, the L-STF sequence of the 20 MHz band defined in legacy 802.11ax may be repeated twice. If the L-STF is transmitted through the 240 MHz band, the L-STF sequence of the 20 MHz band defined in legacy 802.11ax may be repeated three times.

The L-STF sequence defined for the 20 MHz band is sqrt(½)*[0 0 0 0 0 0 0 0 1+j 0 0 0 −1−j 0 0 0 1+j 0 0 0 −1−j 0 0 0 −1−j 0 0 0 1+j 0 0 0 0 0 0 0 −1−j 0 0 0 −1−j 0 0 0 1+j 0 0 0 1+j 0 0 0 1+j 0 0 0 1+j 0 0 0 0 0 0 0].

The L-LTF sequence may be a sequence obtained by repeating an L-LTF sequence defined for the 20 MHz band. Since the L-LTF is transmitted through the 320 MHz band, the L-LTF sequence may be obtained by repeating the L-LTF sequence of the 20 MHz band defined in legacy 802.11ax. Similarly, if the L-LTF is transmitted through the 160 MHz band, the L-LTF sequence of the 20 MHz band defined in legacy 802.11ax may be repeated twice. If the L-LTF is transmitted through the 240 MHz band, the L-LTF sequence of the 20 MHz band defined in legacy 802.11ax may be repeated three times.

The L-LTF sequence defined for the 20 MHz band is [0 0 0 0 0 1 1 −1 −1 1 1 −1 1 −1 1 1 1 1 1 1 −1 −1 1 1 −1 1 −1 1 1 1 1 0 1 −1 −1 1 1 −1 1 −1 1 −1 −1 −1 −1 −1 1 1 −1 −1 1 −1 1 −1 1 1 1 1 0 0 0 0 0].

In the above-described embodiment, even when the PPDU is transmitted through 80/160/240 MHz bands, phase rotation values may be defined and applied to the legacy preamble in the same manner.

The EHT-SIG may include EHT-SIG-A and EHT-SIG-B. The EHT-SIG-B may include the RU information. That is, the AP can signal the information about the tone plan in the 80/160/240/320 MHz through the EHT-SIGB in the PPDU. Further, the EHT-STF, EHT-LTF, and data field included in the EHT field may be transmitted/received in a band (RU) according to the tone plan in 80/160/240/320 MHz.

In addition, the EHT-SIG may be generated by applying the first phase rotation values or the second phase rotation values. If the EHT PPDU has the same preamble structure as that of 11ax, the same phase rotation values may be applied up to the EHT-SIG-B to generate the field.

Advantageous Effects

According to embodiments proposed in the present disclosure, it is possible to obtain a PAPR optimized for an L-STF and an L-LTF by defining phase rotation values applied to the legacy preamble when a PPDU is transmitted through 80/160/240/320 MHz bands in consideration of a situation in which there are wireless devices having different maximum transmission bandwidths supported by radio frequency (RF). Accordingly, subcarrier efficiency and high throughput can be obtained.

BRIEF DESCRIPTION OF THE DRAWINGS

FIG. 7 is a diagram illustrating an example of a PPDU used in IEEE standards.

FIG. 13 illustrates an example of a PPDU that can be used in an EHT system.

DESCRIPTION OF EXEMPLARY EMBODIMENTS

The above-described features and the following detailed description are exemplary and are intended to aid in description and understanding of the present disclosure. That is, the present disclosure is not limited to such embodiments and may be embodied in other forms. The following embodiments are merely exemplary and are intended to fully disclose the specification, and explanation for conveying the specification to those skilled in the art. Accordingly, it is necessary to clarify that, when there are various methods for implementing components of the present disclosure, the present disclosure can be implemented using any of specific ones or similar ones of the methods.

Through the specification, when it is said that a certain component includes a specific element or when it is said that a certain process includes a specific step, this means that the component or the process may further include other elements or other steps. That is, the terms used in the specification are merely used in order to describe particular embodiments and are not intended to limit the concept of the present disclosure. Further, examples illustrated to aid in understanding of the disclosure include complementary examples thereof.

The terms used in the specification agree with the meanings as understood by those skilled in the art. Common terms should be interpreted in the context of the specification not too ideally or impractically unless this disclosure expressly defines them so. Hereinafter, embodiments of the present disclosure will be described with reference to the attached drawings.

<Wireless LAN (WLAN) System>

Figure 1:
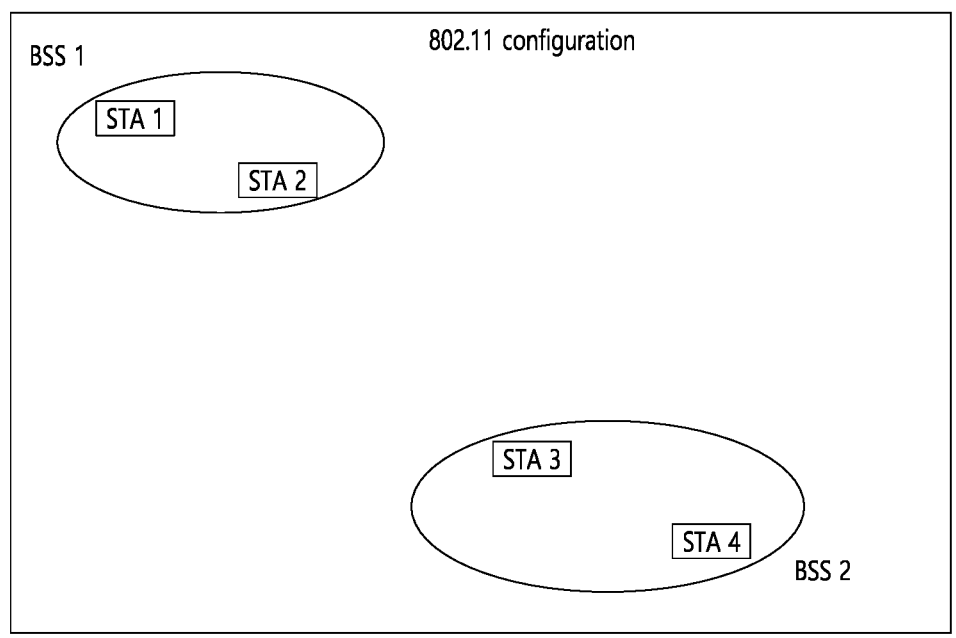
FIG. 1 is a diagram illustrating an example of a configuration of a WLAN system.

FIG. 1 is a diagram illustrating an example of a configuration of a WLAN system.

As illustrated in FIG. 1, the WLAN system includes one or more basic service sets (BSSs). A BSS is a set of stations (STAs) that can communicate with each other in successful synchronization.

An STA is a logical entity including a physical layer interface for medium access control (MAC) and radio media and includes an access point (AP) and a non-AP station (non-AP STA). Among STAs, a mobile terminal operated by a user is a non-AP STA, and an STA may refer to a non-AP STA. The non-AP STA may be called other names such as a terminal, a wireless transmit/receive unit (WTRU), user equipment (UE), a mobile station (MS), a mobile terminal, and a mobile subscriber unit.

In addition, the AP is an entity that provides access to a distribution system (DA) to an associated STA through radio media. The AP may also be called a centralized controller, a base station (BS), a node-B, a BTS (Base Transceiver System), a PCP/AP (personal basic service set central point/access point), or a site controller.

The BSS may be divided into an infrastructure BSS and an independent BSS (IBSS).

A BSS illustrated in FIG. 1 is an IBSS. The IBSS refers to a BSS including no AP and constitutes a self-contained network because it does not include an AP and thus is not allowed to access a DS.

Figure 2:
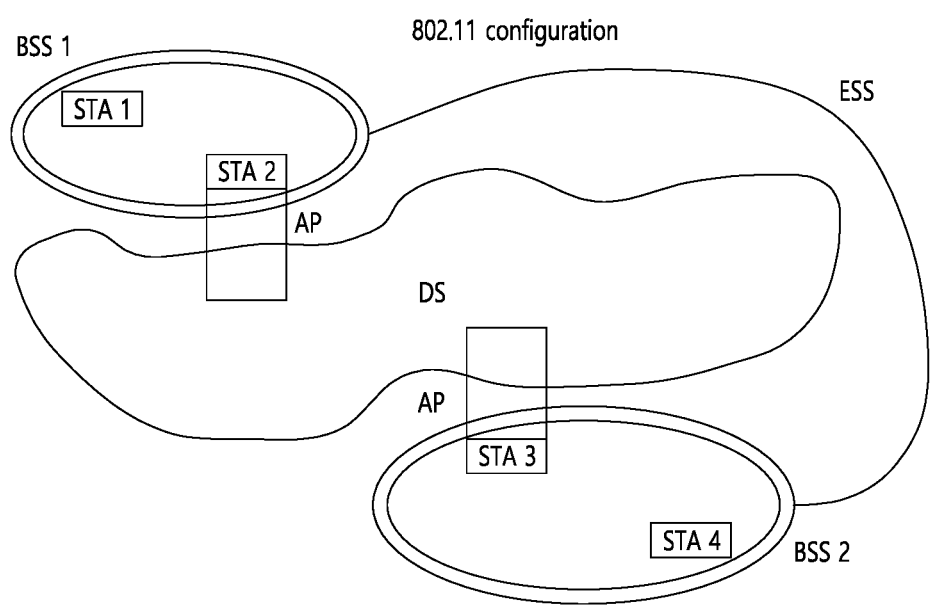
FIG. 2 is a diagram illustrating another example of a configuration of a WLAN system.

FIG. 2 is a diagram illustrating another example of a configuration of a WLAN system.

A BSS illustrated in FIG. 2 is an infrastructure BSS. The infrastructure BSS includes one or more STAs and APs. Although communication between non-AP STAs is performed through an AP in the infrastructure BSS in principle, direct communication between non-AP STAs may be performed when a direct link is established between the non-AP STAs.

As illustrated in FIG. 2, a plurality of infrastructure BSSs may be connected to each other through a DS. A plurality of infrastructure BSSs connected through a DS is referred to as an extended service set (ESS). STAs included in an ESS can communicate with each other and a non-AP STA can handover from one BSS to another BSS while performing ceaseless communication in the same ESS.

A DS is a mechanism for connecting a plurality of APs and need not necessarily be a network, and the form thereof is not limited if it can provide a predetermined distribution service. For example, the DS may be a wireless network such as the mesh network or a physical structure for connecting APs.

Figure 3:
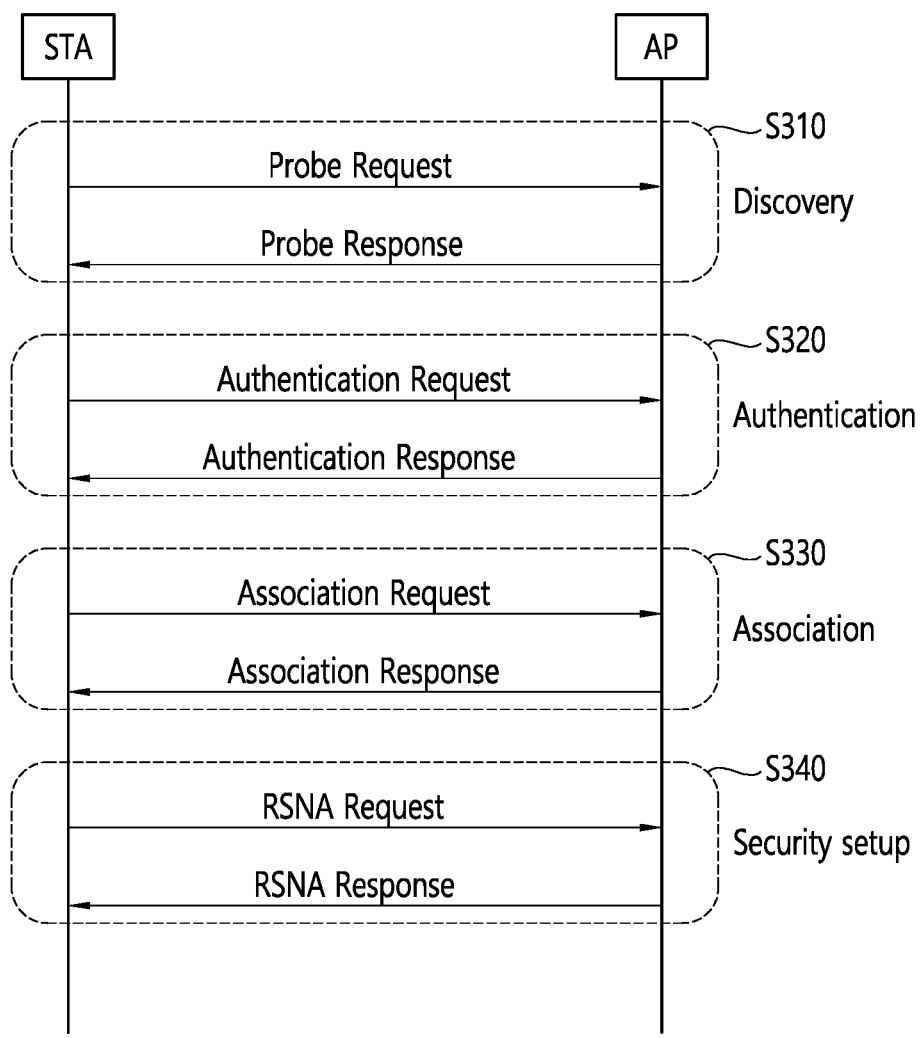
FIG. 3 is a diagram for describing a general link setup procedure.

FIG. 3 is a diagram for describing a general link setup procedure.

In illustrated step S310, an STA may perform a network discovery operation. The network discovery operation may include a scanning operation of the STA. That is, the STA needs to discover networks in which the STA can join to access a network. The STA needs to identify a compatible network before joining a wireless network. A process of identifying a network present in a specific area is referred to as scanning. Scanning includes active scanning and passive scanning.

FIG. 3 illustrates a network discovery operation including an active scanning process. In active scanning, the STA that performs scanning transmits a probe request frame to search neighboring APs while moving to channels and waits for a response thereto. A responder transmits a probe response frame in response to the probe request frame to the STA that has transmitted the probe request frame. Here, the responder may be an STA that has finally transmitted a beacon frame in a BSS of a channel that is being scanned. An AP is the responder because the AP transmits the beacon frame in a BSS, and the responder is not fixed in an IBSS because STAs in the IBSS transmit the beacon frame by turns. For example, an STA that has transmitted the probe request frame in channel #1 and received the probe response frame in channel #1 may store BSS related information included in the received probe response frame, move to the next channel (e.g., channel #2) and perform scanning (i.e., probe request/response transmission/reception on channel #2) through the same method.

Although not illustrated in the example of FIG. 3, the scanning operation may be performed in a passive scanning manner. An STA that performs scanning based on passive scanning can wait for a beacon frame while moving to channels. The beacon frame is one of management frames in IEEE 802.11, which signals the presence of a wireless network and is periodically transmitted such that the STA that performs scanning can discover a wireless network and join in the wireless network. An AP periodically transmits the beacon frame in a BSS and STAs transmit the beacon frame by turns in an IBSS. The STA that performs scanning stores information about the BSS included in the beacon frame upon reception of the beacon frame, and records beacon frame information in each channel while moving to other channels. Upon reception of the beacon frame, the STA may store BSS related information included in the beacon frame, and move to the next channel and perform scanning in the next channel through the same method.

Upon discovery of a network, the STA may perform an authentication procedure in step S320. This authentication procedure may be referred to as a first authentication procedure to be clearly distinguished from a security setup operation of step S340 which will be described later. The authentication procedure of step S320 may include a procedure through which the STA transmits an authentication request frame to the AP and the AP transmits an authentication response frame to the STA in response to the authentication request frame. An authentication frame used for request/response corresponds to a management frame.

The authentication frame may include information about an authentication algorithm number, an authentication transaction sequence number, status code, challenge text, an RSN (Robust Security Network), and a finite cyclic group.

The STA can transmit the authentication request frame to the AP. The AP can determine whether to allow authentication of the STA based on the received authentication request frame. The AP can provide an authentication processing result to the STA through the authentication response frame.

The successfully authenticated STA may perform an association procedure based on step S330. The association procedure includes a procedure through which the STA transmits an association request frame to the AP and the AP transmits an association response frame to the STA in response to the association request frame. For example, the association request frame may include information about various capabilities, a beacon listen interval, an SSID (service set identifier), supported rates, supported channels, an RSN, a mobile domain, supported operating classes, a traffic indication map broadcast request, and interworking service capability. For example, the association response frame may include information about various capabilities, status code, an AID (Association ID), supported rates, an EDCA (Enhanced Distributed Channel Access) parameter set, an RCPI (Received Channel Power Indicator), an RSNI (Received Signal to Noise Indicator), a mobile domain, a timeout interval (association comeback time), an overlapping BSS scan parameter, a TIM broadcast response, and a QoS map.

Thereafter, the STA may perform the security setup process in step S340. The security setup process of step S340 may include a private key setup process through 4-way handshaking using an EAPOL (Extensible Authentication Protocol over LAN) frame, for example.

Figure 4:
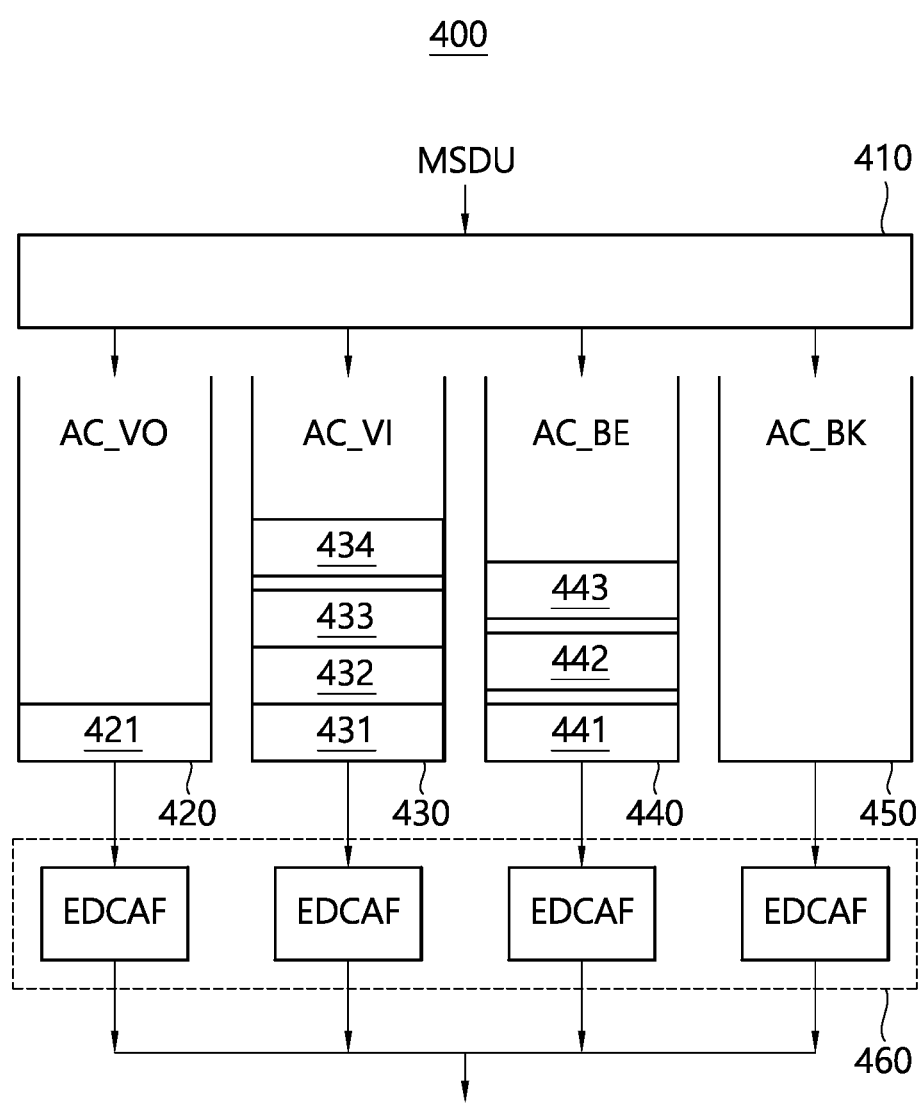
FIG. 4 is a diagram illustrating an EDCA based channel access method.

FIG. 4 is a diagram illustrating an EDCA based channel access method. In a wireless LAN system, an STA may perform channel access based on a plurality of user priorities defined for enhanced distributed channel access (EDCA).

Specifically, for the transmission of a quality of service (QoS) data frame based on a plurality of user priorities, four access categories (ACs) (AC_BK (background), AC_BE (best effort), AC_VI (video), and AC_VO (voice) may be defined.

An STA may receive, from a higher layer, traffic data (e.g., MAC service data unit (MSDU)) having a preset user priority.

For example, in order to determine the transmission sequence of a MAC frame to be transmitted by an STA, a differential value may be set in a user priority for each piece of traffic data. The user priority may be mapped based on each access category (AC) in which traffic data is buffered and Table 1 below.

TABLE 1

| Priority | User priority | AC (access category) |
|---|---|---|
| Low | 1 | AC_BK |
|  | 2 | AC_BK |
|  | 0 | AC_BE |
|  | 3 | AC_BE |
|  | 4 | AC_VI |
|  | 5 | AC_VI |
|  | 6 | AC_VO |
| High | 7 | AC_VO |

In the present disclosure, the user priority may be understood as a traffic identifier (hereinafter "TID") indicating the characteristics of traffic data.

Referring to Table 1, traffic data having the user priority (i.e., TID) of "1" or "2" may be buffered in a transmission queue 1450 of an AC_BK type. Traffic data having the user priority (i.e., TID) of "0" or "3" may be buffered in a transmission queue 1440 of an AC_BE type.

Traffic data having the user priority (i.e., TID) of "4" or "5" may be buffered in a transmission queue 1430 of an AC_VI type. Traffic data having the user priority (i.e., TID) of "6" or "7" may be buffered in a transmission queue 1420 of an AC_VO type.

Instead of a DCF interframe space (DIFS), CWmin, and CWmax that are parameters for a back-off operation/procedure based on the existing distributed coordination function (DCF), an arbitration interframe space (AIFS)[AC], CWmin [AC], CWmax[AC] and TXOP limit[AC] that are EDCA parameter sets may be used for a back-off operation/procedure of an STA performing EDCA.

A difference between transmission priorities of ACs may be implemented based on a differentiated EDCA parameter set. A default value of the EDCA parameter set (i.e., AIFS [AC], CWmin[AC], CWmax[AC], and TXOP limit[AC]) corresponding to each AC is illustratively shown in Table 2. Detailed values of Table 2 may be set differently from those listed below.

TABLE 2

| AC | CWmin [AC] | CWmax [AC] | AIFS [AC] | TXOP limit [AC] |
|---|---|---|---|---|
| AC_BK | 31 | 1023 | 7 | 0 |
| AC_BE | 31 | 1023 | 3 | 0 |
| AC_VI | 15 | 31 | 2 | 3.008 ms |
| AC_VO | 7 | 15 | 2 | 1.504 ms |

The EDCA parameter set for each AC may be set as a default value or may be included in a beacon frame and transmitted from an access point (AP) to each STA. The smaller the values of the AIFS[AC] and the CWmin[AC], the higher the priorities. Accordingly, a more band can be used in a given traffic environment because channel access latency is reduced.

The EDCA parameter set may include information on a channel access parameter (e.g., AIFS [AC], CWmin[AC], and CWmax[AC]) for each AC.

A back-off operation/procedure for EDCA may be performed based on an EDCA parameter set individually set in each of the four ACs included in each STA. Proper setting of an EDCA parameter value that defines a different channel access parameter for each AC can optimize network performance and also increase a transmission effect based on the priority of traffic.

Accordingly, in a wireless LAN system, an AP needs to perform an overall management and coordination function on the EDCA parameters in order to guarantee fair medium access for all STAs participating in a network.

Referring to FIG. 4, one STA (or AP) 1400 may include a virtual mapper 410, the plurality of transmission queues 420 to 450 and a virtual collision processor 460. In FIG. 4, the virtual mapper 410 may function to map an MSDU, received from a logical link control (LLC) layer, onto a transmission queue corresponding to each AC based on Table 1.

In FIG. 4, each of the plurality of transmission queues 420 to 450 may play a role of an EDCA contention entity for wireless medium access within one STA (or AP).

Figure 5:
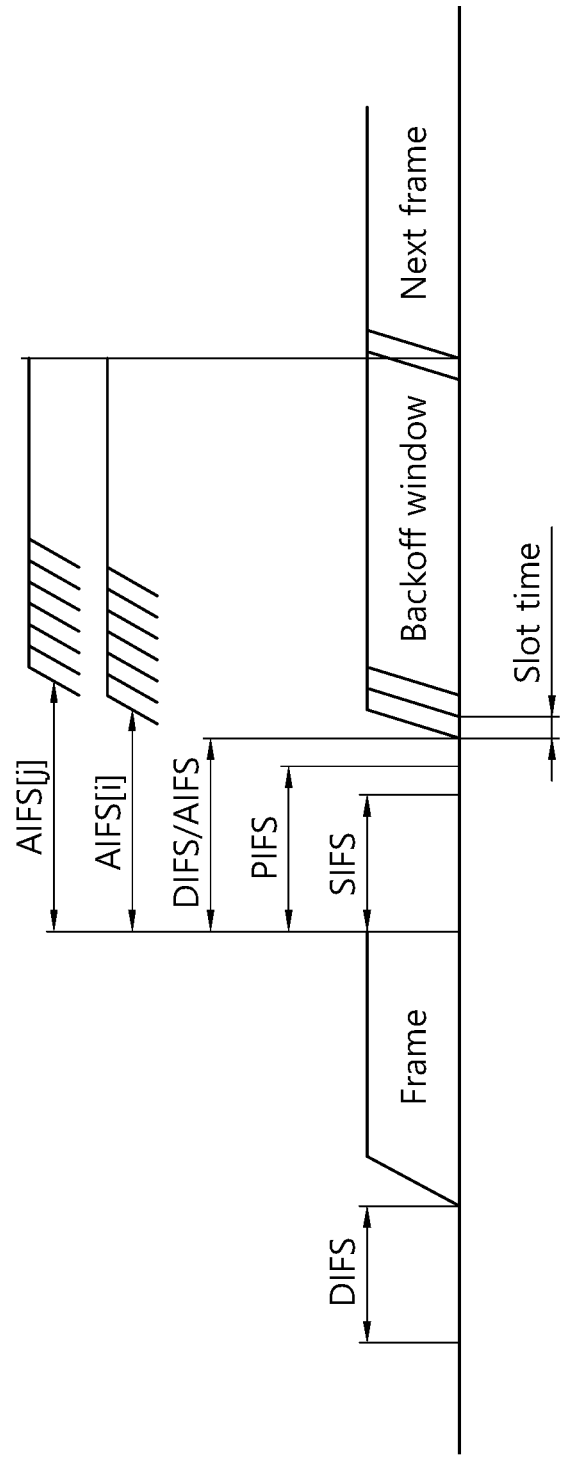
FIG. 5 is a conceptual diagram illustrating a backoff operation/procedure of EDCA.

FIG. 5 is a conceptual diagram illustrating a back-off operation/procedure of EDCA.

A plurality of STAs may share a wireless medium based on a DCF, that is, a contention-based function. The DCF may use CSMA/CA in order to coordinate a collision between STAs.

In a channel access scheme using the DCF, if a medium is not used (i.e., channel is idle) during a DCF interframe space (DIFS), an STA may transmit an internally determined MPDU. The DIFS is a kind of time length used in the IEEE standard. The IEEE standard uses various time intervals, such as a slot time, a short inter-frame space (SIFS), a PCF inter-frame space (PIFS), a DIFS, and an arbitration inter-frame space (AIFS). A detailed value of each of the time intervals may be variously set. In general, a long length is set in order of the slot time, SIFS, PIFS, DIFS, and AIFS.

If it is determined that a wireless medium is used by another STA based on the carrier sensing mechanism of an STA (i.e., channel is busy), the STA may determine the size of a contention window (hereinafter "CW") and perform a back-off operation/procedure.

In order to perform a back-off operation/procedure, each STA may set a randomly selected back-off value in a back-off counter within a CW.

Each STA may perform a back-off operation/procedure for channel access by counting down a back-off window in a slot time unit. An STA that has selects a relatively shorter back-off window among a plurality of STAs may obtain a transmission opportunity (hereinafter "TXOP") capable of occupying a medium.

During a time interval for the TXOP, the remaining STAs may suspend countdown operations. The remaining STAs may wait until the time interval for the TXOP is ended. After the time interval for the TXOP is ended, the remaining STAs may resume the suspended countdown operations in order to occupy the wireless medium.

Based on a transmission method based on such a DCF, a collision phenomenon which may occur when a plurality of STAs transmits frames at the same time can be prevented. In this case, a channel access scheme using the DCF does not have a concept for a transmission priority (i.e., user priority). That is, when the DCF is used, quality of service (QoS) of traffic to be transmitted by an STA cannot be guaranteed.

In order to solve such a problem, in 802.11e, a hybrid coordination function (hereinafter "I-ICF"), that is, a new coordination function, has been defined. The newly defined HCF has better performance than channel access performance of the existing DCF. The HCF may use both HCF-controlled channel access (HCCA) of the polling scheme and contention-based enhanced distributed channel access (EDCA), that is, two types of channel access schemes, for QoS improvement purposes.

Referring to FIG. 5, it is assumed that an STA performs EDCA for the transmission of traffic data buffered in the STA. Referring to Table 2, a user priority set in each traffic data may be differentiated into eight stages.

Each STA may include output queues of the four types (AC_BK, AC_BE, AC_VI, and AC_VO) mapped onto the eight-stage user priorities of Table 1.

IFSs, such as the SIFS, the PIFS, and the DIFS, are additionally described below.

The IFS may be determined based on the attributes specified by the physical layer of an STA regardless of the bit rate of the STA. The remainder except the AIFS among the interframe spacings (IFSs) may fixedly use a value preset for each physical layer.

As illustrated in Table 2, the AIFS may be set as a value corresponding to the transmission queues of the four types mapped onto user priorities.

The SIFS has the shortest time gap among the aforementioned IFSs. Accordingly, the SIFS may be used when an STA occupying a wireless medium needs to maintain the occupancy of the medium without the interruption of another STA in an interval in which a frame exchange sequence is performed.

That is, a priority may be assigned when an on-going frame exchange sequence is completed using the smallest gap between transmissions within the frame exchange sequence. Furthermore, an STA accessing a wireless medium using the SIFS may immediately start transmission in an SIFS boundary without determining whether the medium is busy.

Duration of the SIFS for a specific physical (PHY) layer may be defined based on an aSIFSTime parameter. For example, an SIFS value is 16 μs in the physical layer (PHY) of the IEEE 802.11a, IEEE 802.11g, IEEE 802.11n and IEEE 802.11ac standards.

The PIFS may be used to provide an STA with a high priority next the SIFS. That is, the PIFS may be used to obtain a priority for accessing a wireless medium.

The DIFS may be used by an STA that transmits a data frame (MPDU) and a management frame (Mac protocol data unit (MPDU) based on the DCF. After a received frame and a back-off time expires, if a medium is determined to be in the idle state through a carrier sense (CS) mechanism, the STA may transmit the frame.

Figure 6:
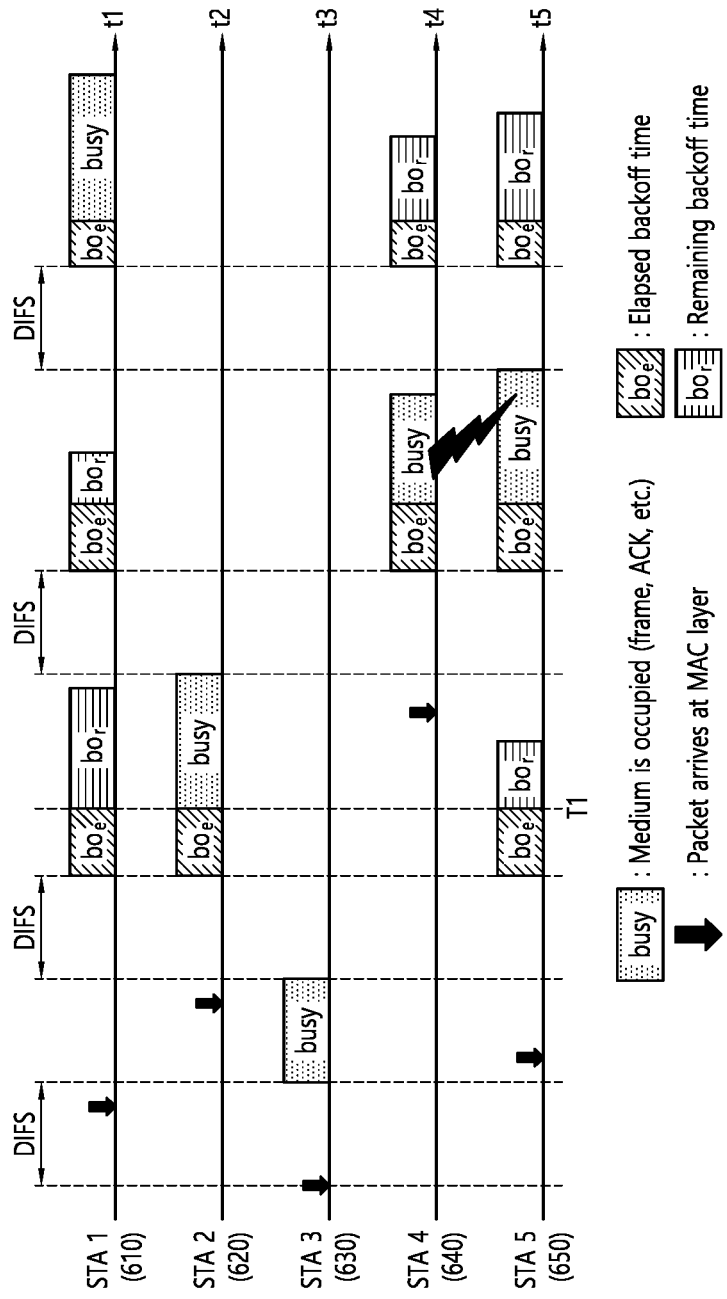
FIG. 6 is a diagram for describing a backoff operation.

FIG. 6 is a diagram describing a back-off operation.

Each of STAs 610, 620, 630, 640, and 650 may select a back-off value for a back-off operation/procedure. Furthermore, each STA may attempt transmission after waiting as much as time (i.e., a back-off window) in which the selected back-off value is indicated in a slot time slot time unit. Furthermore, each STA may count down a back-off window in a slot time unit. A countdown operation for channel access to a wireless medium may be individually performed by each STA.

Time corresponding to the back-off window may be described as a random back-off time Tb[i]. In other words, each STA may individually set the back-off time Tb[i] in the back-off counter of each STA.

Specifically, the back-off time Tb[i] is a pseudo-random integer value, and may be computed based on Equation 1.

$$T_b[i] = \text{Random}(i) * \text{SlotTime}$$ [Equation 1]

In Equation 1, Random(i) is a function using a uniform distribution and generating a given integer between 0 and CW[i]. CW[i] may be understood as a contention window selected between a minimum contention window CWmin[i] and a maximum contention window CWmax[i]. The minimum contention window CWmin[i] and the maximum contention window CWmax[i] may correspond to CWmin[AC] and CWmax[AC], that is, default values in Table 2.

In initial channel access, an STA may select a given integer between 0 and CWmin[i] through Random(i) with CW[i] being fixed to CWmin[i]. In the present embodiment, the selected given integer may be described as a back-off value.

i may be understood as the user priority of traffic data. In Equation 1, i may be construed as corresponding to any one of AC_VO, AC_VI, AC_BE or AC_BK according to Table 1.

In Equation 1, the slot time SlotTime may be used to provide a sufficient time so that the preamble of a transmission STA is sufficiently detected by an adjacent STA. In Equation 1, the slot time SlotTime may be used to define the aforementioned PIFS and DIFS. For example, the slot time SlotTime may be 9 μs.

For example, when a user priority(i) is "7", an initial back-off time Tb[AC_VO] for the transmission queue of the AC_VO type may be time in which a back-off value selected between 0 and CWmin[AC_VO] is represented in unit of the slot time SlotTime.

If a collision between STAs occurs according to a back-off operation/procedure (or if an ACK frame for a transmitted frame is not received), an STA may compute an increased back-off time Tb[i]' based on Equation 2 below.

$$CW_{new}[i] = ((CW_{old}[i]+1)*PF)-1$$ [Equation 2]

Referring to Equation 2, a new contention window $CW_{new}[i]$ may be computed based on a previous window $CW_{old}[i]$. In Equation 2, the PF value may be computed according to a procedure defined in the IEEE 802.11e standard. For example, in Equation 2, the PF value may be set to "2".

In the present embodiment, the increased back-off time 'Tb[i]' may be understood as time in which a given integer (i.e., a back-off value) selected between 0 and the new contention window $CW_{new}[i]$ is represented in a slot time unit.

The CWmin[i], CWmax[i], AIFS[i] and PF values described in FIG. 6 may be signaled from an AP through a QoS parameter set element, that is, a management frame. The CWmin[i], CWmax[i], AIFS[i] and PF values may be values preset by an AP and an STA.

Referring to FIG. 6, if the state of a specific medium changes from an occupy (or busy) state to an idle state, a plurality of STAs may attempt data (or frame) transmission. In this case, as a scheme for minimizing a collision between the STAs, each STA may select a back-off time back-off time Tb[i] in Equation 1, may wait for a slot time corresponding to the selected back-off time back-off, and may then attempt transmission.

When a back-off operation/procedure is initiated, each STA may individually count down the selected back-off counter time in a slot time unit. Each STA may continuously monitor the medium during the countdown.

If the state of the wireless medium is monitored as the occupancy state, the STA may suspend the countdown and may wait. If the state of the wireless medium is monitored as the idle state, the STA may resume the countdown.

Referring to FIG. 6, when a frame for the third STA 630 reaches the MAC layer of the third STA 630, the third STA 630 may check whether the state of a medium is the idle state during a DIFS. Next, if the state of the medium is determined to be the idle state during the DIFS, the third STA 630 may transmit the frame.

While the frame is transmitted by the third STA 630, the remaining STAs may check the occupancy state of the medium and wait for the transmission interval of the frame. The frame may reach the MAC layer of each of the first STA 610, the second STA 620, and the fifth STA 660. If the state of the medium is checked as the idle state, each STA may wait for the DIFS and then count down an individual back-off time selected by each STA.

FIG. 6 illustrates a case where the second STA 620 has selected the smallest back-off time and the first STA 610 has selected the greatest back-off time. FIG. 6 illustrates a case where at timing T1 at which frame transmission is started after a back-off operation/procedure for a back-off time selected by the second STA 620 is terminated, the remaining back-off time of the fifth STA 650 is shorter than the remaining back-off time of the first STA 610.

When the medium is occupied by the second STA 620, the first STA 610 and the fifth STA 650 may suspend the back-off operation/procedures and may wait. Next, when the medium occupancy of the second STA 1120 is ended (i.e., when the state of the medium becomes the idle state again), the first STA 610 and the fifth STA 650 may wait as much as the DIFS.

Next, the first STA 610 and the fifth STA 650 may resume the back-off operation/procedures based on the suspended remaining back-off time. In this case, since the remaining back-off time of the fifth STA 650 is shorter than the remaining back-off time of the first STA 610, the fifth STA 650 may complete the back-off operation/procedure before the first STA 610.

Meanwhile, referring to FIG. 6, when the medium is occupied by the second STA 620, a frame for the fourth STA 640 may reach the MAC layer of the fourth STA 640. When the state of the medium becomes the idle state, the fourth STA 640 may wait as much as the DIFS. Next, the fourth STA 640 may count down a back-off time selected by the fourth STA 640.

Referring to FIG. 6, the remaining back-off time of the fifth STA 650 may coincide with the back-off time of the fourth STA 640. In this case, a collision occurs between the fourth STA 640 and the fifth STA 650. When the collision between the STAs occurs, both the fourth STA 640 and the fifth STA 650 do not receive ACK and may fail in data transmission.

Accordingly, the fourth STA 640 and the fifth STA 650 may individually compute new contention windows $CW_{new}$[i] according to Equation 2. Next, the fourth STA 640 and the fifth STA 650 may individually perform countdown on the back-off times newly computed according to Equation 2.

Meanwhile, when the state of the medium is the occupancy state due to the transmission of the fourth STA 640 and the fifth STA 650, the first STA 610 may wait. Next, when the state of the medium becomes the idle state, the first STA 610 may wait as much as the DIFS and then resume back-off counting. When the remaining back-off time of the first STA 610 elapses, the first STA 610 may transmit the frame.

FIG. 7 illustrates an example of a PPDU used in IEEE standards.

As illustrated, various types of PHY protocol data units (PPDUs) are used in IEEE a/g/n/ac standards. Specifically, an LTF and an STF include a training signal, a SIG-A and a SIG-B include control information for a receiving STA, and a data field includes user data corresponding to a PSDU (MAC PDU/aggregated MAC PDU).

FIG. 7 also includes an example of an HE PPDU according to the IEEE 802.11ax standard. The HE PPDU according to FIG. 7 is an illustrative PPDU for multiple users. An HE-SIG-B may be included only in a PPDU for multiple users, and an HE-SIG-B may be omitted in a PPDU for a single user.

As illustrated, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used in the PPDU will be described. The RU may include a plurality of subcarriers (or tones). The RU may be used in the case of transmitting signals to multiple STAs based on the OFDMA technique. Also, the RU may be defined even when a signal is transmitted to one STA. The RU may be used for STF, LTF, data field, and the like.

Figure 8:
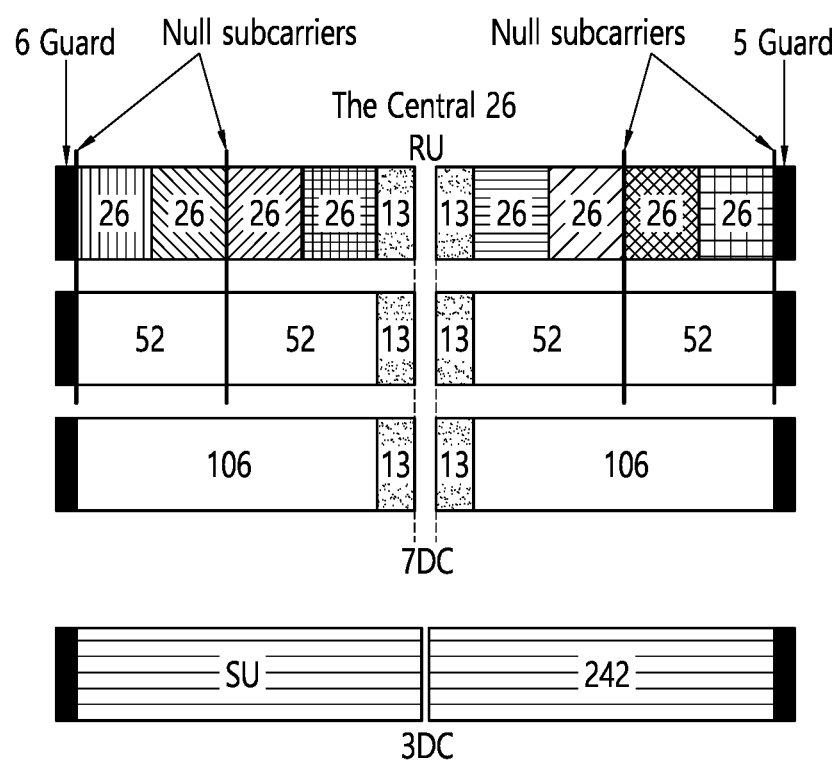
FIG. 8 illustrates a layout of resource units (RUs) used in a 20 MHz band.

FIG. 8 illustrates a layout of resource units (RUs) used in a band of 20 MHz.

As illustrated in FIG. 8, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 8, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 8 may be used not only for a multiple users (MUs) but also for a single user (SU), in which case one 242-unit may be used and three DC tones may be inserted as illustrated in the lowermost part of FIG. 8.

Although FIG. 8 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 9:
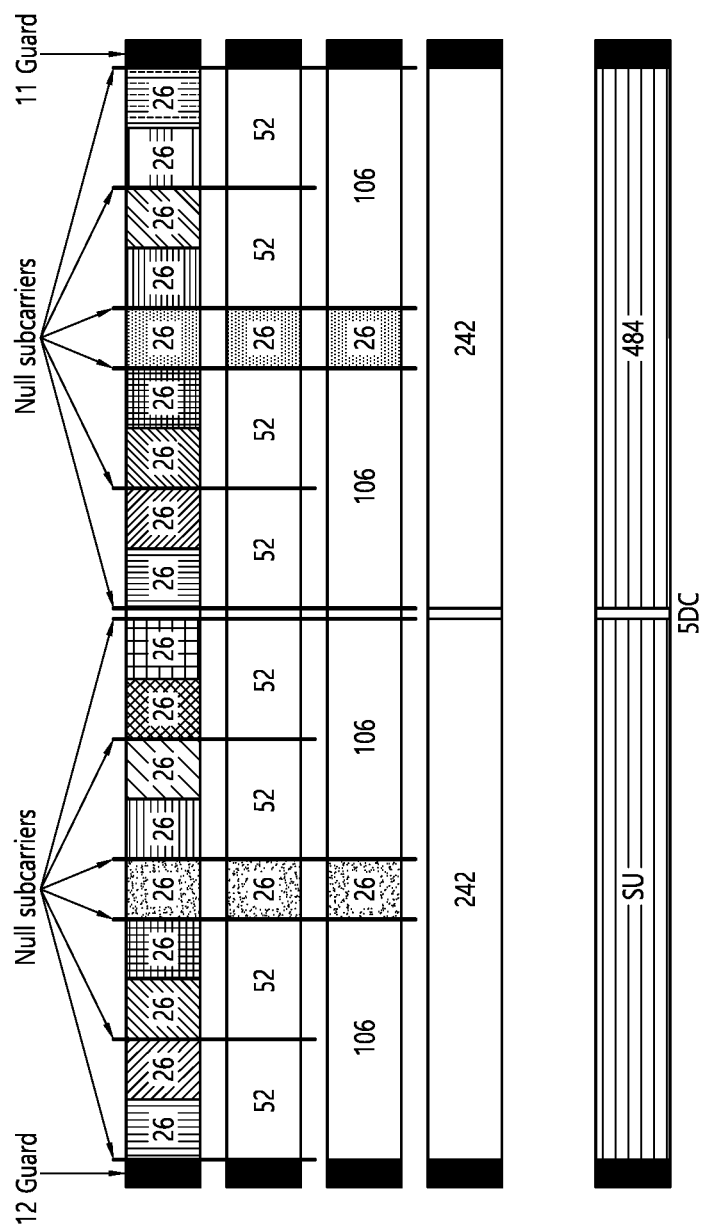
FIG. 9 illustrates a layout of RUs used in a 40 MHz band.

FIG. 9 illustrates a layout of RUs used in a band of 40 MHz

Similarly to FIG. 8 in which RUs having various sizes are used, a 26-RU, a 52-RU, a 106-RU, a 242-RU, a 484-RU, and the like may be used in an example of FIG. 9. Further, five DC tones may be inserted in a center frequency, 12 tones may be used for a guard band in the leftmost band of the 40 MHz band, and 11 tones may be used for a guard band in the rightmost band of the 40 MHz band.

As illustrated, when the layout of the RUs is used for a single user, a 484-RU may be used. The specific number of RUs may be changed similarly to FIG. 8.

Figure 10:
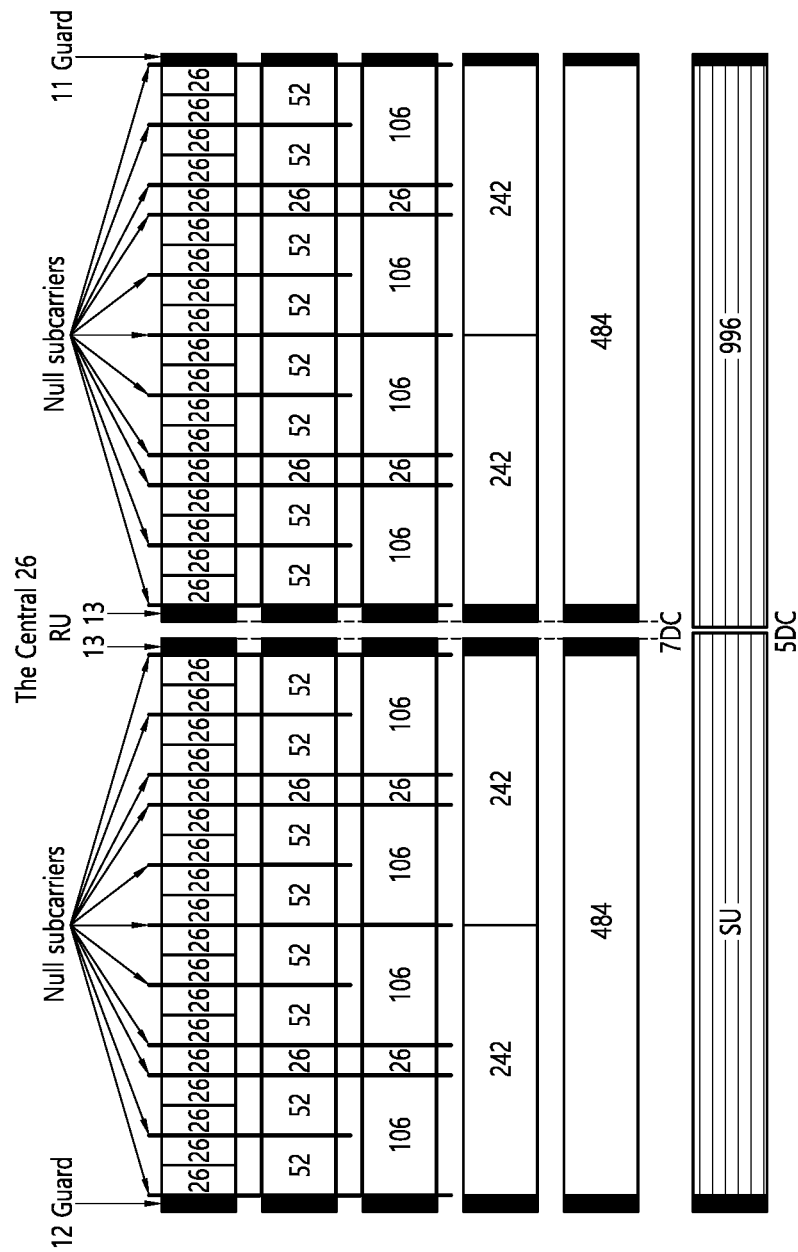
FIG. 10 illustrates a layout of RUs used in an 80 MHz band.

FIG. 10 illustrates a layout of RUs used in a band of 80 MHz.

Similarly to FIG. 8 and FIG. 9 in which RUs having various sizes are used, a 26-RU, a 52-RU, a 106-RU, a 242-RU, a 484-RU, a 996-RU, and the like may be used in an example of FIG. 10. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated, when the layout of the RUs is used for a single user, a 996-RU may be used, in which case five DC tones may be inserted.

The specific number of RUs may be changed similarly to FIG. 8 and FIG. 9.

Figure 11:
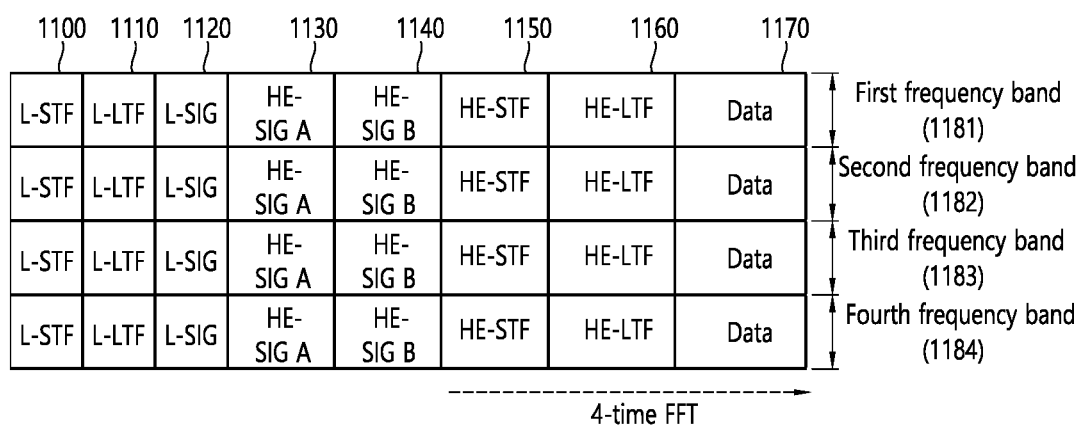
FIG. 11 is a diagram illustrating another example of an HE-PPDU.

FIG. 11 is a diagram illustrating another example of the HE-PPDU.

An L-STF 1100 may include a short training orthogonal frequency division multiplexing (OFDM) symbol. The L-STF 1100 may be used for frame detection, automatic gain control (AGC), diversity detection, and coarse frequency/time synchronization.

An L-LTF 1110 may include a long training orthogonal frequency division multiplexing (OFDM) symbol. The L-LTF 1110 may be used for fine frequency/time synchronization and channel prediction.

An L-SIG 1120 may be used for transmitting control information. The L-SIG 1120 may include information about a data rate and a data length. Further, the L-SIG 1120 may be repeatedly transmitted. That is, a format in which the L-SIG 1120 is repeated (which may be referred to, for example, as an R-LSIG) may be configured.

An HE-SIG-A 1130 may include control information common to a receiving STA.

Specifically, the HE-SIG-A 1130 may include information about 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to an HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A specific field of the HE-SIG-A may be added or partially omitted. Further, some fields of the HE-SIG-A may be partially added or omitted in other environments other than a multi-user (MU) environment.

Further, the HE-SIG-A 1130 may include two parts of an HE-SIG-A1 and an HE-SIG-A2. The HE-SIG-A1 and the HE-SIG-A2 included in the HE-SIG-A may be defined as follows depending on PPDUs. First, an HE-SIG-A field of an HE SU PPDU may be defined as follows.

TABLE 3

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PEDU from an HE TB PPDU: Set to 1 for an HE SU PPDU and HE ER SU PPDU |
| | B1 | Beam Change | 1 | Set to 1 to indicate that the pre-HE modulated fields of the PPDU are spatially mapped differently from the first symbol of the HE-LTF. Equation (28-6). Equation (28-9), Equation (28-12), Equation (28-14), Equation (28-16) and Equation (28-18) apply if the Beam Change field is set to 1. Set to 0 to indicate that the pre-HE modulated fields of the PPDU are spatially mapped the same way as the first symbol of the HE-LTF on each tone. Equation (28-8), Equation (28-10), Equation (28-13), Equation (28-15), Equation (28-17) and Equation (28-19) apply if the Beam Change field is set to 0. |
| | B2 | UL/DL | 1 | Indicates whether the PPDU is sent UL or DL. Set to the value indicated by the TXVECTOR parameter UPLINK_FLAG. |
| | B3 | MCS | 4 | For an HE SU PPDU: Set to n for MCSn, where n = 0, 1, 2, . . . , 11 Values 12-15 are reserved For HE ER SU PPDU with Bandwidth field set to 0 (242-tone RU): Set to n for MCSn, where n = 0, 1, 2 Values 3-15 are reserved For HE ER SU PPDU with Bandwidth field set to 1 (upper frequency 106-tone RU): Set to 0 for MCS 0 Values 1-15 are reserved |
| | B7 | DCM | 1 | Indicates whether or not DCM is applied to the Data field the the MCS indicated. If the STBC field is 0, then set to 1 to indicate that DCM is applied to the Data field. Neither DCM nor STBC shall be applied if both the DCM and STBC are set to 1. Set to 0 to indicate that DCM is not applied to the Data field. NOTE-DCM is applied only to HE-MCSs 0, 1, 3 and DCM is applied only to 1 and 2 spatial streams. DCM is not applied in combination with STBC. |
| | B8-B13 | BSS Color | 6 | The BSS Color field is an identifier of the BSS. Set to the value of the TXVECTOR parameter BSS_-COLOR. |
| | B14 | Reserved | 1 | Reserved and set to 1 |
| | B15-B18 | Spatial Reuse | 4 | Indicates whether or not spatial reuse is allowed during the transmission of this PPDU. Set to a value from Table 28-21 (Spatial Reuse field encoding for an HE SU PPDU, HE ER SU PPDU, and HE MU PPDU), see 27.11.6 (SPATIAL_REUSE). Set to SRP_DISALLOW to prohibit SRP-based spatial reuse during this PPDU. Set to SRP_AND_NON_S-RG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B20 | Bandwidth | 2 | For an HE SU PPDU: Set to 0 for 20 MHz Set to 1 for 40 MHz Set to 2 for 80 MHz Set to 3 for 160 MHz and 80 + 80 MHz For an HE ER SU PPDU: Set to 0 for 242-tone RU Set to 1 Dr upper frequency 106-tone RU within the primary 20 mHz Values 2 and 3 are reserved |

TABLE 3-continued

| Two Parts of HE-SIG-A | Bit | Field | Number of bits | Description |
|---|---|---|---|---|
| | B21-B22 | GI +LTF Size | 2 | Indicates the GI duration and HE-LTF size.<br>Set to 0 to indicate a 1x HE-LTF and 0.8 μs GI<br>Set to 1 to indicate a 2x HE-LTF and 0.8 μs GI<br>Set to 2 to indicate a 2x HE-LTF and 1.6 μs GI<br>Set to 3 to indicate:<br>a 4x HE-LTF and 0.8 μs GI if both the DCM and STBC fields are 1. Neither DCM nor STBC shall be applied if both the DCM and STBC fields are set to 1.<br>a 4x HE-LTF and 3.2 μs GI, otherwise |
| | B23-B25 | NSTS And Midamble Periodicity | 3 | If the Doppler field is 0, indicates the number of space-time streams.<br>Set to the number of space-time streams minus 1<br>For an HE ER SU PPDU, values 2 to 7 are reserved<br>If the Doppler field is 1, then B23-B24 indicates the number of space time streams, up to 4, and B25 indicates the midamble periodicity.<br>B23-B24 is set to the number of space time streams minus 1.<br>For an HE ER SU PPDU, values 2 and 3 are reserved<br>B25 is set to 0 if TXVECTOR parameter MIDAMBLE_PERIODICITY is 10 and set to i if TXVECTOR parameter MIDAMBLE_PERIODICITY is 20. |
| HE-SIG-A2 (HE SU PPDU) or HE-SIG-A3 (HE ER SU PPDU) | B0-B6 | TXOP | 7 | Set to 127 to indicate no duration information if TX VECTOR parameter TXOP_DURATION is set to UNSPECIFIED.<br>Set to a value less than 127 to indicate duration information for NAV setting and protection of the TXOP as follows:<br>If TXVECTOR parameter TXOP_DURATION is less than 512, then B0 is set to 0 and B1-B6 is set to floor (TXOP_DURATION/8).<br>Otherwise, B0 is set to 1 and B1-B6 is set to floor ((TXOP_DURATION-512)/128).<br>where<br>B0 indicates the TXOP length granularity. Set to 0 for 8 μs; otherwise set to 1 for 128 μs.<br>B1-B6 indicates the scaled value of the TXOP_DURATION |
| | B7 | Coding | 1 | Indicates whether BCC or LDPC is used:<br>Set to 0 to indicate BCC<br>Set to 1 to indicate LDPC |
| | B8 | LDPC Extra Symbol Segment | 1 | Indicates the presence of the extra OFDM symbol segment for LDPC:<br>Set to 1 if an extra OFDM symbol segment for LDPC is present<br>Set to 0 if an extra OFDM symbol segment for LDPC is not present<br>Reserved and set to 1 if the Coding field is set to 0. |
| | B9 | STBC | 1 | If the DCM field is set to 0, then set to 1 if space time block coding is used. Neither DCM nor STBC shall be applied if both the DCM field and STBC field are set to 1.<br>Set to 0 otherwise. |
| | B10 | Beam-formed | 1 | Set to 1 if a beamforming steering matrix is applied to the waveform in an SU transmission.<br>Set to 0 otherwise. |
| | B11-B12 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B13 | PE Disambiguity | 1 | Indicates PE disambiguity as defined in 28.3.12 (Packet extension). |
| | B14 | Reserved | 1 | Reserved and set to 1 |
| | B15 | Doppler | 1 | Set to 1 if one of the following applies:<br>The number of OFDM symbols in the Data field is larger than the signaled midamble periodicity plus 1 and the midamble is present<br>The number of OFDM symbols in the Data field is less than or equal to the signaled mid-amble periodicity plus 1 (see 28.3.11.16 Midamble), the midamble is not present, but the channel is fast varying. It recommends that midamble may be used for the PPDUs of the reverse link.<br>Set to 0 otherwise. |

TABLE 3-continued

| Two Parts of HE-SIG-A | Bit | Field | Number of bits | Description |
|---|---|---|---|---|
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

Further, an HE-SIG-A field of an HE MU PPDU may be defined as follows.

TABLE 4

| Two Parts of HE-SIG-A | Bit | Field | Number of bits | Description |
|---|---|---|---|---|
| | B0 | UL/DL | 1 | Indicates whether the PPDU is sent UL or DL. Set to the value indicated by the TX VECTOR parameter UPLINK_FLAG.<br>NOTE-The TDLS peer can identify the TDLS frame by ToDs and From DS fields in the MAC header of the MPDU. |
| | B1-B3 | SIGB MCS | 3 | Indicates the MCS of the HE-SIG-B field:<br>Set to 0 for MCS 0<br>Set to 1 for MCS 1<br>Set to 2 for MCS 2<br>Set to 3 for MCS 3<br>Set to 4 for MCS 4<br>Set to 5 for NCS 5<br>The values 6 and 7 are reserved |
| | B4 | SIGB DCM | 1 | Set to 1 indicates that the HE-SIG-B is modulated with DCM for the MCS.<br>Set to 0 indicates that the HE-SIG-B is not modulated with DCM for the MCS.<br>NOTE-DCM is only applicable to MCS 0, MCS 1, MCS 3, and MCS 4. |
| | B5-B10 | BSS Color | 6 | The BSS Color field is an identifier of the BSS.<br>Set to the value TXVECTOR parameter BSS_-COLOR. |
| | B11-B14 | Spatial Reuse | 4 | Indicates whether or not spatial reuse is allowed during the transmission of this PPDU.<br>Set to the value of the SPATIAL_REUSE parameter of the TXVECTOR, which contains a value from Table 28-21 (Spatial Reuse field encoding for an HE SU PPDU, HE ER SU PPDU, and HE MU PPDU) (see 27.11.6 (SPATIAL REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spa-tial reuse during this PPDU. For the interpretation of other values see 27.11.6 (SPATIAL_REUSE) and 27.9 (Spatial reuse operation). |
| | B15-B17 | Banwidth | 3 | Set to 0 for 20 MHz.<br>Set to 1 for 40 MHz.<br>Set to 2 for 80 MHz non-preamble puncturing mode.<br>Set to 3 for 160 MHz and 80 + 80 MHz non-preamble puncturing mode.<br>If the SIGB Compression field is 0:<br>Set to 4 for preamble puncturing in 80 MHz, where in the preamble only the secondary 20 MHz is punc-tured.<br>Set to 5 for preamble puncturing in 80 MHz, where in the preamble only one of the two 20 MHz sub-channels in secondary 40 MHz is punctured.<br>Set to 6 for preamble puncturing in 160 MHz or 80 + 80 MHz, where in the primary 80 MHz of the preamble only the secondary 20 MHz is punctured.<br>Set to 7 for preamble puncturing in 160 MHz or 80 + 80 MHz, where in the primary 80 MHz of the preamble the primary 40 MHz is present.<br>If the SIGB Compression field is 1 then values 4-7 are reserved. |

TABLE 4-continued

| Two Parts of HE-SIG-A | Bit | Field | Number of bits | Description |
|---|---|---|---|---|
| | B18-B21 | Number Of HE-SIG-B Symbols Or MU-MIMO Users | 4 | If the HE-SIG-B Compression field is set to 0, indicates the number of OFDM symbols in the HE-SIG-B field: Set to the number of OFDM symbols in the HE-SIG-B field minus 1 if the number of OFDM symbols in the HE-SIG-B field is less than 16; Set to 15 to indicate that the number of OFDM symbols in the HE-SIG-B field is equal to 16 if Longer Than 16 HE SIG-B OFDM Symbols Support subfield of the HE Capabilities element transmitted by at least one recipient STA is 0; Set to 15 to indicate that the number of OFDM symbols in the HE-SIG-B field is greater than or equal to 16 if the Longer Than 16 HE SIG-B OFDM Symbols Support subfield of the HE Capabilities element transmitted by all the recipient STAs are 1 and if the HE-SIG-B data rate is less than MCS 4 without DCM. The exact number of OFDM symbols in the HE-SIG-B field is calculated based on the number of User fields in the HE-SIG-B content channel which is indicated by HE-SIG-B common field in this case. If the HE-SIG-B Compression field is set to 1, indicates the number of MU-MIMO users and is set to the number of NU-MIMO users minus 1. |
| | B22 | SIGB Compression | 1 | Set to 0 if the Common field in HE-SIG-B is present. Set to 1 if the Common field in HE-SIG-B is not present. |
| | B23-B24 | GI + LTF Size | 2 | Indicates the GI duration and HE-LTF size: Set to 0 to indicate a 4x HE-LTF and 0.8 μs GI Set to 1 to indicate a 2x HE-LTF and 0.8 μs GI Set to 2 to indicate a 2x HE-LTF and 1.6 μs GI Set to 3 to indicate a 4x HE-LTF and 3.2 μs GI |
| | B25 | Doppler | 1 | Set to 1 if one of the following applies: The number of OFDM symbols in the Data field is lager than the signaled midamble periodicity plus 1 and the midamble is present The number of OFDM symbols in the Data field is less than or equal to the signaled mid-amble periodicity plus 1 (see 28.3.11 16 Mid-amble), the midamble is not present, but the channel is fast varying. It recommends that midamble may be used for the PPDUs of the reverse link. Set to 0 otherwise. |
| HE-SIG-A2 | B0-B6 | TXOP | 7 | Set to 127 to indicate no duration information if TXVECTOR parameter TXOP_DURA-TION is set to UNSPECIFIED. Set to a value less than 127 to indicate duration information for NAV setting and protection of the TXOP as follows: If TXVECTOR parameter TXOP_DURATION is less than 512, then B0 is set t0 0 and B1-B6 is set to floor(TXOP_DURATION/8). Otherwise, B0 is set to 1 and B1-B6 is set to floor ((TXOP_DURAT1ON-512)/128). where B0 indicates the TXOP length granularity. Set to 0 for 8 μs; otherwise set to 1 for 128 μs. B1-B6 indicates the scaled value of the TXOP_DURATION |
| | B7 | Reserved | 1 | Reserved and set to 1 |
| | B8-B10 | Number of HE-LTF Symbols And Midamble Periodicity | 3 | If the Doppler field is set to 0, indicates the number of HE-LTF symbols: Set to 0 for 1 HE-LTF symbol Set to 1 for 2 HE-LTF symbol Set to 2 for 4 HE-LTF symbol Set to 3 for 6 HE-LTF symbol Set to 4 for 8 HE-LTF symbol Other values are reserved. If the Doppler field is set to 1, B8-B9 indicates the number of HE-LTF symbols and B10 indicates midamble periodicity: B8-B9 is encoded as follows: 0 indicates 1 HE-LTF symbol 1 indicates 2 HE-LTF symbols 2 indicates 4 HE-LTF symbols 3 is reserved B10 is set to 0 if the TXVECTOR parameter MIDAMBLE_PERIODICITY is 10 and set to 1 if the TXVECTOR parameter PREAMBLE_PERIODICITY is 20. |

TABLE 4-continued

| Two Parts of HE-SIG-A | Bit | Field | Number of bits | Description |
|---|---|---|---|---|
| | B11 | LDPC Extra Symbol Segment | 1 | Indication of the presence of the extra OFDM symbol segment for LDPC. Set to 1 if an extra OFDM symbol segment for LDPC is present. Set to 0 otherwise. |
| | B12 | STBC | 1 | In an HE MU PPDU where each RU includes no more than 1 user, set to 1 to indicate all RUs are STBC encoded in the payload, set to 0 to indicate all RUs are not STBC encoded in the payload. STBC does not apply to HE-SIG-B. STBC is not applied if one or more RUs are used for MU-MIMO allocation. |
| | B13-B14 | Pre-FEC Padding Factor | 2 | Indicates the pre-FEC padding factor. Set to 0 to indicate a pre-FEC padding factor of 4 Set to 1 to indicate a pre-FEC padding factor of 1 Set to 2 to indicate a pre-FEC padding factor of 2 Set to 3 to indicate a pre-FEC padding factor of 3 |
| | B15 | PE Disambiguity | 1 | Indicates PE disambiguity as defined in 28.3.12 (Packet extension). |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

Further, an HE-SIG-A field of an HE TB PPDU may be defined as follows.

TABLE 5

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 0 for an HE TB PPDU |
| | B1-B6 | BSS Color | 6 | The BSS Color field is an identifier of the BSS. Set to the value of the TXVECTOR parameter BSS_COLOR. |
| | B7-B10 | Spinal Reuse | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz then this Spatial Reuse field applies to the first 20 MHz subband. If the Bandwidth field indicates 160/80 + 80 MHz then this Spatial Reuse field applies to the first 40 MHz sub-band of the 160 MHz operating band. Set to the value of the SPATIAL_REUSE(1) parameter of the TXVECTOR, which contains a value from Table 28-22 (Spatial Reuse field encoding for an HE TB PPDU) for an HE TB PPDU (see 27.11.6 SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.5 (SPATIAL_REUSE) and 27.9 Spatial reuse operation). |
| | B11-B14 | Spatial Reuse | 4 | Indicates whether or not spatial reuse is allowed in a subband of the PPDU during the transmission of this PPDU, and if allowed, indicates, a value that is used to determine a limit on the transmit power of a spatial reuse transmission. If the Bandwidth field indicates 20 MHz, 40 MHz, or 80 MHz: This Spatial Reuse field applies to the second 20 MHz subband. |

TABLE 5-continued

| Two Parts of HE-SIG-A | Bit | Field | Number of bits | Description |
|---|---|---|---|---|
| | | | | If the STA operating channel width is 20 MHz, then this field is set to the same value as Spatial Reuse 1 field. If the STA operating channel width is 40 MHz in the 2.4 GHz band, this field is set to the same value as Spatial Reuse 1 field. If the Bandwidth field indicates 160/80 + 80 MHz the this Spatial Reuse field applies to the second 40 MHz subband of the 160 MHz operating band. Set to the value of the SPATIAL_REUSE(2) parameter of the TXVECTOR, which contains a value from Table 28-22 (Spatial Reuse field encoding for an HE TB PPDU) for an HE TB PPDU (see 27.11.6 (SPATIAL REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spa-tial reuse during this PPDU. For the interpretation of other values see 27.11.6 (SPATIAL_REUSE) and 27.9 (Spatial reuse operation). |
| | B15-B18 | Spatial Reuse 3 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz: This Spatial Reuse field applies to the third 20 MHz subband. If the STA operating channel width is 20 MHz or 40 MHz, this field is set to the same value as Spatial Reuse 1 field. If the Bandwidth field indicates 160/80 + 80 MHz: This Spatial Reuse field applies to the third 40 MHz subband of the 160 MHz operating band. If the STA operating channel width is 80 + 80MHz, this field is set to the same value as Spatial Reuse 1 field. Set to the value of the SPATIAL REUSE(3)parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spa-tial reuse during this PPDU. For the interpretation of other values 27.11.6 (SPATIAL_REUSE) and 27.9 (Spatial reuse operation). |
| | B19-B22 | Spatial Reuse | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz: This Spatial Reuse field applies to the fourth 20 MHz subband. If the STA operating channel width is 20 MHz, then this field is set to the same value as Spatial Reuse 1 field. If the STA operating channel width is 40 MHz, then this field is set to the same value as Spatial Reuse 2 field. If the Bandwidth field indicates 160/80 + 80 MHz: This Spatial Reuse field applies to the fourth 40 MHz subband of the 160 MHz operating band. If the STA operating channel width is 80 + 80 MHz, then this field is set to same value as Spatial Reuse 2 field. Set to the value of the SPATIAL_REUSE(4) parameter of the TXVECTOR, which contains a value from Table 28-22 (Spatial Reuse field encoding for an HE TB PPDU) for an HE TB PPDU (see 27.11.6 (SPATIAL_REUSE)). |

TABLE 5-continued

| Two Parts of HE-SIG-A | Bit | Field | Number of bits | Description |
|---|---|---|---|---|
| | | | | Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spa-tial reuse during this PPDU. For the interpretation of other values see 27.11.6 (SPATIAL_REUSE) and 27.9 (Spatial reuse operation). |
| | B23 | Reserved | 1 | Reserved and set to 1. NOTE-Unlike other Reserved fields in HE-SIG-A of the HE TB PPDU, B23 does not have a corresponding bit in the Trigger frame. |
| | B24-B25 | Bandwidth | 2 | Set to 0 for 20 MHz Set to 1 for 40 MHz Set to 2 for 80 MHz Set to 3 for 160 MHz and 80 + 80MHz |
| HE-SIG-A2 | B0-B6 | TXOP | 7 | Set to 127 to indicate no duration information if TXVECTOR parameter TXOP_DURA-TION is set to UNSPECIFIED. Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8). Otherwise, B0 is set to 1 and B1-B6 is set to floor ((TXOP_DURATION-512)/128). where B0 indicates the TXOP length granularity. Set to 0 for 8 µs; otherwise set to 1 for 128 µs. B1-B6 indicates the scaled value of the T'XOP_DU-RATION |
| | B7-B15 | Reserved | 9 | Reserved and set to value indicated in the UL HE-SIG-A2 Reserved subfield in the Trigger frame. |
| | B16-B19 | CRC | 4 | CRC of bits 0-41 (of the HE-SIG-A field. See 28.3.10.7.3 (CRC computation). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

An HE-SIG-B 1140 may be included only in the case of the PPDU for the multiple users (MUs) as described above. Basically, an HE-SIG-A 1150 or the HE-SIG-B 1160 may include resource allocation information (or virtual resource allocation information) for at least one receiving STA.

Figure 12:
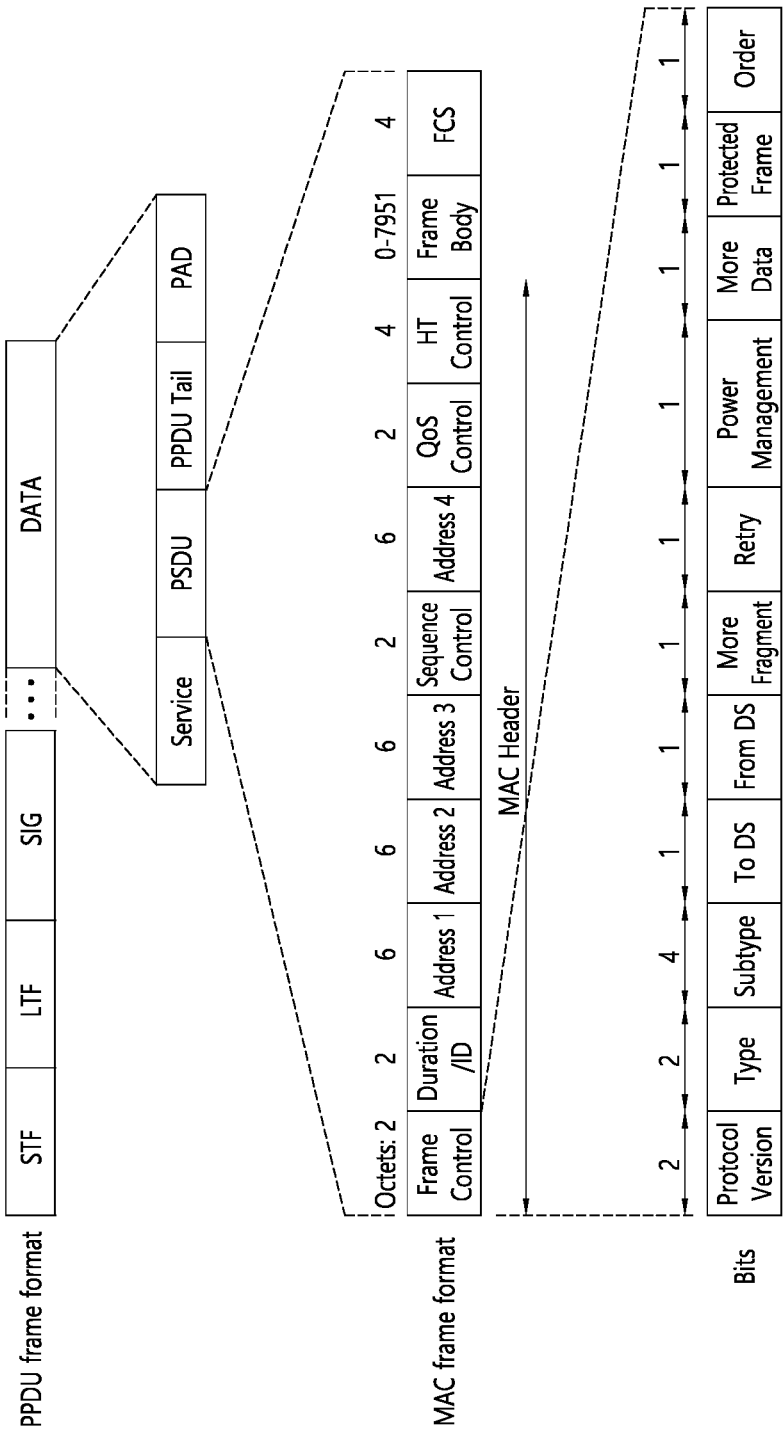
FIG. 12 is a diagram for describing an example of a frame structure used in IEEE 802.11 systems.

FIG. 12 is a diagram for describing an example of a frame structure used in IEEE 802.11 systems. An STF, an LTF, and a SIG field illustrated in FIG. 12 may be the same as or equivalent to the (HT/VHT/EHT)-STF, the LTF, and the SIG field illustrated in FIG. 7 or FIG. 11. Further, a data field illustrated in FIG. 12 may be the same as or equivalent to a data field illustrated in FIG. 7 or FIG. 11.

The data field may include a service field, a physical layer service data unit (PSDU), and a PPDU tail bit, and may optionally include a padding bit. Some bits of the service field may be used for synchronization of a descrambler at a receiving end. The PSDU may correspond to a MAC protocol data unit (MPDU) defined in a MAC layer and may include data generated/used in a higher layer. The PPDU tail bit may be used to return an encoder to a zero state. The padding bit may be used to adjust the length of the data field in a specific unit.

The MPDU is defined according to various MAC frame formats, and a basic MAC frame includes a MAC header, a frame body, and a frame check sequence (FCS). The MAC frame may include an MPDU and may be transmitted/ received through a PSDU of a data part of a PPDU frame format.

The MAC header includes a fr4ame control field, a duration/ID field, an address field, or the like. The frame control field 6 may include control information required for frame transmission/reception. The duration/ID field may be set to a time for transmitting a corresponding frame or the like.

The duration/ID field included in the MAC header may be set to a 16-bit length (e.g., B0 to B15). Content included in the duration/ID field may vary depending on a frame type and a subtype, whether it is transmitted during a contention free period (CFP), QoS capability of a transmitting STA, or the like. (i) In a control frame of which a subtype is PS-poll, the duration/ID field may include an AID of a transmitting STA (e.g., through 14 LSBs), and two MSBs may be set to 1. (ii) In frames transmitted by a point coordinator (PC) or a non-QoS STA during a CFP, the duration/ID field may be set to a fixed value (e.g., 32768). (iii) In other frames transmitted by the non-QoS STA or control frames transmitted by the QoS STA, the duration/ID field may include a duration value defined for each frame type. In a data frame or management frame transmitted by the QoS STA, the duration/ID field may include a duration value defined for each frame type. For example, if the duration/ID field is set to B15, the duration/ID field is used to indicate a TXOP duration, and B0 to B14 may be used to indicate an actual TXOP duration. The actual TXOP duration indicated by B0 to B14 may be any one of 0 to 32767, and a unit thereof may be a microsecond (µ). However, if the duration/ID field indicates a fixed TXOP duration value (e.g., 32768), B15=1 and B0 to B14. If set to B14=1 and B15=1, the duration/ID field is used to indicate an AID, and B0 to B13 indicate one AID ranging from 1 to 2007.

A frame control field of the MAC header may include Protocol Version, Type, Subtype, To DS, From DS, More Fragment, Retry, Power Management, More Data, Protected Frame, and Order subfields.

FIG. 13 illustrates an example of a PPDU that can be used in an EHT system.

Referring to FIG. 13, an EHT PPDU may include features of some formats of the aforementioned HE-PPDU. Some or all parts (i.e., fields) may be divided into a plurality of subparts/subfields. Each field (and a subfield thereof) may be transmitted in units of 4 μs*N (N being an integer). Further, it may include a guard interval (or short GI) of a conventional Wi-Fi standard. A common subcarrier frequency spacing value (delta_f=312.5 kHz/N or 312.5 kHz*N, N=integer) may be applied to all of the illustrated fields, or first delta_f may be applied to the first part (e.g., all Legacy-Part and all/a part of SIG-Part) and second delta_f (e.g., a value smaller than first delta_f) may be applied to all/a part of the remaining parts.

Some of the illustrated fields may be omitted, and the order of the fields is exemplary and thus may be changed in various manners. For example, a subfield (e.g., EHT-SIG-A) of an SIG-Part 200 may be disposed before an STF-Part 300 and the remaining subfields (e.g., EHT-SIG-B/C) of the SIG-Part 200 may be disposed after the STF-P art 300.

The EHT-PPDU may be divided into various formats. For example, a separate format only for single user (SU) communication may be defined and a separate format only for multi-user (MU) communication may be defined. Fields (or subfields) according to each format may be arranged/omitted in various manners.

The illustrated Legacy Part 100 may include at least one of the legacy Non-HT Short Training Field (L-STF), Non-HT Long Training Field (L-LTF), and Non-HT Signal Field (L-SIG).

The illustrated SIG-Part 200 may include various types of control information for a transmitted PPDU. For example, it may include control information for decoding of the STF-Part 300, the LTF-Part 400, and Data 500. For example, it may include all/some of the information included in the aforementioned HE-SIG-A information and HE-SIG-B information.

The illustrated STF-Part 300 may include the aforementioned training field (i.e., STF sequence). The STF sequence proposed in the present disclosure can reduce a PAPR. In addition, it can assist a receiving STA in setting an AGC gain through a repeated pattern.

The illustrated LTF-Part 400 may include a training field (i.e., LTF sequence) for channel estimation.

The data field 500 may include user data and a packet for a higher layer. That is, it may include a MAC-PDU.

In the conventional 11ax, a tone plan for full band and OFDMA transmission is designed at 20/40/80/80+80/160 MHz, and a 160 MHz tone plan is used by simply repeating the existing 80 MHz tone plan two times. This is designed by considering a case of performing transmission based on two RFs. And, therefore, this may be an appropriate tone plan for a case of non-contiguous 80+80 MHz. However, in a case of contiguous 160 MHz, a situation where transmission is performed by using one RF may be considered. And, in this case, since a large number of subcarriers are wasted in the existing (or conventional) tone plan, a new tone plan for increasing efficiency and throughput of the subcarriers that are being used may be proposed.

1. New 160 MHz Tone Plan

<Full Band>

In case of performing transmission by using a full band, anew RU may be proposed, and a size of the new RU may be determined by considering various DCs in accordance with an influence of a DC offset and by considering a 160 MHz Guard tone of the conventional 11ax. The existing 11ax guard tones are left 12 and right 11, and the number of DCs of 80 MHz is equal to 5 or 7. Based on this structure, the new RU of a full band is 2020RU or 2018RU.

12/11 guard tone, 5DC, 2020RU

12/11 guard tone, 7DC, 2018RU

Considering the influence of the DC offset at 160 MHz, it is not preferable to use less than 5/7 DCs, which is the number(s) of DCs used at 80 MHz, and 5/7 DCs may be sufficient in light of performance (or capability). Considering the following OFDMA tone plan, a maximum of 7 DCs may be appropriate. The DCs in the OFDMA tone plan shown below are designed based on 7DC and 5DC in the existing 80 MHz OFDMA tone plan. And, it is not preferable to use DCs that are less than 5 DCs, and, in light of performance, 5/7 DCs may be sufficient. 7DC is used at 20 MHz and 80 MHz, wherein central 26RU (13+13 RUs) is used in the existing 11ax.

<OFDMA Tone Plan>

The OFDMA tone plan may be expressed by using the existing 996RU and 26RU (13+13 RUs) as shown below. In the following structure, G denotes guard tone, and N denotes null tone.

12G+996RU+13RU+7DC+13RU+996RU+11G

12G+996RU+1N+13RU+5DC+13RU+1N+996RU+11G

In the structures presented above, the number of DCs and the number of null subcarriers on both sides may be configured by the performance of the central 26RU (13+13 RUs) according to the influence of the DC offset and interference. Considering the influence of interference, 5 DCs and 1 null carrier on both sides may be an advantageous structure.

Two types of configurations of 996RU may be proposed as follows.

996RU=484RU+1N+26RU+1N+484RU

996RU=1N+484RU+26RU+484RU+1N

The first structure is configured to reduce the influence of the interference from/to an adjacent RU by putting a null tone on both sides of the 26RU, and the second structure is configured to reduce the influence of the interference between 484RU and its adjacent RU. Since a RU using a small number of subcarriers, such as 26RU, causes significant influence on performance, it may be preferable to use the first structure.

The 484RU has a structure of two 242RUs as in the existing 11ax.

484RU=242RU+242RU

The 242RU has the following structure as in the existing 11ax.

242RU=1N+106RU+1N+26RU+1N+106RU+1N

The 106RU has the following structure as in the existing 11ax.

106RU=52RU+2N+52RU

The 52RU has the following structure as in the existing 11ax.

52RU=26RU+26RU 2. 320 MHz tone plan

The configuration of 320 MHz may consider various options as follows.

Option 1: Combination of four existing 11ax 80 MHz tone plans

This combination takes into account both contiguous and non-contiguous situations and may be expressed as shown below.

80+80+80+80 MHz/160+80+80 MHz/80+160+80 MHz/ 80+80+160 MHz/240+80 MHz/80+240 MHz/320 MHz

+ means a non-contiguous situation, and 160/240/320 means that 2/3/4 of 80 MHz tone plans are contiguously aligned in succession.

<In Case there is a Contiguous Band>

In case 160 MHz is used, a tone index of the 80 MHz tone plan on the left side is tone index −512 of the existing 80 MHz tone plan, and a tone index of the 80 MHz tone plan on the right side is tone index +512 of the existing 80 MHz tone plan.

In case 240 MHz is used, atone index of the 80 MHz tone plan in the middle is the same as the tone index of the existing 80 MHz tone plan, and a tone index of the leftmost 80 MHz tone plan is tone index −1024 of the existing 80 MHz tone plan, and a tone index of the rightmost 80 MHz tone plan is tone index +1024 of the existing 80 MHz tone plan.

In case 320 MHz is used, a tone index of a first 80 MHz tone plan starting from the left is tone index −1536 of the existing 80 MHz tone plan, and a tone index of a second 80 MHz tone plan is tone index −512 of the existing 80 MHz tone plan, and a tone index of a third 80 MHz tone plan is tone index +512 of the existing 80 MHz tone plan, and a tone index of a fourth 80 MHz tone plan is tone index +1536 of the existing 80 MHz tone plan.

The various non-contiguous combinations presented above may also use different bands as well as the same band. For example, at 80+160+80 MHz, each 80/160/80 MHz bandwidth may be transmitted by using the 2.4 GHz/5 GHz/6 GHz band.

Option 2: Combination of Two New 160 MHz Tone Plans

This combination takes into account both contiguous and non-contiguous situations and may be expressed as shown below.

160+160 MHz/320 MHz

+ means a non-contiguous situation, and 320 MHz means that two new 160 MHz tone plans are contiguously aligned.

<In Case there is a Contiguous Band>

In case 320 MHz is used, a tone index of the 160 MHz tone plan on the left side is tone index −1024 of a new 160 MHz tone plan, and a tone index of the 160 MHz tone plan on the right side is tone index +1024 of anew 160 MHz tone plan.

The non-contiguous combination presented above may also use different bands as well as the same band. For example, at 160+160 MHz, each 160 MHz bandwidth may be transmitted by using the 2.4 GHz/5 GHz band.

Option 3: Combination of Two Existing Flax 80 MHz Tone Plans and One New 160 MHz Tone Plan This combination takes into account both contiguous and non-contiguous situations and may be expressed as shown below.

c80+c80+n160 MHz/c80+n160 MHz+c80/n160+c80+ c80 MHz/cc160+n160 MHz/n160+cc160 MHz/ncc320 MHz/cnc320 MHz/ccn320 MHz + means a non-contiguous situation, and each of c80 MHz, cc160 MHz, and n160 MHz means the existing 11ax 80 MHz tone plan, two contiguous existing 11ax 80 MHz tone plans, and a new 160 MHz tone plan, respectively. ncc320 MHz/cnc320 MHz/ccn320 MHz means a contiguous alignment of a new 160 MHz tone plan and two existing 11ax 80 MHz tone plans. And, ncc/cnc/ccn indicates a contiguous (or sequential) order of each tone plan.

<In Case there is a Contiguous Band>

In case cc160 MHz is used, a tone index of the 80 MHz tone plan on the left side is tone index −512 of the existing 80 MHz tone plan, and a tone index of the 80 MHz tone plan on the right side is tone index +512 of the existing 80 MHz tone plan.

In case ncc320 MHz is used, a tone index of the 160 MHz tone plan on the left side is tone index −1024 of the new 160 MHz tone plan, a tone index of the next 80 MHz tone plan is tone index +512 of the existing 80 MHz tone plan, and a tone index of the last 80 MHz tone plan is tone index +1536 of the existing 80 MHz tone plan.

In case cnc320 MHz is used, a tone index of the 80 MHz tone plan on the left side is tone index −1536 of the existing 80 MHz tone plan, a tone index of the 160 MHz tone plan in the middle is the same tone index of the new 160 MHz tone plan, and a tone index of the last 80 MHz tone plan is tone index +1536 of the existing 80 MHz tone.

In case ccn320 MHz is used, a tone index of the 80 MHz tone plan on the left side is tone index −1536 of the existing 80 MHz tone plan, a tone index of the next 80 MHz tone plan is the tone index −512 of the existing 80 MHz tone plan, and a tone index of the last 160 MHz tone plan is tone index +1024 of the new 160 MHz tone plan.

In the option presented above, various combinations of tone plans having different structures of c80 and n160 may be considered. In this case, there lies a disadvantage in that an indication related to RU allocation may become very complicated. Therefore, in order to reduce signaling overhead, the combinations may be limited to using only structures having specific orders. For example, only c80+c80+ n160 MHz/ccn320 MHz may be used.

The various non-contiguous combinations presented above may also use different bands as well as the same band. For example, at c80+n160+c80 MHz, each c80/n160/c80 MHz bandwidth may be transmitted by using the 2.4 GHz/5 GHz/6 GHz band.

Option 4: Alternative 320 MHz Tone Plan Considering the Usage of One RF

In the case of contiguous 320 MHz, a situation where transmission is performed by using one RF may be considered. And, in this case, since 320 MHz, which is configured of a combination of 160 MHz or 80 MHz tone plans, has a large number of wasted subcarriers, a new tone plan may be proposed in order to increase efficiency and throughput of the subcarriers that are used. Various alternative tone plans will be proposed as follows.

A. Alternative 320 MHz Tone Plan 1

In case of configuring 320 MHz with two contiguous 160 MHz tone plans, 12 left/11 right guard tones are used, and these may be directly applied to the alternative 320 MHz tone plan without modification. Additionally, in case of performing transmission by using a full band, a new RU may be proposed, and various DCs may be considered according to the influence of the DC offset, and a size of the new RU may be determined by considering the guard tone size. The number of DCs of 80 MHz of the existing 11ax is equal to 5 or 7. And, considering this, the new RU of the full band is 4068RU or 4066RU.

12/11 guard tone, 5DC, 4068RU (RU subcarrier index is −2036:−3, 3:2036)

12/11 guard tone, 7DC, 4066RU (RU subcarrier index is −2036:−4, 4:2036)

Considering the effects of DC offset at 320 MHz, it is not preferable to use less than 5/7 DCs, which is the number of DCs used at 80 MHz, and 5/7 DCs may be sufficient in light of performance (or capability). Considering the OFDMA tone plan used in 2020RU, which is presented below, a maximum of 7 DCs may be appropriate. Since the number of DCs in the OFDMA tone plan is designed based on the 7 DCs used in the existing 11ax 80 MHz OFDMA tone plan, it is not preferable to use a number of DCs that is smaller than 7, and, in light of performance, 7 DCs may also be sufficient at 320 MHz.

The OFDMA tone plan may be expressed by using the existing 2020RU and 26RU (13+13 RUs) as shown below.

12G+2020RU+13RU+7DC+13RU+2020RU+11G

Two types of configurations of 2020RU may be proposed as follows.

2020RU=996RU+1N+26RU+1N+996RU
2020RU=1N+996RU+26RU+996RU+1N

The first structure is configured to reduce the influence of the interference from/to an adjacent RU by putting a null tone on both sides of the 26RU, and the second structure is configured to reduce the influence of the interference between 996RU and its adjacent RU. Since a RU using a small number of subcarriers, such as 26RU, causes significant influence on performance, it may be preferable to use the first structure.

Two types of configurations of 996RU may be proposed as in the new 160 MHz

996RU=484RU+1N+26RU+1N+484RU
996RU=1N+484RU+26RU+484RU+1N

The 484RU has a structure of two 242RUs as in the existing 11ax.

484RU=242RU+242RU

The 242RU has the following structure as in the existing 11ax.

242RU=1N+106RU+1N+26RU+1N+106RU+1N

The 106RU has the following structure as in the existing 11ax.

106RU=52RU+2N+52RU

The 52RU has the following structure as in the existing 11ax.

52RU=26RU+26RU 3. 240 MHz

An AP may transmit a PPDU by using a bandwidth of 240 MHz, and 240 MHz may be configured by combining three existing 11ax 80 MHz tone plans. This combination takes into account both contiguous and non-contiguous situations and may be expressed as follows. 80+80+80 MHz/160+80 MHz/80+160 MHz/240 MHz + means a non-contiguous situation, and 160/240 means that ⅔ of 80 MHz tone plans are contiguously aligned in succession.

<In Case there is a Contiguous Band>

In case 160 MHz is used, a tone index of the 80 MHz tone plan on the left side is tone index −512 of the existing 80 MHz tone plan, and a tone index of the 80 MHz tone plan on the right side is tone index +512 of the existing 80 MHz tone plan.

In case 240 MHz is used, atone index of the 80 MHz tone plan in the middle is the same as the tone index of the existing 80 MHz tone plan, and a tone index of the leftmost 80 MHz tone plan is tone index −1024 of the existing 80 MHz tone plan, and a tone index of the rightmost 80 MHz tone plan is tone index +1024 of the existing 80 MHz tone plan.

A pilot subcarrier shall also be calibrated according to its position. And, in case 160 MHz is used, a pilot tone index of the 80 MHz tone plan on the left side is pilot tone index −512 of the existing 80 MHz tone plan, and a pilot tone index of the 80 MHz tone plan on the right side is pilot tone index +512 of the existing 80 MHz tone plan.

In case 240 MHz is used, a pilot tone index of the 80 MHz tone plan in the middle is the same as the pilot tone index of the existing 80 MHz tone plan, and a pilot tone index of the leftmost 80 MHz tone plan is pilot tone index −1024 of the existing 80 MHz tone plan, and a pilot tone index of the rightmost 80 MHz tone plan is pilot tone index +1024 of the existing 80 MHz tone plan.

Alternatively, the existing 11ax 80 MHz tone plan and the new 160 MHz tone plan may be used, and both contiguous and non-contiguous situations may be considered and expressed as follows.

c80+n160 MHz/n160 MHz+c80/nc240 MHz/cn240 MHz

+ means a non-contiguous situation, and each of c80 MHz and n160 MHz means the existing 11ax 80 MHz tone plan and a new 160 MHz tone plan, respectively. nc240 MHz/cn240 MHz means a contiguous alignment of the new 160 MHz tone plan and the existing 11ax 80 MHz tone plan. And, nc/cn indicates a contiguous (or sequential) order of each tone plan.

In case nc240 MHz is used, a tone index of the 160 MHz tone plan on the left side is tone index −512 of the new 160 MHz tone plan, and a tone index of 80 MHz on the right side is tone index +1024 of the existing 80 MHz tone plan.

In case cn240 MHz is used, a tone index of the 80 MHz tone plan on the left side is tone index −1024 of the existing 80 MHz tone plan, and a tone index of 160 MHz on the right side is tone index +512 of the new 160 MHz tone plan.

A pilot subcarrier shall also be calibrated according to its position. And, in case nc240 MHz is used, a pilot tone index of the 160 MHz tone plan on the left side is pilot tone index −512 of the new 160 MHz tone plan, and a pilot tone index of 80 MHz on the right side is pilot tone index +1024 of the existing 80 MHz tone plan.

In case cn240 MHz is used, a pilot tone index of the 80 MHz tone plan on the left side is pilot tone index −1024 of the existing 80 MHz tone plan, and a pilot tone index of 160 MHz on the right side is pilot tone index +512 of the new 160 MHz tone plan.

The various non-contiguous combinations presented above may also use different bands as well as the same band. For example, at 80+80+80 MHz, each 80 MHz bandwidth may be transmitted by using the 2.4 GHz/5 GHz/6 GHz band.

More specifically, a tone plan of 240 MHz may be configured by broadly using 3 different methods.

Option 1: combination of three 80 MHz tone plans (80+80+80)

Option 2: combination of two 80 MHz tone plans and one new 160 MHz tone plan (160+80/80+160)

Option 3: alternative 240 MHz tone plan (240)

A non-contiguous situation may also be a case where different bands are used. An index of a RU subcarrier may be calibrated according to its position.

An index of a 240 MHz pilot subcarrier may be calibrated according to its position as follows.

160 MHz existing 80 MHz ±512 (RU tone index also the same)

240 MHz: existing 80 MHz+1024, existing 80 MHz (RU tone index also the same), new 160 MHz ±512 (RU tone index also the same)

Tone plan 1

In case of using a full band, a new RU may be proposed by considering the guard tones and DC tones. The existing 11ax 80 MHz and 160 MHz use 12 right and 11 left guard tones, and these guard tones are also used in 240 MHz without modification. When considering actual interference from an adjacent channel or interference to an adjacent channel, the usage of these guard tones shall not cause any significant problem. Additionally, a number of DCs equal to or greater than the number of DCs used in the existing 80 MHz, which is 5 or 7 DCs, shall be used. However, when considering the DC offset, the usage of 5 or 7 DCs shall not cause any significant problem. Considering this, a tone plan may be proposed as presented below. In the following, G denotes guard tone, and N denotes null tone.

1. Alternative 240 MHz Tone Plan 1
<Full Band Tone Plan>
12/11 guard, DC 5 or 7, RU 3044 or 3042
<OFMDA Tone Plan>
12G+996RU+1N+26RU+1N+996RU (5DC)+1N+26RU+1N+996RU+11G 996RU on both sides=484RU+1N+26RU+1N+484RU (ver1) (or 1N+484RU +26RU+484RU+1N (ver2))
996RU (5DC) in the middle=484RU+13RU+7DC+13RU+484RU (the same as existing 80 MHz)
484RU=242RU+242RU
242RU=1N+106RU+1N+26RU+1N+106RU+1N
106RU=52RU+2N+52RU
52RU=26RU+26RU In a full band, 5 or 7 DCs are configured according to the influence of the DC offset. The number of DCs may be smaller than that of 80 MHz/160 MHz but not larger than 7, which is used in OFDMA.

The two-configuration option of the 996RU on both sides may be viewed in light of ensured performance (or capability) of 26RU or ensured performance of 484RU. Configurations of the 996RU in the middle and the RUs that follow are the same as the existing ax.

More specifically, the configuration of the 996RU on both sides may be proposed in two different structures. A first structure is a structure that puts a null tone on both sides of the 26RU in order to reduce the influence of the interference to/from an adjacent RU, and a second structure is a structure that is capable of reducing the influence of the interference between the 484RU and its adjacent RU. Since a RU using a small number of subcarriers, such as 26RU, causes significant influence on performance, it may be preferable to use the first structure.

The 996RU in the middle uses the same 996RU tone plan of the existing 80 MHz without modification. Additionally, 484/242/106/52RU may use the same structure as the existing (or conventional) 11ax without modification.

4. Exemplary tone plans

Figure 14:
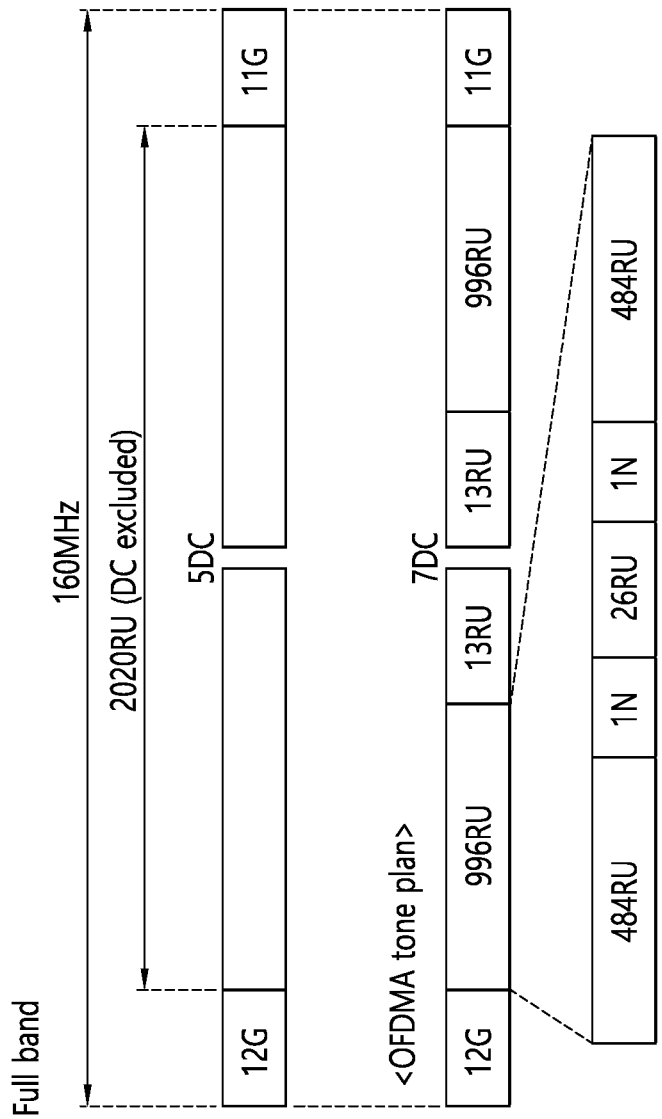
FIG. 14 illustrates an example of a tone plan in a 160 MHz band according to the present embodiment.

FIG. 14 shows an example of a tone plan in a 160 MHz band according to the present embodiment.

A tone plan in case of a full band and a tone plan in case of applying OFDMA are both illustrated in FIG. 14.

First, in case of the full band, a tone plan of 160 MHz may sequentially consist of 12 guard tones, 2020RU, 5 DC tones, and 11 guard tones. 5 DC tones may be located at the center of 160 MHz, and data may be transmitted in the 2020RU. However, FIG. 14 is for one embodiment only, and thus the 12 guard tones and the 11 guard tones may change in locations. When 7 DC tones are located at the center of 160 MHz, the data may be transmitted in 2018RU.

In case of applying OFDMA, a tone plan of 160 MHz may sequentially consist of 12 guard tones, 996RU, 13RU, 7 DC tones, 13RU, 996RU, and 11 guard tones. In addition, the 996RU may consist of 484RU, one null tone, 26RU, one null tone, and 484RU. However, FIG. 14 is for one embodiment only, and thus the 12 guard tones and the 11 guard tones may change in locations. The 996RU may consist of one null tone, 484RU, 26RU, 484RU, and one null tone.

The 484RU and subordinate RUs are not shown since they may have the same configuration as in the existing 11ax.

Figure 15:
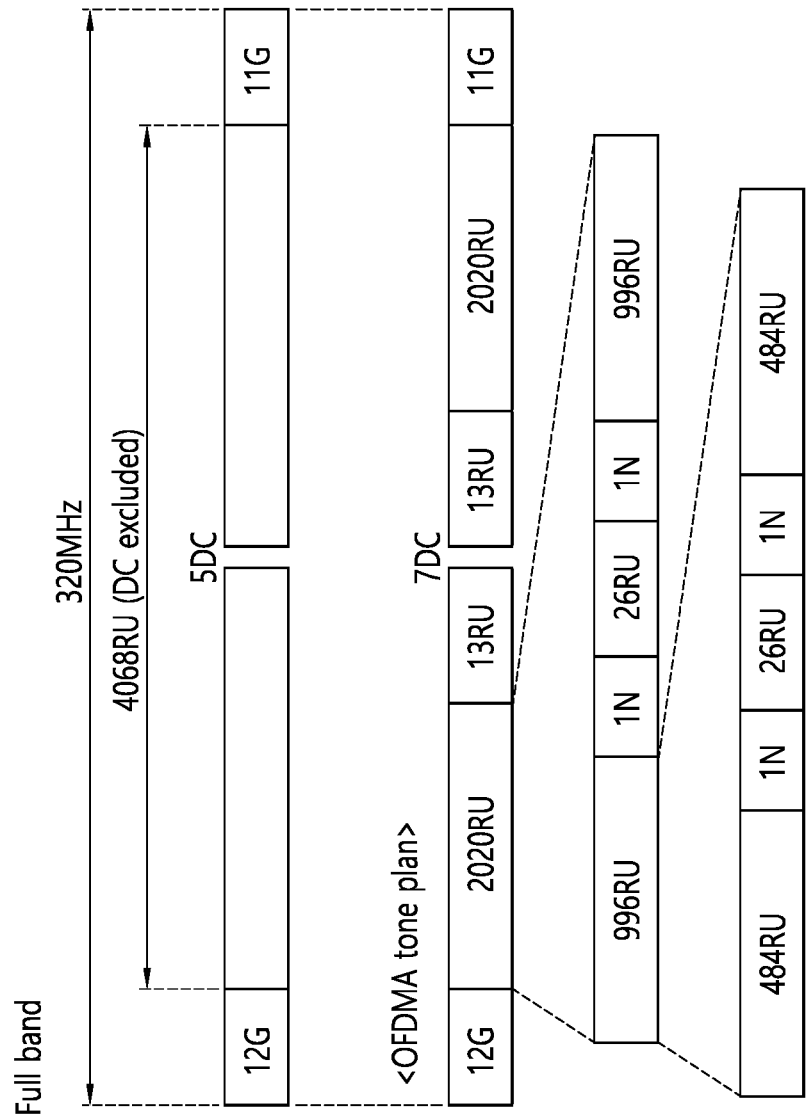
FIG. 15 illustrates an example of a tone plan in a 320 MHz band according to the present embodiment.

FIG. 15 shows an example of a tone plan in a 320 MHz band according to the present embodiment.

A tone plan in case of a full band and a tone plan in case of applying OFDMA are both illustrated in FIG. 15.

First, in case of the full band, a tone plan of 320 MHz may sequentially consist of 12 guard tones, 4068RU, 5 DC tones, and 11 guard tones. 5 DC tones may be located at the center of 320 MHz, and data may be transmitted in the 4068RU. However, FIG. 15 is for one embodiment only, and thus the 12 guard tones and the 11 guard tones may change in locations. When 7 DC tones are located at the center of 320 MHz, the data may be transmitted in 4066RU.

In case of applying OFDMA, a tone plan of 320 MHz may sequentially consist of 12 guard tones, 2020RU, 13RU, 7 DC tones, 13RU, 2020RU, and 11 guard tones. In addition, the 2020-tone RU may consist of 996RU, one null tone, 26RU, one null tone, and 996RU. In addition, the 996RU may consist of 484RU, one null tone, 26RU, one null tone, and 484RU. However, FIG. 15 is for one embodiment only, and thus the 12 guard tones and the 11 guard tones may change in locations. The 996RU may consist of one null tone, 484RU, 26RU, 484RU, and one null tone.

The 484RU and subordinate RUs are not shown since they may have the same configuration as in the existing 11ax.

Figure 16:
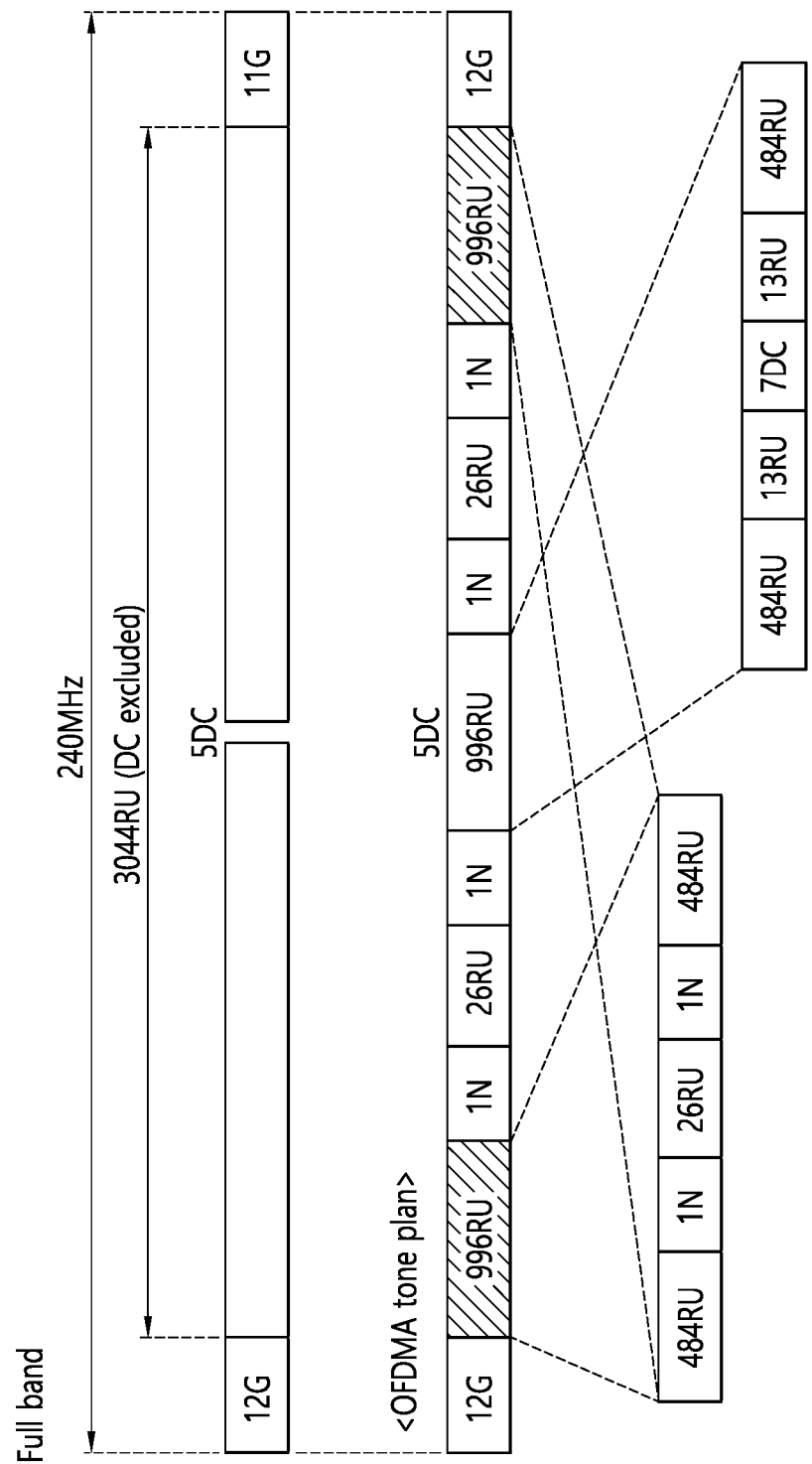
FIG. 16 illustrates an example of a tone plan in a 240 MHz band according to the present embodiment.

FIG. 16 shows an example of a tone plan in a 240 MHz band according to the present embodiment.

FIG. 16 illustrates both a tone plan in case of a full band and a tone plan in a case where OFDMA is applied, which are described above in tone plan 1.

Firstly, in case of a full band, a tone plan of 240 MHz may be configured in the order of 12 guard tones, 3044RU, 5 DC tones, and 11 guard tones. 5 DC tones may be positioned in the middle of the 160 MHz, and data may be transmitted from the 3044RU. However, FIG. 16 is merely an exemplary embodiment. And, therefore, the positions of the 12 guard tones and the 11 guard tones may be changed, and, if 7 DC tones are positioned in the middle of the 240 MHz, data may be transmitted from 3042RU.

In the case where OFDMA is applied, a tone plan of 320 MHz may be configured in the order of 12 guard tones, 996RU, 1N, 26RU, 1N, 996RU, 5 DC tones, 1N, 26RU, 1N, 996RU, and 11 guard tones.

Additionally, the 996RU on both ends may be configured of 484RU, 1 null tone, 26RU, 1 null tone, and 484RU. And, the 996RU in the middle may be configured of 484RU, 13RU, 7 DC tones, 13.RU, and 484RU. However, FIG. 16 is merely an exemplary embodiment. And, therefore, the positions of the 12 guard tones and the 11 guard tones may be changed, and the 996RU on both ends may be configured of 1 null tone, 484RU, 26RU, 484RU, and 1 null tone.

Since the tone plan may have the same structure as the existing 11ax starting from the 484RU, the structure will not be shown in the drawing.

5. Technical Task to be Achieved by the Present Disclosure

The present disclosure proposes phase rotation applied to a legacy preamble when packets are transmitted using 80/160/240/320 MHz in a WLAN system (802.11). In particular, the present disclosure proposes phase rotation optimized in consideration of various RF capabilities, that is, a device situation having different maximum transmission bandwidths of RF.

In the WLAN 802.11 system, transmission of an increased number of streams using a wider band or a larger number of antennas than those in legacy 11ax is considered for peak throughput increase. Furthermore, a method of aggregating and using various bands is also considered.

This specification considers a case of using a wide band, i.e., a case of transmitting a packet by using 80/160/240/320 MHz, and proposes phase rotation being applied to a legacy preamble of such case. Most particularly, by considering preamble puncturing adopted to 11ax at 80/160 MHz, and by applying 80 MHz-based preamble puncturing at 240/320 MHz, phase rotation that is optimized in such situation is proposed.

Firstly, an encoding procedure of a PPDU may be described as follows.

An L-STF included in the PPDU may be configured according to the following procedure.

a) Determine the channel bandwidth from the TXVECTOR parameter CH_BANDWIDTH.

b) Sequence generation: Generate the L-STF sequence over the channel bandwidth as described in 28.3.10.3 (L-STF). Apply a 3 dB power boost if transmitting an HE ER SU PPDU as described i n 28.3.10.3 (L-STF).

c) Phase rotation: Apply appropriate phase rotation for each 20 MHz subchannel as described in 28.3.9 (Mathematical description of signals) and 21.3.7.5 (Definition of tone rotation).

d) CSD per STS: If the TXVECTOR parameter BEAM_CHANGE is 0, apply CSD per STS(#16793) for each space-time stream and frequency segment as described in 28.3.10.2.2 (Cyclic shift for HE modulated fields).

e) Spatial mapping: If the TXVECTOR parameter BEAM_CHANGE is 0, apply the A matrix and the Q matrix as described in 28.3.10.3 (L-STF).

f) IDFT: Compute the inverse discrete Fourier transform.

g) CSD per chain: If the TXVECTOR parameter BEAM_CHANGE is 1 or not present, apply CSD per chain for each transmit chain and frequency segment as described in 28.3.10.2.1 (Cyclic shift for pre-HE modulated fields).

h) Insert GI and apply windowing: Prepend a GI (TGI,Pre-HE) and apply windowing as described in 28.3.9 (Mathematical description of signals).

i) Analog and RF: Upconvert the resulting complex baseband waveform associated with each transmit chain to an RF signal according to the center frequency of the desired channel and transmit. Refer to 28.3.9 (Mathematical description of signals) and 28.3.10 (HE preamble) for details.

An L-LTF included in the PPDU may be configured according to the following procedure.

a) Determine the channel bandwidth from the TXVECTOR parameter CH_BANDWIDTH.

b) Sequence generation: Generate the L-LTF sequence over the channel bandwidth as described i n 28.3.10.4 (L-LTF). Apply a 3 dB power boost if transmitting an HE ER SU PPDU as described i n 28.3.10.4 (L-LTF).

c) Phase rotation: Apply appropriate phase rotation for each 20 MHz subchannel as described in 28.3.9 (Mathematical description of signals) and 21.3.7.5 (Definition of tone rotation).

d) CSD per STS: If the TXVECTOR parameter BEAM_CHANGE is 0, apply CSD per STS for each space-time stream and frequency segment as described in 28.3.10.2.2 (Cyclic shift for HE modulated fields) before spatial mapping.

e) Spatial mapping: If the TXVECTOR parameter BEAM_CHANGE is 0, apply the A matrix and the Q matrix as described in 28.3.10.4 (L-LTF).

f) IDFT: Compute the inverse discrete Fourier transform.

g) CSD per chain: If the TXVECTOR parameter BEAM_CHANGE is 1 or not present, apply CSD per chain for each transmit chain and frequency segment as described in 28.3.10.2.1 (Cyclic shift for pre-HE modulated fields).

h) Insert GI and apply windowing: Prepend a GI (TGI,L-LTF) and apply windowing as described in 28.3.9 (Mathematical description of signals).

i) Analog and RF: Upconvert the resulting complex baseband waveform associated with each transmit chain to an RF signal according to the carrier frequency of the desired channel and transmit. Refer to 28.3.9 (Mathematical description of signals) and 28.3.10 (HE preamble) for details.

An L-SIG included in the PPDU may be configured according to the following procedure.

a) Set the RATE subfield in the SIGNAL field to 6 Mb/s. Set the LENGTH, Parity, and Tail fields in the SIGNAL field as described in 28.3.10.5 (L-SIG).

b) BCC encoder: Encode the SIGNAL field by a convolutional encoder at the rate of R=½ a s described in 28.3.11.5.1 (Binary convolutional coding and puncturing).

c) BCC interleaver: Interleave as described in 17.3.5.7 (BCC interleavers).

d) Constellation Mapper: BP SK modulate as described in 28.3.11.9 (Constellation mapping).

e) Pilot insertion: Insert pilots as described in 28.3.10.5 (L-SIG).

f) Extra tone insertion: Four extra tones are inserted in subcarriers kE (−28, −27, 27, 28) for channel estimation purpose and the values on these four extra tones are (−1, −1, −1, 1), respectively. Apply
a 3 dB power boost to the four extra tones if transmitting an HE ER SU PPDU as described in 28.3.10.5 (L-SIG).

g) Duplication and phase rotation: Duplicate the L-SIG field over each occupied 20 MHz subchannel of the channel bandwidth. Apply appropriate phase rotation for each occupied 20 MHz subchannel as described in 28.3.9 (Mathematical description of signals) and 21.3.7.5 (Definition of tone rotation).

h) CSD per STS: If the TXVECTOR parameter BEAM_CHANGE is 0, apply CSD per STS for each space-time stream and frequency segment as described in 28.3.10.2.2 (Cyclic shift for HE modulated fields) before spatial mapping.

i) Spatial mapping: If the TXVECTOR parameter BEAM_CHANGE is 0, apply the A matrix and Q matrix as described in 28.3.10.5 (L-SIG).

j) IDFT: Compute the inverse discrete Fourier transform.

k) CSD per chain: If the TXVECTOR parameter BEAM_CHANGE is 1 or not present, apply CSD per chain for each transmit chain and frequency segment as described in 28.3.10.2.1 (Cyclic shift for pre-HE modulated fields).

l) Insert GI and apply windowing: Prepend a GI (TGI,Pre-HE) and apply windowing as described in 28.3.9 (Mathematical description of signals).

m) Analog and RF: Upconvert the resulting complex baseband waveform associated with each transmit chain. Refer to 28.3.9 (Mathematical description of signals) and 28.3.10 (HE preamble) for details.

The L-STF, L-LTF, and L-SIG may apply adequate phase rotation in 20 MHz subchannel units (ref. c) of the L-STF, c) of the L-LTF, and g) of the L-SIG). At this point, L-SIG may be duplicated in 20 MHz units when transmitted from a bandwidth equal to or larger than 40 MHz and may apply each phase transmission one by one (ref. g) of L-SIG). The phase rotation may be described in more detail as follows.

The following shows a phase rotation being used in a legacy preamble and HE-SIG-A/B in the existing 11ax.

Function $\gamma_{k,BW}$ is used for indicating a rotation of a tone. The $\gamma_{k,BW}$ may be defined by a phase rotation value. In $\gamma_{k,BW}$, the bandwidth (BW) is determined by TXVECTOR parameter CH_BANDWIDTH, which is defined in the following table. At this point, k is a subcarrier index.

TABLE 6

| CH_BANDWIDTH | $\Upsilon_{k,BW}$ |
|---|---|
| CBW20 | $k, 20$ |
| CBW40 | $k, 40$ |
| CBW80 | $k, 80$ |
| CBW160 | $k, 160$ |
| CBW80 + 80 | $k, 80$ per frequency segment |

Hereinafter, $\gamma_{k,BW}$ according to the bandwidth will be defined.

For a 20 MHz PPDU transmission, $\gamma_{k,20}=1$

For a 40 MHz PPDU transmission, $$\Upsilon_{k,40} = \begin{cases} 1, & k < 0 \\ j, & k \geq 0 \end{cases}$$

For an 80 MHz PPDU transmission, $$\Upsilon_{k,80} = \begin{cases} 1, & k < -64 \\ -1, & k \geq -64 \end{cases}$$

For an 80+80 MHz PPDU transmission, each 80 MHz frequency segment shall use a phase rotation for the 80 MHz PPDU transmission.

For a 160 MHz PPDU transmission, $$\Upsilon_{k,160} = \begin{cases} 1, & k < -192 \\ -1, & -192 \leq k < 0 \\ 1, & 0 \leq k < 64 \\ -1, & 64 \leq k \end{cases}$$

As it is apparent in the description presented above, 160 MHz is used by repeating the phase rotation of 80 MHz two times.

In Wi-Fi after 11ax, wider bands can be used for peak throughput improvement and the present disclosure considers up to 240/320 MHz. In addition, it is obvious that the start of a packet is a legacy preamble for coexistence with the legacy although a packet type which will be used cannot be ascertained. Further, a situation in which 160/240/320 MHz packets are transmitted through one RF using more improved hardware and RF may also be considered. Considering such situations, the present disclosure proposes various types of phase rotation for optimizing a PAPR in an L-STF and an L-LTF and, particularly, proposes phase rotation for minimizing a maximum PAPR in consideration of a situation having various RF capabilities, that is, a situation in which there are devices having different maximum transmission bandwidths. In this case, phase rotation having a unified form instead of a form having different values depending on RF capabilities is considered. For example, a specific device may perform 160 MHz transmission using two 80 MHz capability RFs and another device may perform 160 MHz transmission using one 160 MHz capability RF. Accordingly, a PAPR of each 80 MHz of 160 MHz and a PAPR of the whole 160 MHz need to be simultaneously considered. After a specific phase rotation is applied, a PAPR may be calculated for each of various capability RFs and a maximum PAPR value may be extracted. This may be repeated when other phase rotations are applied to extract maximum PAPR values in respective phase rotations and these maximum PAPR values may be compared to select an optimized phase rotation.

Maximum transmission bandwidths considered in the specification are 80/160/240/320 MHz. Further, only a contiguous situation is considered. That is, only one PAPR is considered in 80 MHz transmission, and a total of three PAPRs with respect to the first 80 MHz, the second 80 MHz, and the whole 160 MHz are considered in 160 MHz transmission. In 240 MHz transmission, a total of six PAPRs with respect to the first 80 MHz, the second 80 MHz, the third 80 MHz, the first 160 MHz corresponding to a combination of the first 80 MHz and the second 80 MHz, the second 160 MHz corresponding to a combination of the second 80 MHz and the third 80 MHz, and the whole 240 MHz are considered. In 320 MHz transmission, a total of ten PAPRs with respect to the first 80 MHz, the second 80 MHz, the third 80 MHz, the fourth 80 MHz, the first 160 MHz corresponding to a combination of the first 80 MHz and the second 80 MHz, the second 160 MHz corresponding to a combination of the second 80 MHz and the third 80 MHz, the third 160 MHz corresponding to a combination of the third 80 MHz and the fourth 80 MHz, the first 240 MHz corresponding to a combination of the first 80 MHz, the second 80 MHz, the second 240 MHz corresponding to a combination of the second 80 MHz, the third 80 MHz, and the fourth 80 MHz, and the whole 32 MHz are considered.

L-STF and L-LTF sequences corresponding to 20 MHz are represented below and they are applied to each 20 MHz bandwidth in a wide bandwidth.

L-STF=sqrt(½)*[0 0 0 0 0 0 0 0 1+j 0 0 0 −1−j 0 0 0 1+j 0 0 0 −1−j 0 0 0 −1−j 0 0 0 1+j 0 0 0 0 0 0 0 −1 −j 0 0 0 −1−j 0 0 0 1+j 0 0 0 1+j 0 0 0 1+j 0 0 0 1+j 0 0 0 0 0 0 0]

L-LTF=[0 0 0 0 0 0 1 1 −1 −1 1 1 −1 1 −1 1 1 1 1 1 1 −1 −1 1 1 −1 1 −1 1 1 1 1 1 0 1 −1 −1 1 1 −1 1 −1 1 1 −1 −1 1 1 −1 1 −1 1 −1 1 1 1 1 −1 −1 1 1 −1 1 −1 1 −1 1 1 1 1 0 0 0 0 0]

A signal repeated in this manner in the frequency domain may have a considerably large PAPR. To reduce this, phase rotation is applied, which is proposed as follows. In addition, a maximum PAPR in an L-STF and an L-LTF in consideration of various RF capabilities in a proposed phase rotation situation is proposed as follows.

A. 80 MHz (when 80 MHz is represented by a subcarrier index, −128≤k<127. k is a subcarrier index)

1) Conventional phase rotation is applied

The conventional phase rotation can be applied as it is as follows.

Gamma_k,80=1 if k<−64
−1 if −64≤k

TABLE 7

| L-STF | L-LTF |
|---|---|
| 4.3480 | 5.3962 |

Gamma_k,BW represents a phase rotation value at a subcarrier index k of a contiguous bandwidth BW.

B. 160 MHz (when 160 MHz is represented by a subcarrier index, −256≤k<255.)

160 MHz includes both contiguous 160 MHz/non-contiguous 160 MHz, and non-contiguous 160 MHz may be 80+80 MHz. Particularly, in the case of a non-contiguous band, channels may be positioned in different bands. In this case, the following phase rotation can be applied as it is for simplification. Otherwise, phase rotation may be applied in response to a channel size used in a band because it is obvious that different RFs are used, and thus, PAPR is not affected. This can also be applied to 240/320 MHz below.

Contiguous/non-contiguous 160 MHz phase rotation proposed below can be applied to 160 MHz in a wide non-contiguous transmission situation of 240/320 MHz.

Phase rotation proposed below is phase rotation optimized in consideration of a contiguous situation and thus may not be optimal in a non-contiguous situation in terms of PAPR.

1) Repetition of 80 MHz phase rotation

This is the same approach as the method used in legacy 11ax, and in a situation in which contiguous/non-contiguous 160 MHz packets are transmitted using two RFs each corresponding to 80 MHz, phase rotations used for the RFs are identical and thus implementation may be easy. In contiguous 160 MHz, phase rotation and a maximum PAPR are as follows.

Gamma_k,160=1 if k<−192
−1 if −192≤k<−128
−1 if −128≤k<−64
−1 if −64≤k<0
1 if 0≤k<64
−1 if 64≤k<128
−1 if 128≤k<192
−1 if 192≤k

TABLE 8

| L-STF | L-LTF |
|---|---|
| 5.9144 | 6.4716 |

When non-contiguous 160 MHz, that is, 80+80 MHz is considered, the proposition of A can be applied to each 80 MHz.

2) 80 MHz phase rotation repetition and phase rotation addition in units of 80 MHz bandwidth This is a method of repeating 80 MHz phase rotation twice and additionally applying phase rotation in units of 80 MHz to further optimize a PAPR. In a situation in which contiguous/non-contiguous 160 MHz packets are transmitted using two RFs MHz each corresponding to 80 MHz, the same 80 MHz phase rotation is applied to each RF and additional phase rotation per 80 MHz is applied.

In this case, additional phase rotations in units of 80 MHz bandwidth which are optimized in an L-STF and an L-LTF become 1 which is the same as the result of 1).

3) PAPR optimization phase rotation applied per 20 MHz bandwidth

This method is phase rotation applied in units of 20 MHz bandwidth which optimizes a PAPR when a contiguous 160 MHz packet is transmitted and is as follows. A subcarrier index may be corrected and applied to non-contiguous 160 MHz. That is, in the following mathematical expressions, phase rotation of −256≤k<0 can be applied to 80 MHz having a low frequency and phase rotation of 0≤k<256 can be applied to 80 MHz having a high frequency. Phase rotation applied to each RF having a maximum transmission bandwidth of 80 MHz varies according to bandwidth position, which may cause complicated implementation.

Phase rotation optimized in the L-STF is as follows.
Gamma_k,160=1 if k<−192
−j if −192≤k<−128
1 if −128≤k<−64
−j if −64≤k<0
−1 if 0≤k<64
j if 64≤k<128
−1 if 128≤k<192
−j if 192≤k
or
Gamma_k,160=1 if k<−192
j if −192≤k<−128
1 if −128≤k<−64
j if −64≤k<0
−1 if 0≤k<64
−j if 64≤k<128
−1 if 128≤k<192
j if 192≤k
or
Gamma_k,160=1 if k<−192
j if −192≤k<−128
−1 if −128≤k<−64
j if −64≤k<0
1 if 0≤k<64
−j if 64≤k<128
1 if 128≤k<192
−j if 192≤k
or
Gamma_k,160=1 if k<−192
−j if −192≤k<−128
−1 if −128≤k<−64
−j if −64≤k<0
1 if 0≤k<64
j if 64≤k<128
1 if 128≤k<192
j if 192≤k

TABLE 9

| L-STF | L-LTF |
|---|---|
| 4.2755 | 5.3516 |

Phase rotation optimized in the L-LTF is as follows.
Gamma_k,160=1 if k<−192
−1 if −192≤k<−128
1 if −128≤k<−64
1 if −64≤k<0
1 if 0≤k<64
1 if 64≤k<128
−1 if 128≤k<192
−1 if 192≤k
or
Gamma_k,160=1 if k<−192
1 if −192≤k<−128
−1 if −128≤k<−64
−1 if −64≤k<0
−1 if 0≤k<64
−1 if 64≤k<128
1 if 128≤k<192
−1 if 192≤k

TABLE 10

| L-STF | L-LTF |
|---|---|
| 4.3383 | 5.0715 |

This has a PAPR much superior to those in the propositions 1) and 2) although implementation may be complicated, and phase rotation of the second group of 3) which minimizes a PAPR of L-LTF having a larger PAPR may be preferred in view of packets.

C. 240 MHz (when 240 MHz is represented by a subcarrier index, −384≤k<383.)

240 MHz includes both contiguous 240 MHz/non-contiguous 240 MHz, and non-contiguous 240 MHz may be 160+80/80+160/80+80+80 MHz. Contiguous/non-contiguous 240 MHz phase rotation proposed below can be applied to 240 MHz of a non-contiguous transmission situation of wider 320 MHz.

1) 80 MHz phase rotation repetition

This is the same approach as the method used in legacy 11ax, and in a situation in which contiguous/non-contiguous 240 MHz packets are transmitted using multiple RFs respectively corresponding to 80/160 MHz, phase rotations used for the RFs are identical and thus implementation may be easy. In contiguous 240 MHz, phase rotation and a maximum PAPR are as follows.

Gamma_k,240=1 if k<−320
−1 if −320≤k<−256
−1 if −256≤k<−192
−1 if −192≤k<−128
1 if −128≤k<−64
−1 if −64≤k<0
−1 if 0≤k<64
−1 if 64≤k<128
1 if 128≤k<192
−1 if 192≤k<256
−1 if 256≤k<320
−1 if 320≤k

TABLE 11

| L-STF | L-LTF |
|---|---|
| 7.3158 | 8.1316 |

In non-contiguous 240 MHz, phase rotation of contiguous 80/160 MHz can be proposed as in A and 1) of B.

Simple repetition phase rotation as in the above various propositions has a PAPR inferior to those in the following propositions so that the above propositions may not be desirable.

2) 80 MHz phase rotation repetition and phase rotation addition in units of 80 MHz bandwidth This is a method of repeating 80 MHz phase rotation three times and additionally applying phase rotation in units of 80 MHz to further optimize a PAPR. In a situation in which contiguous/non-contiguous 240 MHz packets are transmitted using multiple RFs respectively corresponding to 80/160 MHz, the same 80 MHz phase rotation is applied to the respective RFs, and additional 80 MHz phase rotation is applied.

Phase rotation to which phase rotation optimized in units of 80 MHz bandwidth in the L-STF and the L-LTF is added and a PAPR are represented below.

Gamma_k,240=1 if k<−320
−1 if −320≤k<−256
−1 if −256≤k<−192
−1 if −192≤k<−128
1 if −128≤k<−64
−1 if −64≤k<0
−1 if 0≤k<64
−1 if 64≤k<128
−1 if 128≤k<192
1 if 192≤k<256
1 if 256≤k<320
1 if 320≤k
or
Gamma_k,240=1 if k<−320
−1 if −320≤k<−256
−1 if −256≤k<−192
−1 if −192≤k<−128
−1 if −128≤k<−64
1 if −64≤k<0
1 if 0≤k<64
1 if 64≤k<128
−1 if 128≤k<192
1 if 192≤k<256
1 if 256≤k<320
1 if 320≤k

TABLE 12

| L-STF | L-LTF |
|---|---|
| 6.7204 | 7.4744 |

A subcarrier index may also be corrected and applied to non-contiguous 240 MHz. In the above mathematical expressions, phase rotation of −384≤k<−128 can be applied to 80 MHz having the lowest frequency, phase rotation of −128≤k<128 can be applied to 80 MHz having a second lowest frequency, and phase rotation of 128≤k<384 can be applied to 80 MHz having the highest frequency.

3) PAPR optimization phase rotation applied per 20 MHz bandwidth

This method is phase rotation applied in units of 20 MHz bandwidth which optimizes a PAPR when a contiguous 240 MHz packet is transmitted and is as follows. A subcarrier index may also be corrected and applied to non-contiguous 240 MHz. That is, in the following mathematical expressions, phase rotation of −384≤k<−128 can be applied to 80 MHz having the lowest frequency, phase rotation of −128≤k<128 can be applied to 80 MHz having a second lowest frequency, and phase rotation of 128≤k<384 can be applied to 80 MHz having the highest frequency. Phase rotation applied to each RF having a maximum transmission bandwidth of 80/160 MHz varies according to bandwidth position, which may cause complicated implementation.

Phase rotation optimized in the L-STF is as follows.

Gamma_k,240=1 if k<−320
−j if −320≤k<−256
−1 if −256≤k<−192
j if −192≤k<−128
1 if −128≤k<−64
j if −64≤k<0
1 if 0≤k<64
j if 64≤k<128
1 if 128≤k<192
j if 192≤k<256
−1 if 256≤k<320
−j if 320≤k

TABLE 13

| L-STF | L-LTF |
|---|---|
| 4.3343 | 5.4910 | or
Gamma_k,240=1 if k<−320
j if −320≤k<−256
−1 if −256≤k<−192
−j if −192≤k<−128
1 if −128≤k<−64
−j if −64≤k<0
1 if 0≤k<64
−j if 64≤k<128
1 if 128≤k<192
−j if 192≤k<256
−1 if 256≤k<320
j if 320≤k

TABLE 14

| L-STF | L-LTF |
|---|---|
| 4.3343 | 5.4855 |

Phase rotation optimized in the L-LTF is as follows.
Gamma_k,240=1 if k<−320
1 if −320≤k<−256
1 if −256≤k<−192
1 if −192≤k<−128
1 if −128≤k<−64
−1 if −64≤k<0
−1 if 0≤k<64
1 if 64≤k<128
1 if 128≤k<192
−1 if 192≤k<256
1 if 256≤k<320
−1 if 320≤k
or
Gamma_k,240=1 if k<−320
−1 if −320≤k<−256
1 if −256≤k<−192
−1 if −192≤k<−128
−1 if −128≤k<−64
1 if −64≤k<0
1 if 0≤k<64
−1 if 64≤k<128
−1 if 128≤k<192
−1 if 192≤k<256
−1 if 256≤k<320
−1 if 320≤k

TABLE 15

| L-STF | L-LTF |
|---|---|
| 4.5021 | 5.1575 |

This has a PAPR much superior to those in the propositions 1) and 2) although implementation may be complicated, and phase rotation of the second group of 3) which minimizes a PAPR of L-LTF having a larger PAPR may be preferred in view of packets.

D. 320 MHz (when 320 MHz is represented by a subcarrier index, −512≤k<511.)

320 MHz includes both contiguous 320 MHz/non-contiguous 320 MHz, and non-contiguous 320 MHz may be 240+80/80+240/160+160/160+80+80/80+160/80+80+160/80+80+80+80 MHz.

1) 80 MHz phase rotation repetition

This is the same approach as the method used in legacy 11ax, and in a situation in which contiguous/non-contiguous 320 MHz packets are transmitted using multiple RFs respectively corresponding to 80/160/240 MHz, phase rotations used for the RFs are identical, and thus, implementation may be easy. In contiguous 320 MHz, phase rotation and a maximum PAPR are as follows.

Gamma_k,320=1 if k<−448
−1 if −448≤k<−384
−1 if −384≤k<−320
−1 if −320≤k<−256
1 if −256≤k<−192
−1 if −192≤k<−128
−1 if −128≤k<−64
−1 if −64≤k<0
1 if 0≤k<64
−1 if 64≤k<128
−1 if 128≤k<192
−1 if 192≤k<256
1 if 256≤k<320
−1 if 320≤k<384
−1 if 384≤k<448
−1 if 448≤k<512

TABLE 16

| L-STF | L-LTF |
|---|---|
| 8.2600 | 9.2473 |

In non-contiguous 320 MHz, phase rotation of contiguous 80/160/240 MHz can be proposed as in A, 1) of B, and 1) of C.

Simple repetition phase rotation as in the above various propositions has a PAPR inferior to those in the following propositions. Accordingly, the above propositions may not be desirable.

2) 80 MHz phase rotation repetition and phase rotation addition in units of 80 MHz bandwidth This is a method of repeating 80 MHz phase rotation four times and additionally applying phase rotation in units of 80 MHz to further optimize a PAPR. In a situation in which contiguous/non-contiguous 320 MHz packets are transmitted using multiple RFs respectively corresponding to 80/160/240 MHz, the same 80 MHz phase rotation is applied to the respective RFs and additional 80 MHz phase rotation is applied.

Phase rotation to which phase rotation optimized in units of 80 MHz bandwidth in the L-STF and the L-LTF is added and a PAPR are represented below.

Gamma_k,320=1 if k<−448
−1 if −448≤k<−384
−1 if −384≤k<−320
−1 if −320≤k<−256
−j if −256≤k −192
j if −192≤k<−128
j if −128≤k<−64
j if −64≤k<0
−j if 0≤k<64
j if 64≤k<128
j if 128≤k<192
j if 192≤k<256

1 if $256 \leq k < 320$
−1 if $320 \leq k < 384$
−1 if $384 \leq k < 448$
−1 if $448 \leq k < 512$
or
Gamma_k,320=1 if $k < -448$
−1 if $-448 \leq k < -384$
−1 if $-384 \leq k < -320$
−1 if $-320 \leq k < -256$
j if $-256 \leq k < -192$
−j if $-192 \leq k < -128$
−j if $-128 \leq k < -64$
−j if $-64 \leq k < 0$
j if $0 \leq k < 64$
−j if $64 \leq k < 128$
−j if $128 \leq k < 192$
−j if $192 \leq k < 256$
1 if $256 \leq k < 320$
−1 if $320 \leq k < 384$
−1 if $384 \leq k < 448$
−1 if $448 \leq k < 512$

TABLE 17

| L-STF | L-LTF |
|---|---|
| 5.5493 | 6.4307 |

A subcarrier index may also be corrected and applied to non-contiguous 320 MHz. In the above mathematical expressions, phase rotation of $-512 \leq k < -256$ can be applied to 80 MHz having the lowest frequency, phase rotation of $-256 \leq k < 0$ can be applied to 80 MHz having a second lowest frequency, phase rotation of $0 \leq k < 256$ can be applied to 80 MHz having a third lowest frequency, and phase rotation of $256 \leq k < 512$ can be applied to 80 MHz having the highest frequency.

This may be preferred with respect to PAPR although implementation complexity is slightly high.

3) 160 MHz phase rotation repetition

In this case, since 160 MHz phase rotation (phase rotation proposed in B) is repeatedly applied twice, phase rotations used for RFs are identical in a situation in which contiguous/non-contiguous 320 MHz packets are transmitted using two RFs each corresponding to 160 MHz, and thus implementation may be easy. Here, phase rotation applied to each RF having a maximum transmission bandwidth of 80/240 MHz varies according to bandwidth position.

Phase rotation may be represented as follows in contiguous 320 MHz, and a maximum PAPR is also represented below.

Gamma_k,320=1 if $k < -448$
−1 if $-448 \leq k < -384$
−1 if $-384 \leq k < -320$
−1 if $-320 \leq k < -256$
1 if $-256 \leq k < -192$
−1 if $-192 \leq k < -128$
−1 if $-128 \leq k < -64$
−1 if $-64$
1 if $0 \leq k < 64$
−1 if $64 \leq k < 128$
−1 if $128 \leq k < 192$
−1 if $192 \leq k < 256$
1 if $256 \leq k < 320$
−1 if $320 \leq k < 384$
−1 if $384 \leq k < 448$
−1 if $448 \leq k < 512$

TABLE 18

| L-STF | L-LTF |
|---|---|
| 8.2600 | 9.2473 |

Gamma_k,320=1 if $k < -448$
−j if $-448 \leq k < -384$
1 if $-384 \leq k < -320$
−j if $-320 \leq k < -256$
−1 if $-256 \leq k < -192$
j if $-192 \leq k < -128$
−1 if $-128 \leq k < -64$
−j if $-64 \leq k < 0$
1 if $0 \leq k < 64$
−j if $64 \leq k < 128$
1 if $128 \leq k < 192$
−j if $192 \leq k < 256$
−1 if $256 \leq k < 320$
j if $320 \leq k < 384$
−1 if $384 \leq k < 448$
−j if $448 \leq k < 512$
or
Gamma_k,320=1 if $k < -448$
j if $-448 \leq k < -384$
1 if $-384 \leq k < -320$
j if $-320 \leq k < -256$
−1 if $-256 \leq k < -192$
−j if $-192 \leq k < -128$
−1 if $-128 \leq k < -64$
j if $-64 \leq k < 0$
1 if $0 \leq k < 64$
j if $64 \leq k < 128$
1 if $128 \leq k < 192$
j if $192 \leq k < 256$
−1 if $256 \leq k < 320$
−j if $320 \leq k < 384$
−1 if $384 \leq k < 448$
j if $448 \leq k < 512$
or
Gamma_k,320=1 if $k < -448$
j if $-448 \leq k < -384$
−1 if $-384 \leq k < -320$
j if $-320 \leq k < -256$
1 if $-256 \leq k < -192$
−j if $-192 \leq k < -128$
1 if $-128 \leq k < -64$
−j if $-64 \leq k < 0$
1 if $0 \leq k < 64$
j if $64 \leq k < 128$
−1 if $128 \leq k < 192$
j if $192 \leq k < 256$
1 if $256 \leq k < 320$
−j if $320 \leq k < 384$
1 if $384 \leq k < 448$
−j if $448 \leq k < 512$
or
Gamma_k,320=1 if $k < -448$
−j if $-448 \leq k < -384$
−1 if $-384 \leq k < -320$
−j if $-320 \leq k < -256$
1 if $-256 \leq k < -192$
j if $-192 \leq k < -128$
1 if $-128 \leq k < -64$
j if $-64 \leq k < 0$
1 if $0 \leq k < 64$
−j if $64 \leq k < 128$ −1 if 128≤k<192
−j if 192≤k<256
1 if 256≤k<320
j if 320≤k<384
1 if 384≤k<448
j if 448≤k<512

TABLE 19

| L-STF | L-LTF |
|---|---|
| 6.9208 | 7.9099 |

Gamma_k,320=1 if k<−448
−1 if −448≤k<−384
1 if −384≤k<−320
1 if −320≤k<−256
1 if −256≤k<−192
1 if −192≤k<−128
−1 if −128≤k<−64
−1 if −64≤k<0
1 if 0≤k<64
−1 if 64≤k<128
1 if 128≤k<192
1 if 192≤k<256
1 if 256≤k<320
1 if 320≤k<384
−1 if 384≤k<448
−1 if 448≤k<512
or
Gamma_k,320=1 if k<−448
1 if −448≤k<−384
−1 if −384≤k<−320
−1 if −320≤k<−256
−1 if −256≤k<−192
−1 if −192≤k<−128
1 if −128≤k<−64
−1 if −64≤k<0
1 if 0≤k<64
1 if 64≤k<128
−1 if 128≤k<192
−1 if 192≤k<256
−1 if 256≤k<320
−1 if 320≤k<384
1 if 384≤k<448
−1 if 448≤k<512

TABLE 20

| L-STF | L-LTF |
|---|---|
| 6.9208 | 7.8947 |

A subcarrier index may be corrected and applied to any type of non-contiguous 320 MHz. In the above mathematical expressions, phase rotation of −512≤k<−256 can be applied to 80 MHz having the lowest frequency, phase rotation of −256≤k<0 can be applied to 80 MHz having a second lowest frequency, phase rotation of 0≤k<256 can be applied to 80 MHz having a third lowest frequency, and phase rotation of 256≤k<512 can be applied to 80 MHz having the highest frequency.

Simple repetition phase rotation as in the above various propositions has a PAPR inferior to that in the following proposition of 4). Accordingly, the above propositions may not be desirable.

4) 160 MHz phase rotation repetition and phase rotation addition in units of 160 MHz bandwidth This is a method of repeating 160 MHz phase rotation (phase rotation proposed in B) twice and additionally applying phase rotation in units of 160 MHz to further optimize a PAPR In a situation in which contiguous/non-contiguous 320 MHz packets are transmitted using two RFs MHz each corresponding to 160 MHz, the same 160 MHz phase rotation is applied to each RF and additional phase rotation per 160 MHz is applied. Here, phase rotation applied to the RFs having maximum transmission bandwidths of 80/240 MHz may vary according to bandwidth position.

Phase rotation to which phase rotation optimized in units of 160 MHz bandwidth in the L-STF and the L-LTF is added and a PAPR are represented below.

Gamma_k,320=1 if k<−448
−1 if −448≤k<−384
−1 if −384≤k<−320
−1 if −320≤k<−256
1 if −256≤k<−192
−1 if −192≤k<−128
−1 if −128≤k<−64
−1 if −64≤k<0
−1 if 0≤k<64
1 if 64≤k<128
1 if 128≤k<192
1 if 192≤k<256
−1 if 256≤k<320
1 if 320≤k<384
1 if 384≤k<448
1 if 448≤k<512

TABLE 21

| L-STF | L-LTF |
|---|---|
| 7.7653 | 8.4628 |

Gamma_k,320=1 if k<−448
−j if −448≤k<−384
1 if −384≤k<−320
−j if −320≤k<−256
−1 if −256≤k<−192
j if −192≤k<−128
−1 if −128≤k<−64
−j if −64≤k<0
1 if 0≤k<64
−j if 64≤k<128
1 if 128≤k<192
−j if 192≤k<256
−1 if 256≤k<320
j if 320≤k<384
−1 if 384≤k<448
−j if 448≤k<512
or
Gamma_k,320=1 if k<−448
j if −448≤k<−384
1 if −384≤k<−320
j if −320≤k<−256
−1 if −256≤k<−192
−j if −192≤k<−128
−1 if −128≤k<−64
j if −64≤k<0
1 if 0≤k<64
j if 64≤k<128
1 if 128≤k<192
j if 192≤k<256

−1 if 256≤k<320
−j if 320≤k<384
−1 if 384≤k<448
j if 448≤k<512
or
Gamma_k,320=1 if k<−448
j if −448≤k<−384
−1 if −384≤k<−320
j if −320≤k<−256
1 if −256≤k<−192
−j if −192≤k<−128
1 if −128≤k<−64
−j if −64≤k<128
1 if 0≤k<64
j if 64≤k<128
−1 if 128≤k<192
j if 192≤k<256
1 if 256≤k<320
−j if 320≤k<384
1 if 384≤k<448
−j if 448≤k<512
or
Gamma_k,320=1 if k<−448
−j if −448≤k<−384
−1 if −384≤k<−320
−j if −320≤k<−256
1 if −256<−192
j if −192≤k<−128
1 if −128≤k<−64
j if −64≤k<0
1 if 0≤k<64
−j if 64≤k<128
−1 if 128≤k<192
−j if 192≤k<256
1 if 256≤k<320
j if 320≤k<384
1 if 384≤k<448
j if 448≤k<512

TABLE 22

| L-STF | L-LTF |
|---|---|
| 6.9208 | 7.9099 |

Gamma_kc320=1 if k<−448
−1 if −448≤k<−384
1 if −384≤k<−320
1 if −320≤k<−256
1 if −256≤k<−192
1 if −192≤k<−128
−1 if −128≤k<−64
−1 if −64≤k<0
1 if 0≤k<64
−1 if 64≤k<128
1 if 128≤k<192
1 if 192≤k<256
1 if 256≤k<320
1 if 320≤k<384
−1 if 384≤k<448
−1 if 448≤k<512
or
Gamma_k,320=1 if k<−448
1 if −448≤k<−384
−1 if −384≤k≤−320
−1 if −320≤k<−256
−1 if −256≤k<−192

−1 if −192≤k<−128
1 if −128≤k<−64
−1 if −64≤k<0
1 if 0≤k<64
1 if 64≤<128
−1 if 128≤k<192
−1 if 192≤k<256
−1 if 256≤k<320
−1 if 320≤k<384
1 if 384≤k<448
−1 if 448≤k<512

TABLE 23

| L-STF | L-LTF |
|---|---|
| 6.9208 | 7.8947 |

A subcarrier index may be corrected and applied to any type of non-contiguous 320 MHz. In the above mathematical expressions, phase rotation of −512≤k<−256 can be applied to 80 MHz having the lowest frequency, phase rotation of −256≤k<0 can be applied to 80 MHz having a second lowest frequency, phase rotation of 0≤k<256 can be applied to 80 MHz having a third lowest frequency, and phase rotation of 256≤k<512 can be applied to 80 MHz having the highest frequency.

The above proposition is more complicated than the proposition of 2) of D and does not have satisfactory PAPR, and thus, may not be preferred.

5) PAPR optimization phase rotation applied per 20 MHz bandwidth

This method is phase rotation applied in units of 20 MHz bandwidth which optimizes a PAPR when a contiguous 320 MHz packet is transmitted and is as follows. A subcarrier index may be corrected and applied to non-contiguous 160 MHz. That is, in the following mathematical expressions, phase rotation of −512≤k<−256 can be applied to 80 MHz having the lowest frequency, phase rotation of −256≤k<0 can be applied to 80 MHz having a second lowest frequency, phase rotation of 0≤k<256 can be applied to 80 MHz having a third lowest frequency, and phase rotation of 256≤k<512 can be applied to 80 MHz having the highest frequency.

Phase rotation optimized in the L-STF is as follows.
Gamma_k,320=1 if k<−448
1 if −448≤k<−384
1 if −384≤k<−320
j if −320≤k<−256
j if −256≤k<−192
1 if −192≤k<−128
1 if −128≤k<−64
−j if −64≤k<0
1 if 0≤k<64
−1 if 64≤k<128
−1 if 128≤k<192
1 if 192≤k<256
−1 if 256≤k<320
j if 320≤k<384
−j if 384≤k<448
1 if 448≤k<512
or
Gamma 1020=1 if k<−448
1 if −448≤k<−384
1 if −384≤k<−320
−j if −320≤k<−256
−j if −256≤k<−192
1 if −192≤k<−128

1 if −128≤k<−64
j if −64≤k<0
1 if 0≤k<64
−1 if 64≤k<128
−1 if 128≤k<192
1 if 192≤k<256
−1 if 256≤k<320
−j if 320≤k<384
j if 384≤k<448
1 if 448≤k<512

TABLE 24

| L-STF | L-LTF |
|---|---|
| 4.2429 | 5.4334 |

Phase rotation optimized in the L-LTF is as follows.
Gamma_k,320=1 if k<−448
j if −448≤k<−384
−1 if −384≤k<−320
1 if −320≤k<−256
j if −256≤k<−192
j if −192≤k<−128
−1 if −128≤k<−64
−1 if −64≤k<0
1 if 0≤k<64
−j if 64≤k<128
1 if 128≤k<192
−j if 192≤k<256
−1 if 256≤k<320
−1 if 320≤k<384
j if 384≤k<448
−j if 448≤k<512
or
Gamma_k,320=1 if k<−448
−1 if −448≤k<−384
j if −384≤k<−−320
j if −320≤k<−−256
1 if −256≤k<−192
−j if −192≤k<−128
1 if −128≤k<−64
−j if −64≤k<0
j if 0≤k<64
j if 64≤k<128
−1 if 128<192
−1 if 192≤k<256
−j if 256≤k<320
j if 320≤k<384
−1 if 384≤k<448
−j if 448≤k<512

TABLE 25

| L-STF | L-LTF |
|---|---|
| 4.4262 | 5.2194 |

This has a PAPR much superior to those in the propositions 1), 2), 3), and 4) although implementation may be complicated, and phase rotation of the second group of 5) which minimizes a PAPR of L-LTF having a larger PAPR may be preferred in view of packets.

The phase rotation values proposed above may be multiplied by the same value and used (e.g., multiplied by 1, −1, j, or −j and used), the order thereof may be changed and used (e.g., [1 −1 −1 −1 1 −1 −1−1] is changed to [−1 −1 −1 1 −1 −1 1 1] from a low frequency to a high frequency), or the order of the phase rotation values may be changed and the phase rotation values may be multiplied by the same value (e.g., the order of [1 −1 −1 −1 1 −1 −1−1] is changed from a low frequency to a high frequency, multiplied by −1, and used as [1 1 1 −1 1 1 1 −1]). In this case, the phase rotation values have the same PAPR.

Figure 17:
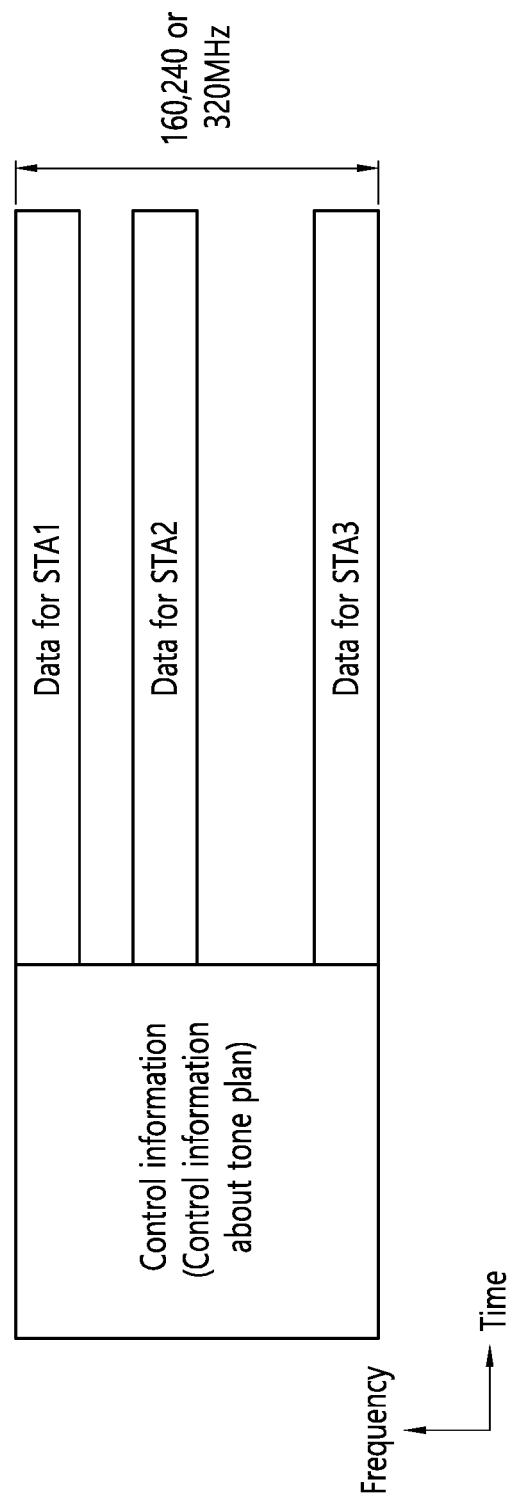
FIG. 17 illustrates an example of OFDMA transmission in 160 MHz, 240 MHz, or 320 MHz band.

FIG. 17 illustrates an example of OFDMA transmission in a 160 MHz, 240 MHz, or 320 MHz band according to the present embodiment.

Referring to FIG. 17, an AP may transmit a PPDU to STA 1 to STA 3.

The PPDU may include control information including information about a tone plan. STA1 to STA 3 may transmit/receive data in RUs based on the information about the tone plan in 160 MHz, 240 MHz, or 320 MHz.

That is, the AP may transmit the information about the tone plan to all STAs in a BSS in 160 MHz, 240 MHz, or 320 MHz, and the STAs may acquire scheduling information of data thereof based on the information about the tone plan. Accordingly, STA 1 to STA 3 having data among all STAs in the BSS can transmit/receive data through RUs allocated thereto based on the information about the tone plan. The data may include both downlink data and uplink data.

Figure 18:
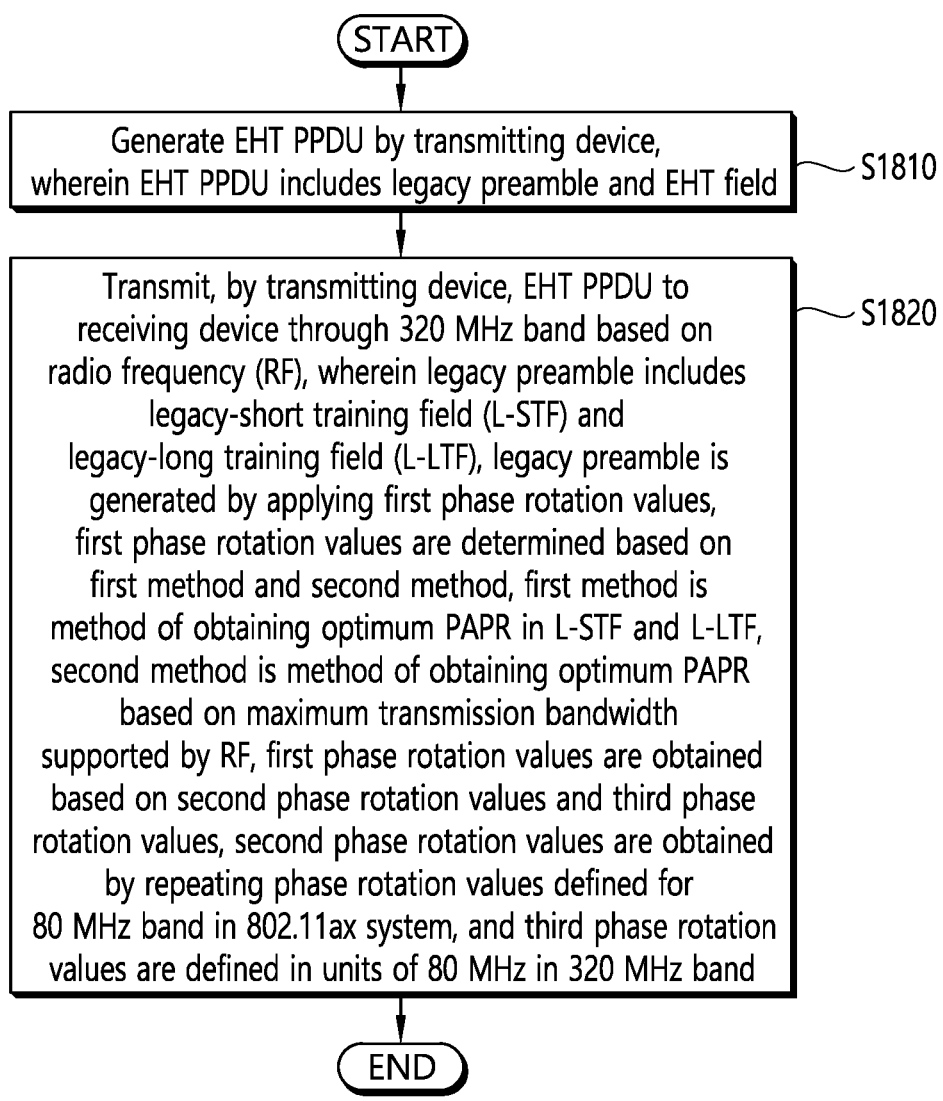
FIG. 18 is a flowchart illustrating a procedure of transmitting an EHT PPDU according to the present embodiment.

FIG. 18 is a flowchart illustrating a procedure of transmitting an EHT PPDU according to the present embodiment.

The example of FIG. 18 may be performed in network environments in which a next-generation WLAN system is supported. The next-generation WLAN system is a WLAN system evolving from the 802.11ax system and can satisfy backward compatibility with the 802.11ax system. The next-generation WLAN system may correspond to an EHT (Extreme High Throughput) WLAN system or the 802.11be WLAN system.

The example of FIG. 18 may be performed in a transmitting device, and the transmitting device may correspond to an AP. A receiving device may correspond to an STA (non-AP STA).

The present embodiment proposes a method and device for setting phase rotation values by which optimized PAPR can be obtained in consideration of a case in which there are wireless devices having different maximum transmission bandwidths supported by RF (Radio Frequency). That is, phase rotation values for minimizing a maximum PAPR in consideration of RF capabilities of wireless devices having different maximum transmission bandwidths of RF in a BSS are proposed. An EHT PPDU proposed in the present embodiment can be transmitted and received in 80/160/240/320 MHz bands. However, description will be limited to the 320 MHz band.

In step S1810, the transmitting device generates the aforementioned EHT PPDU (Physical Protocol Data Unit). The EHT PPDU includes a legacy preamble and an EHT field.

In step S1820, the transmitting device transmits the PPDU to a receiving device through a 320 MHz band based on RF.

The legacy preamble includes an L-STF (Legacy-Short Training Field) and an L-LTF (Legacy-Long Training Field). In addition, the legacy preamble may further include an L-SIG (Legacy-Signal). The EHT field may include EHT-SIG, EHT-STF, EHT-LTF, and a data field. The legacy field is a field supported by WLAN systems before 802.11be and the EHT field may be a field supported by the 802.11be WLAN system The legacy preamble is generated by applying first phase rotation values thereto. That is, the first phase rotation values can be commonly applied to all fields included in the legacy preamble.

The first phase rotation values are determined based on a first method and a second method.

The first method is a method of acquiring an optimum PAPR in the L-STF and the L-LTF. The second method is a method of acquiring an optimum PAPR based on a maximum transmission bandwidth supported by RF.

That is, the first phase rotation values are phase rotation values defined for an optimum PAPR of the L-STF and the L-LTF. When the PAPR of the L-STF and the L-LTF is large, the first phase rotation values can be applied to the legacy preamble in order to minimize the PAPR. Further, the first phase rotation values are also phase rotation values defined to minimize a maximum PAPR acquired in consideration of a maximum transmission bandwidth supported by RF. That is, the first phase rotation values may be phase rotation values defined to acquire an optimum PAPR in the L-STF and the L-LTF in a situation in which various RF capabilities are considered.

The first phase rotation values are acquired based on second phase rotation values and third phase rotation values.

The second phase rotation values are obtained by repeating phase rotation values defined for an 80 MHz band in the 802.11ax system. Since the EHT PPDU is transmitted through the 320 MHz band, the second phase rotation values may be obtained by repeating phase rotation values of the 80 MHz band, which optimizes the PAPR in the L-STF and the L-LTF and is applied in units of 20 MHz, four times. If the PPDU is transmitted through a 160 MHz band, the second phase rotation values may be obtained by repeating the phase rotation values of the 80 MHz band (which optimizes the PAPR in the L-STF and the L-LTF and is applied in units of 20 MHz) twice. If the EHT PPDU is transmitted through a 240 MHz band, the second phase rotation values may be obtained by repeating the phase rotation values of the 80 MHz band (which optimizes the PAPR in the L-STF and the L-LTF and is applied in units of 20 MHz) three times.

The third phase rotation values are phase rotation values defined in units of 80 MHz in the 320 MHz band. Since the 320 MHz band can be divided into four 80 MHz bands, the third phase rotation values can be defined for each of the four 80 MHz bands. If the EHT PPDU is transmitted through the 160 MHz band, the third phase rotation values may be defined for each of two 80 MHz bands based on an optimum PAP R of the L-STF and the L-LTF. If the EHT PPDU is transmitted through the 240 MHz band, the third phase rotation values may be defined for each of three 80 MHz bands based on the optimum PAPR of the L-STF and the L-LTF.

That is, the present embodiment proposes a method of additionally performing phase rotation (third phase rotation values) in units of 80 MHz in the whole band while applying phase rotation values (second phase rotation values) defined in the 80 MHz band.

Hereinafter, a subcarrier range to which phase rotation values are applied will be described.

The aforementioned 320 MHz band may be composed of subcarriers having subcarrier indexes of −512 to 511.

The second phase rotation values may be [1 −1 −1 −1 1 −1 −1 −1 1 −1 −1 −1 1 −1 −1 −1] because it is obtained by repeating the phase rotation values [1 −1 −1 −1] of the 80 MHz band, defined above, four times.

The first value "1" in the second phase rotation values may be applied to subcarriers having subcarrier indexes of −512 to −449, the second value "−1" in the second phase rotation value may be applied to subcarriers having subcarrier indexes of −448 to −385, the third value "−1" in the second phase rotation value may be applied to subcarriers having subcarrier indexes of −384 to −321, and the fourth value "−1" in the second phase rotation value may be applied to subcarriers having subcarrier indexes of −320 to −257. That is, the first to fourth values [1 −1 −1 −1] in the second phase rotation values may be applied to the first 80 MHz band in the 320 MHz band.

The fifth value "1" in the second phase rotation values may be applied to subcarriers having subcarrier indexes of −256 to −193, the sixth value "−1" in the second phase rotation value may be applied to subcarriers having subcarrier indexes of −192 to −129, the seventh value "−1" in the second phase rotation value may be applied to subcarriers having subcarrier indexes of −128 to −65, and the eighth value "−1" in the second phase rotation value may be applied to subcarriers having subcarrier indexes of −64 to −1. That is, the fifth to eighth values [1 −1 −1 −1] in the second phase rotation values may be applied to the second 80 MHz band in the 320 MHz band.

The ninth value "1" in the second phase rotation values may be applied to subcarriers having subcarrier indexes of 0 to 63, the tenth value "−1" in the second phase rotation value may be applied to subcarriers having subcarrier indexes of 64 to 127, the eleventh value "−1" in the second phase rotation value may be applied to subcarriers having subcarrier indexes of 128 to 191, and the twelfth value "−1" in the second phase rotation value may be applied to subcarriers having subcarrier indexes of 192 to 255. That is, the ninth to twelfth values [1 −1 −1 −1] in the second phase rotation values may be applied to the third 80 MHz band in the 320 MHz band.

The thirteenth value "1" in the second phase rotation values may be applied to subcarriers having subcarrier indexes of 256 to 319, the fourteenth value "−1" in the second phase rotation value may be applied to subcarriers having subcarrier indexes of 320 to 383, the fifteenth value "−1" in the second phase rotation value may be applied to subcarriers having subcarrier indexes of 384 to 447, and the sixteenth value "−1" in the second phase rotation value may be applied to subcarriers having subcarrier indexes of 448 to 511. That is, the thirteenth to sixteenth values [1 −1 −1 −1] in the second phase rotation values may be applied to the fourth 80 MHz band in the 320 MHz band.

For example, the third phase rotation values may be [1−j −j 1]. Since the 320 MHz band has four 80 MHz bands, the third phase rotation values may be defined for each of the four 80 MHz bands.

The first value "1" in the third phase rotation values may be applied to the first 80 MHz band in the 320 MHz band, the second value "−j" in the third phase rotation values may be applied to the second 80 MHz band in the 320 MHz band, the third value "−j" in the third phase rotation values may be applied to the third 80 MHz band in the 320 MHz band, and the fourth value "1" in the third phase rotation values may be applied to the fourth 80 MHz band in the 320 MHz band.

The first phase rotation values may be obtained based on products of the second phase rotation values and the third phase rotation values. That is, the first phase rotation values can be obtained by multiplying the second phase rotation values by the third phase rotation values in accordance with frequency bands (or subcarrier indexes). Here, the first phase rotation values are [1 −1 −1 −1 −j j −j j j 1 −1 −1−1]. By applying the first phase rotation values to the legacy preamble, an optimum PAPR with respect to the L-STF and the L-LTF can be ensured for transmission through the 320 MHz band in consideration of various RF capabilities.

As another example, the third phase rotation values may be [1 j j 1]. Since the 320 MHz band has four 80 MHz bands, the third phase rotation values may be defined for each of the four 80 MHz bands.

The first value "1" in the third phase rotation values may be applied to the first 80 MHz band in the 320 MHz band, the second value "j" in the third phase rotation values may be applied to the second 80 MHz band in the 320 MHz band, the third value "j" in the third phase rotation values may be applied to the third 80 MHz band in the 320 MHz band, and the fourth value "1" in the third phase rotation values may be applied to the fourth 80 MHz band in the 320 MHz band.

The first phase rotation values may be obtained based on products of the second phase rotation values and the third phase rotation values. That is, the first phase rotation values can be obtained by multiplying the second phase rotation values by the third phase rotation values in accordance with frequency bands (or subcarrier indexes). Here, the first phase rotation values are [1 −1 −1 −1 j −j −j −j j −j −j −j 1 −1 −1 −1]. By applying the first phase rotation values to the legacy preamble, an optimum PAPR with respect to the L-STF and the L-LTF can be ensured for transmission through the 320 MHz band in consideration of various RF capabilities.

The maximum transmission bandwidth supported by RF may be 80 MHz, 160 MHz, 240 MHz, or 320 MHz. When the maximum transmission bandwidth supported by RF is 80 MHz, the transmitting device can transmit the PPDU using one RF having 80 MHz capacity. When the maximum transmission bandwidth supported by RF is 160 MHz, the transmitting device can transmit the PPDU using two RFs each having 80 MHz capacity. When the maximum transmission bandwidth supported by RF is 240 MHz, the transmitting device can transmit the PPDU using three RFs each having 80 MHz capacity. When the maximum transmission bandwidth supported by RF is 320 MHz, the transmitting device can transmit the PPDU using four RFs each having 80 MHz capacity.

An optimum, PAPR obtained based on the maximum transmission bandwidth supported by RF may be selected by comparing first to fourth PAPRs. That is, the transmitting device may extract maximum PAPR values by calculating PAPRs for RFs having various capacities and compare the extracted PAPR values to determine optimized phase rotation values. Here, the first phase rotation values have a unified form instead of a form having different values depending on the RFs having various capacities.

The first PAPR may be an optimum PAPR obtained when the maximum transmission bandwidth supported by RF is 80 MHz. The second PAPR may be an optimum PAPR obtained when the maximum transmission bandwidth supported by RF is 160 MHz. The third PAPR may be an optimum PAPR obtained when the maximum transmission bandwidth supported by RF is 240 MHz. The fourth PAPR may be an optimum PAPR obtained when the maximum transmission bandwidth supported by RF is 320 MHz.

The L-STF may be generated by applying the first phase rotation values to an L-STF sequence. Further, the L-LTF may be generated by applying the first phase rotation values to an L-LTF sequence.

The L-STF sequence may be a sequence obtained by repeating an L-STF sequence defined for a 20 MHz band. Since the L-STF is transmitted through the 320 MHz band, the L-STF sequence may be obtained by repeating the L-STF sequence of the 20 MHz band defined in legacy 802.11ax. Similarly, if the L-STF is transmitted through the 160 MHz band, the L-STF sequence of the 20 MHz band defined in legacy 802.11ax may be repeated twice. If the L-STF is transmitted through the 240 MHz band, the L-STF sequence of the 20 MHz band defined in legacy 802.11ax may be repeated three times.

The L-STF sequence defined for the 20 MHz band is sqrt(½)*[0 0 0 0 0 0 0 0 1+j 0 0 0 −1−j 0001+j 0 0 0 −1−j 0 0 0 −1−j 0 0 0 1+j 0 0 0 0 0 0 0 −1−j 0 0 0 −1−j 0001+j 0001+j 0 0 0 1+j 0 0 0 1+j 0 0 0 0 0 0 0].

The L-LTF sequence may be a sequence obtained by repeating an L-LTF sequence defined for the 20 MHz band. Since the L-LTF is transmitted through the 320 MHz band, the L-LTF sequence may be obtained by repeating the L-LTF sequence of the 20 MHz band defined in legacy 802.11ax. Similarly, if the L-LTF is transmitted through the 160 MHz band, the L-LTF sequence of the 20 MHz band defined in legacy 802.11ax may be repeated twice. If the L-LTF is transmitted through the 240 MHz band, the L-LTF sequence of the 20 MHz band defined in legacy 802.11ax may be repeated three times.

The L-LTF sequence defined for the 20 MHz band is [0 0 0 0 0 1 1 −1 −1 1 1 −1 1 −1 1 1 1 1 1 1 −1 −1 1 1 −1 1 −1 1 1 1 1 0 1 −1 −1 1 1 −1 1 −1 1 −1 −1 −1 −1 −1 1 1 −1 −1 1 −1 1 −1 1 1 1 1 0 0 0 0 0].

In the above-described embodiment, even when the PPDU is transmitted through 80/160/240 MHz bands, phase rotation values may be defined and applied to the legacy preamble in the same manner.

The EHT-SIG may include EHT-SIG-A and EHT-SIG-B. The EHT-SIG-B may include the RU information. That is, the AP can signal the information about the tone plan in the 80/160/240/320 MHz through the EHT-SIG-B in the PPDU. Further, the EHT-STF, EHT-LTF, and data field included in the EHT field may be transmitted/received in a band (RU) according to the tone plan in 80/160/240/320 MHz.

In addition, the EHT-SIG may be generated by applying the first phase rotation values or the second phase rotation values. If the EHT PPDU has the same preamble structure as that of 11ax, the same phase rotation values may be applied up to the EHT-SIG-B to generate the field.

Figure 19:
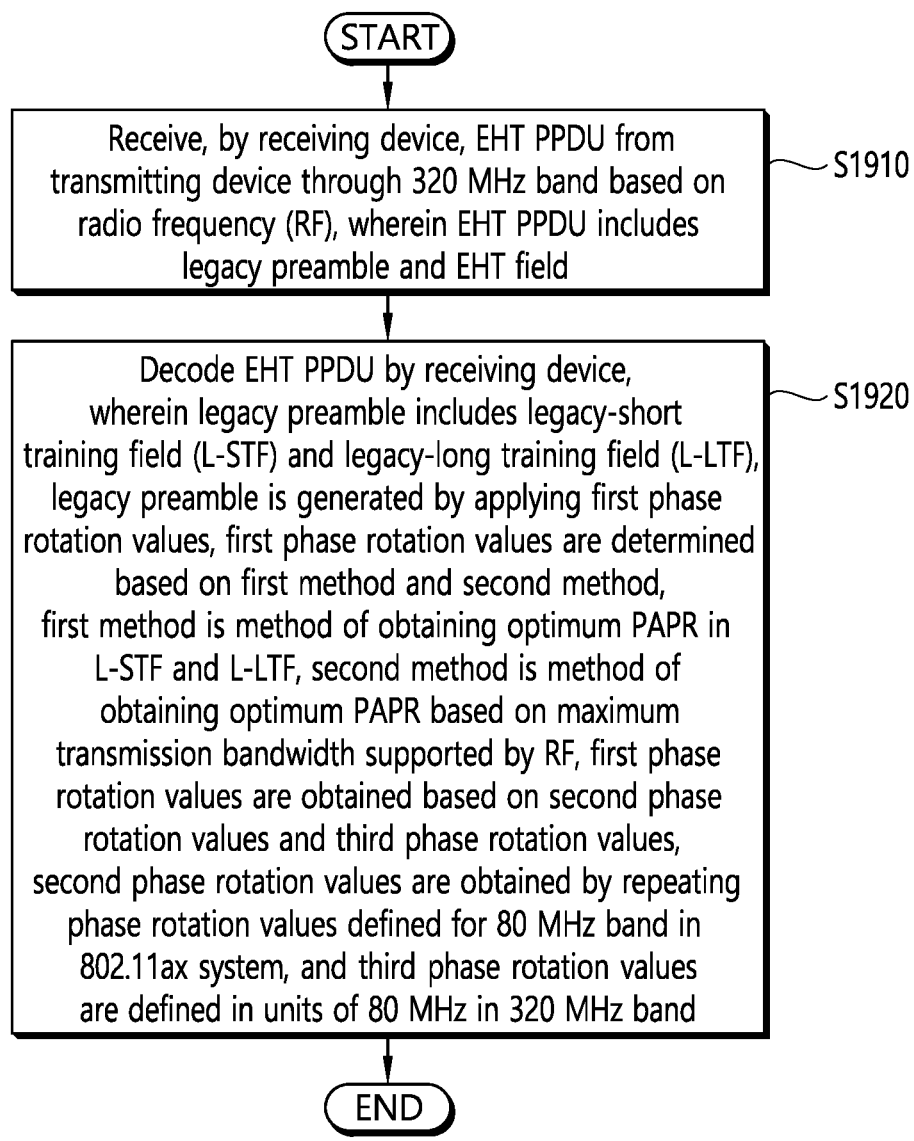
FIG. 19 is a flowchart illustrating a procedure of receiving the EHT PPDU according to the present embodiment.

FIG. 19 is a flowchart illustrating a procedure of receiving an EHT PPDU according to the present embodiment.

The example of FIG. 19 may be performed in network environments in which a next-generation WLAN system is supported. The next-generation WLAN system is a WLAN system evolving from the 802.11ax system and can satisfy backward compatibility with the 802.11ax system. The next-generation WLAN system may correspond to an EHT (Extreme High Throughput) WLAN system or the 802.11be WLAN system.

The example of FIG. 19 may be performed in a receiving device, and the receiving device may correspond to an STA (non-AP STA). A transmitting device may correspond to an AP.

The present embodiment proposes a method and device for setting phase rotation values by which an optimized PAPR can be obtained in consideration of a case in which there are wireless devices having different maximum transmission bandwidths supported by RF (Radio Frequency). That is, phase rotation values for minimizing a maximum PAPR in consideration of RF capabilities of wireless devices having different maximum transmission bandwidths of RF in a BSS are proposed. An EHT PPDU proposed in the present embodiment can be transmitted and received in 80/160/240/320 MHz bands. However, description will be limited to the 320 MHz band.

In step S1910, the receiving device receives the aforementioned EHT PPDU from the transmitting device through a 320 MHz band based on RF. The EHT PPDU includes a legacy preamble and an EHT field.

In step S1920, the receiving device decodes the EHT PPDU.

The legacy preamble includes an L-STF (Legacy-Short Training Field) and an L-LTF (Legacy-Long Training Field). In addition, the legacy preamble may further include an L-SIG (Legacy-Signal). The EHT field may include EHT-SIG, EHT-STF, EHT-LTF, and a data field. The legacy field is a field supported by WLAN systems before 802.11be and the EHT field may be a field supported by the 802.11be WLAN system.

The legacy preamble includes an L-STF (Legacy-Short Training Field) and an L-LTF (Legacy-Long Training Field). In addition, the legacy preamble may further include an L-SIG (Legacy-Signal). The EHT field may include EHT-SIG, EHT-STF, EHT-LTF, and a data field. The legacy field is a field supported by WLAN systems before 802.11be and the EHT field may be a field supported by the 802.11be WLAN system.

The legacy preamble is generated by applying first phase rotation values thereto. That is, the first phase rotation values can be commonly applied to all fields included in the legacy preamble.

The first phase rotation values are determined based on a first method and a second method.

The first method is a method of acquiring an optimum PAPR in the L-STF and the L-LTF. The second method is a method of acquiring an optimum PAPR based on a maximum transmission bandwidth supported by RF.

That is, the first phase rotation values are phase rotation values defined for an optimum PAPR of the L-STF and the L-LTF. When the PAPR of the L-STF and the L-LTF is large, the first phase rotation values can be applied to the legacy preamble in order to minimize the PAPR. Further, the first phase rotation values are also phase rotation values defined to minimize a maximum PAPR acquired in consideration of a maximum transmission bandwidth supported by RF. That is, the first phase rotation values may be phase rotation values defined to acquire an optimum PAPR in the L-STF and the L-LTF in a situation in which various RF capabilities are considered.

The first phase rotation values are acquired based on second phase rotation values and third phase rotation values.

The second phase rotation values are obtained by repeating phase rotation values defined for an 80 MHz band in the 802.11ax system. Since the EHT PPDU is transmitted through the 320 MHz band, the second phase rotation values may be obtained by repeating phase rotation values of the 80 MHz band, which optimizes a PAPR in the L-STF and the L-LTF and is applied in units of 20 MHz, four times. If the PPDU is transmitted through a 160 MHz band, the second phase rotation values may be obtained by repeating the phase rotation values of the 80 MHz band (which optimizes PAPR in the L-STF and the L-LTF and is applied in units of 20 MHz) twice. If the EHT PPDU is transmitted through a 240 MHz band, the second phase rotation values may be obtained by repeating the phase rotation values of the 80 MHz band (which optimizes PAPR in the L-STF and the L-LTF and is applied in units of 20 MHz) three times.

The third phase rotation values are phase rotation values defined in units of 80 MHz in the 320 MHz band. Since the 320 MHz band can be divided into four 80 MHz bands, the third phase rotation values can be defined for each of the four 80 MHz bands. If the EHT PPDU is transmitted through the 160 MHz band, the third phase rotation values may be defined for each of two 80 MHz bands based on an optimum PAPR of the L-STF and the L-LTF. If the EHT PPDU is transmitted through the 240 MHz band, the third phase rotation values may be defined for each of three 80 MHz bands based on the optimum PAPR of the L-STF and the L-LTF.

That is, the present embodiment proposes a method of additionally performing phase rotation (third phase rotation values) in units of 80 MHz in the whole band while applying phase rotation values (second phase rotation values) defined in the 80 MHz band.

Hereinafter, a subcarrier range to which phase rotation values are applied will be described.

The aforementioned 320 MHz band may be composed of subcarriers having subcarrier indexes of −512 to 511.

The second phase rotation values may be [1 −1 −1 −1 1 −1 −1 −1 1 −1 −1 −1 1 −1 −1 −1] because it is obtained by repeating the phase rotation values [1 −1 −1 −1] of the 80 MHz band, defined above, four times.

The first value "1" in the second phase rotation values may be applied to subcarriers having subcarrier indexes of −512 to −449, the second value "−1" in the second phase rotation value may be applied to subcarriers having subcarrier indexes of −448 to −385, the third value "−1" in the second phase rotation value may be applied to subcarriers having subcarrier indexes of −3M to −321, and the fourth value "−1" in the second phase rotation value may be applied to subcarriers having subcarrier indexes of −320 to −257. That is, the first to fourth values [1 −1 −1 −1] in the second phase rotation values may be applied to the first 80 MHz band in the 320 MHz band.

The fifth value "1" in the second phase rotation values may be applied to subcarriers having subcarrier indexes of −256 to −193, the sixth value "−1" in the second phase rotation value may be applied to subcarriers having subcarrier indexes of −192 to −129, the seventh value "−1" in the second phase rotation value may be applied to subcarriers having subcarrier indexes of −128 to −65, and the eighth value "−1" in the second phase rotation value may be applied to subcarriers having subcarrier indexes of −64 to −1. That is, the fifth to eighth values [1 −1 −1 −1] in the second phase rotation values may be applied to the second 80 MHz band in the 320 MHz band.

The ninth value "1" in the second phase rotation values may be applied to subcarriers having subcarrier indexes of 0 to 63, the tenth value "−1" in the second phase rotation value may be applied to subcarriers having subcarrier indexes of 64 to 127, the eleventh value "−1" in the second phase rotation value may be applied to subcarriers having subcarrier indexes of 128 to 191, and the twelfth value "−1" in the second phase rotation value may be applied to subcarriers having subcarrier indexes of 192 to 255. That is, the ninth to twelfth values [1 −1 −1 −1] in the second phase rotation values may be applied to the third 80 MHz band in the 320 MHz band.

The thirteenth value "1" in the second phase rotation values may be applied to subcarriers having subcarrier indexes of 256 to 319, the fourteenth value "−1" in the second phase rotation value may be applied to subcarriers having subcarrier indexes of 320 to 383, the fifteenth value "−1" in the second phase rotation value may be applied to subcarriers having subcarrier indexes of 384 to 447, and the sixteenth value "−1" in the second phase rotation value may be applied to subcarriers having subcarrier indexes of 448 to 511. That is, the thirteenth to sixteenth values [1 −1 −1 −1]

in the second phase rotation values may be applied to the fourth 80 MHz band in the 320 MHz band.

For example, the third phase rotation values may be [1 −j −j 1]. Since the 320 MHz band has four 80 MHz bands, the third phase rotation values may be defined for each of the four 80 MHz bands.

The first value "1" in the third phase rotation values may be applied to the first 80 MHz band in the 320 MHz band, the second value "−j" in the third phase rotation values may be applied to the second 80 MHz band in the 320 MHz band, the third value "−j" in the third phase rotation values may be applied to the third 80 MHz band in the 320 MHz band, and the fourth value "1" in the third phase rotation values may be applied to the fourth 80 MHz band in the 320 MHz band.

The first phase rotation values may be obtained based on products of the second phase rotation values and the third phase rotation values. That is, the first phase rotation values can be obtained by multiplying the second phase rotation values by the third phase rotation values in accordance with frequency bands (or subcarrier indexes). Here, the first phase rotation values are [1 −1 −1 −1 −j j j j −j j j j 1 −1 −1−1]. By applying the first phase rotation values to the legacy preamble, an optimum PAPR with respect to the L-STF and the L-LTF can be ensured for transmission through the 320 MHz band in consideration of various RF capabilities.

As another example, the third phase rotation values may be [1 j j 1]. Since the 320 MHz band has four 80 MHz bands, the third phase rotation values may be defined for each of the four 80 MHz bands.

The first value "1" in the third phase rotation values may be applied to the first 80 MHz band in the 320 MHz band, the second value "j" in the third phase rotation values may be applied to the second 80 MHz band in the 320 MHz band, the third value "j" in the third phase rotation values may be applied to the third 80 MHz band in the 320 MHz band, and the fourth value "1" in the third phase rotation values may be applied to the fourth 80 MHz band in the 320 MHz band.

The first phase rotation values may be obtained based on products of the second phase rotation values and the third phase rotation values. That is, the first phase rotation values can be obtained by multiplying the second phase rotation values by the third phase rotation values in accordance with frequency bands (or subcarrier indexes). Here, the first phase rotation values are [1 −1 −1 −1 j −j −j −j j j −j −j −j 1 −1 −1 −1]. By applying the first phase rotation values to the legacy preamble, an optimum PAPR with respect to the L-STF and the L-LTF can be ensured for transmission through the 320 MHz band in consideration of various RF capabilities.

The maximum transmission bandwidth supported by RF may be 80 MHz, 160 MHz, 240 MHz, or 320 MHz. When the maximum transmission bandwidth supported by RF is 80 MHz, the transmitting device can transmit the PPDU using one RF having 80 MHz capacity. When the maximum transmission bandwidth supported by RF is 160 MHz, the transmitting device can transmit the PPDU using two RFs each having 80 MHz capacity. When the maximum transmission bandwidth supported by RF is 240 MHz, the transmitting device can transmit the PPDU using three RFs each having 80 MHz capacity. When the maximum transmission bandwidth supported by RF is 320 MHz, the transmitting device can transmit the PPDU using four RFs each having 80 MHz capacity.

An optimum PAPR obtained based on the maximum transmission bandwidth supported by RF may be selected by comparing first to fourth PAPRs. That is, the transmitting device may extract maximum PAPR values by calculating PAPRs for RFs having various capacities and compare the extracted PAPR values to determine optimized phase rotation values. Here, the first phase rotation values have a unified form instead of a form having different values depending on the RFs having various capacities.

The first PAPR may be an optimum PAPR obtained when the maximum transmission bandwidth supported by RF is 80 MHz. The second PAPR may be an optimum PAPR obtained when the maximum transmission bandwidth supported by RF is 160 MHz. The third PAPR may be an optimum PAPR obtained when the maximum transmission bandwidth supported by RF is 240 MHz. The fourth PAPR may be an optimum PAPR obtained when the maximum transmission bandwidth supported by RF is 320 MHz.

The L-STF may be generated by applying the first phase rotation values to an L-STF sequence. Further, the L-LTF may be generated by applying the first phase rotation values to an L-LTF sequence.

The L-STF sequence may be a sequence obtained by repeating an L-STF sequence defined for a 20 MHz band. Since the L-STF is transmitted through the 320 MHz band, the L-STF sequence may be obtained by repeating the L-STF sequence of the 20 MHz band defined in legacy 802.11ax. Similarly, if the L-STF is transmitted through the 160 MHz band, the L-STF sequence of the 20 MHz band defined in legacy 802.11ax may be repeated twice. If the L-STF is transmitted through the 240 MHz band, the L-STF sequence of the 20 MHz band defined in legacy 802.11ax may be repeated three times.

The L-STF sequence defined for the 20 MHz band is sqrt(½)*[0 0 0 0 0 0 0 0 1+j 0 0 0 −1−j 0 0 0 1+j 0 0 0 −1−j 0 0 0 −1−j 0 0 0 1+j 0 0 0 0 0 0 0 −1−j 0 0 0 −1−j 0 0 0 1+j 0 0 0 1+j 0 0 0 1+j 0 0 0 1+j 0 0 0 0 0 0 0].

The L-LTF sequence may be a sequence obtained by repeating an L-LTF sequence defined for the 20 MHz band. Since the L-LTF is transmitted through the 320 MHz band, the L-LTF sequence may be obtained by repeating the L-LTF sequence of the 20 MHz band defined in legacy 802.11ax. Similarly, if the L-LTF is transmitted through the 160 MHz band, the L-LTF sequence of the 20 MHz band defined in legacy 802.11ax may be repeated twice. If the L-LTF is transmitted through the 240 MHz band, the L-LTF sequence of the 20 MHz band defined in legacy 802.11ax may be repeated three times.

The L-LTF sequence defined for the 20 MHz band is [0 0 0 0 0 0 1 1 −1 −1 1 1 −1 1 −1 1 1 1 1 1 1 −1 −1 1 1 −1 1 −1 1 1 1 1 0 −1 −1 1 1 −1 1 −1 1 −1 −1 −1 −1 −1 1 1 −1 −1 1 −1 1 −1 1 1 1 1 0 0 0 0 0].

In the above-described embodiment, even when the PPDU is transmitted through 80/160/240 MHz bands, phase rotation values may be defined and applied to the legacy preamble in the same manner.

The EHT-SIG may include EHT-SIG-A and EHT-SIG-B. The EHT-SIG-B may include the RU information. That is, the AP can signal the information about the tone plan in the 80/160/240/320 MHz through the EHT-SIG-B in the PPDU. Further, the EHT-STF, EHT-LTF, and data field included in the EHT field may be transmitted/received in a band (RU) according to the tone plan in 80/160/240/320 MHz In addition, the EHT-SIG may be generated by applying the first phase rotation values or the second phase rotation values. If the EHT PPDU has the same preamble structure as that of 11ax, the same phase rotation values may be applied up to the EHT-SIG-B to generate the field.

6. Device Configuration

Figure 20:
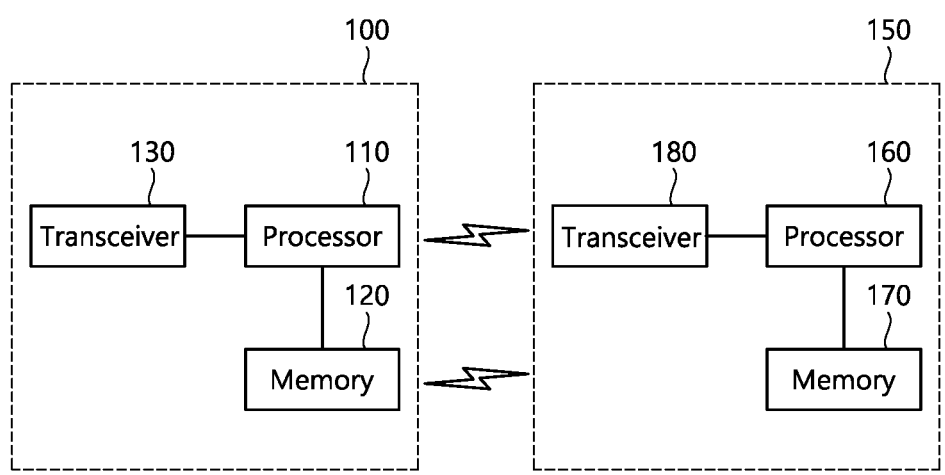
FIG. 20 is a diagram for describing a device for implementing the above-described method.

FIG. 20 is a diagram for describing devices for implementing the above-described method.

A wireless device 100 of FIG. 20 is a transmitting device capable of implementing the above-described embodiment and may operate as an AP STA. A wireless device 150 of FIG. 20 is a receiving device capable of implementing the above-described embodiment and may operate as a non-AP STA.

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor 110, 160 may implement the functions, processes and/or methods proposed in the present disclosure. For example, the processor 110, 160 may perform the operation according to the present embodiment.

The specific operation of the processor 110 of the transmitting device is as follows. The processor 110 of the transmitting device generates an EHT PPDU and transmits the EHT PPDU through an 80/160/240/320 MHz band based on RF.

The specific operation of the processor 160 of the receiving device is as follows. The processor 160 of the receiving device receives the EHT PPDU from the transmitting device through an 80/160/240/320 MHz band based on RF and decodes the EHT PPDU for a band supported by the receiving device.

Figure 21:
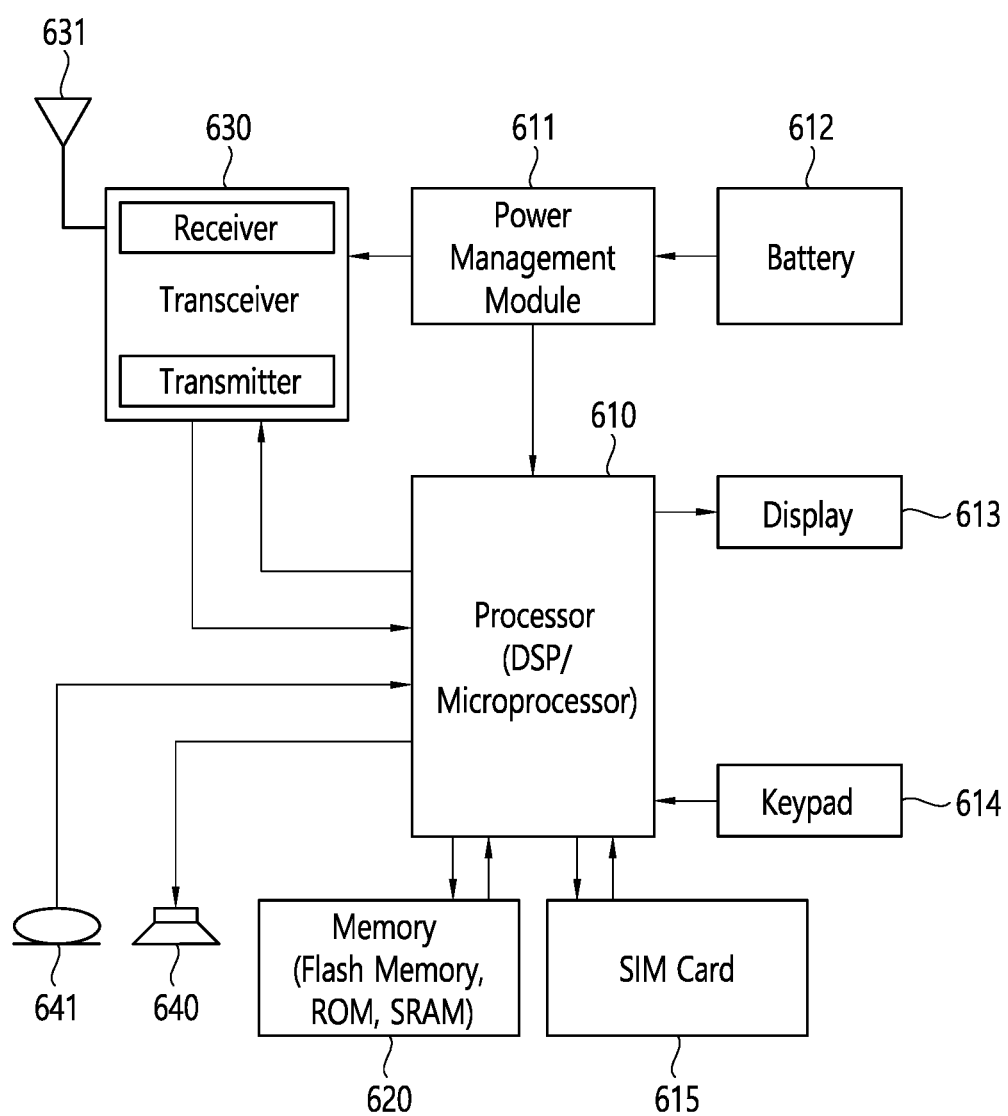
FIG. 21 illustrates a more detailed wireless device for implementing the embodiment of the present disclosure.

FIG. 21 shows a UE to which the technical features of the present disclosure can be applied.

A UE includes a processor 610, a power management module 611, a battery 612, a display 613, a keypad 614, a subscriber identification module (SIM) card 615, a memory 620, a transceiver 630, one or more antennas 631, a speaker 640, and a microphone 641.

The processor 610 may be configured to implement proposed functions, procedures and/or methods of the present disclosure described below. The processor 610 may be configured to control one or more other components of the UE 600 to implement proposed functions, procedures and/or methods of the present disclosure described below. Layers of the radio interface protocol may be implemented in the processor 610. The processor 610 may include application-specific integrated circuit (ASIC), other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include read-only memory (ROM), random access memory (RAM), flash memory, memory card, storage medium and/or other storage device. When the embodiments are implemented in software, the techniques described herein can be implemented with modules (e.g., procedures, functions, and soon) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

In the case of the transmitting device, the processor 610 generates an EHT PPDU and transmits the EHT PPDU through an 80/160/240/320 MHz band based on RF.

In the case of the receiving device, the processor 610 receives the EHT PPDU from the transmitting device through an 80/160/240/320 MHz band based on RF and decodes the EHT PPDU for a band supported by the receiving device.

The legacy preamble includes an L-STF (Legacy-Short Training Field) and an L-LTF (Legacy-Long Training Field). In addition, the legacy preamble may further include an L-SIG (Legacy-Signal). The EHT field may include EHT-SIG, EHT-STF, EHT-LTF, and a data field. The legacy field is a field supported by WLAN systems before 802.11be and the EHT field may be a field supported by the 802.11be WLAN system The legacy preamble is generated by applying first phase rotation values thereto. That is, the first phase rotation values can be commonly applied to all fields included in the legacy preamble.

The first phase rotation values are determined based on a first method and a second method.

The first method is a method of acquiring an optimum PAPR in the L-STF and the L-LTF. The second method is a method of acquiring an optimum PAPR based on a maximum transmission bandwidth supported by RF.

That is, the first phase rotation values are phase rotation values defined for an optimum PAPR of the L-STF and the L-LTF. When the PAPR of the L-STF and the L-LTF is large, the first phase rotation values can be applied to the legacy preamble in order to minimize the PAPR. Further, the first phase rotation values are also phase rotation values defined to minimize a maximum PAPR acquired in consideration of a maximum transmission bandwidth supported by RF. That is, the first phase rotation values may be phase rotation values defined to acquire an optimum PAPR in the L-STF and the L-LTF in a situation in which various RF capabilities are considered.

The first phase rotation values are acquired based on second phase rotation values and third phase rotation values.

The second phase rotation values are obtained by repeating phase rotation values defined for an 80 MHz band in the 802.11ax system. Since the EHT PPDU is transmitted through the 320 MHz band, the second phase rotation values may be obtained by repeating phase rotation values of the 80 MHz band, which optimizes a PAPR in the L-STF and the L-LTF and is applied in units of 20 MHz, four times. If the PPDU is transmitted through a 160 MHz band, the second phase rotation values may be obtained by repeating the phase rotation values of the 80 MHz band (which optimizes the PAPR in the L-STF and the L-LTF and is applied in units of 20 MHz) twice. If the EHT PPDU is transmitted through a 240 MHz band, the second phase rotation values may be obtained by repeating the phase rotation values of the 80 MHz band (which optimizes the PAPR in the L-STF and the L-LTF and is applied in units of 20 MHz) three times.

The third phase rotation values are phase rotation values defined in units of 80 MHz in the 320 MHz band. Since the 320 MHz band can be divided into four 80 MHz bands, the third phase rotation values can be defined for each of the four 80 MHz bands. If the EHT PPDU is transmitted through the 160 MHz band, the third phase rotation values may be defined for each of two 80 MHz bands based on an optimum PAPR of the L-STF and the L-LTF. If the EHT PPDU is transmitted through the 240 MHz band, the third phase rotation values may be defined for each of three 80 MHz bands based on the optimum PAPR of the L-STF and the L-LTF.

That is, the present embodiment proposes a method of additionally performing phase rotation (third phase rotation values) in units of 80 MHz in the whole band while applying phase rotation values (second phase rotation values) defined in the 80 MHz band.

Hereinafter, a subcarrier range to which phase rotation values are applied will be described.

The aforementioned 320 MHz band may be composed of subcarriers having subcarrier indexes of −512 to 511.

The second phase rotation values may be [1 −1 −1 −1 1 −1 −1−1 1 −1 −1−1 1 −1 −1−1] because it is obtained by repeating the phase rotation values [1 −1 −1 −1] of the 80 MHz band, defined above, four times.

The first value "1" in the second phase rotation values may be applied to subcarriers having subcarrier indexes of −512 to −449, the second value "−1" in the second phase rotation value may be applied to subcarriers having subcarrier indexes of −448 to −385, the third value "−1" in the second phase rotation value may be applied to subcarriers having subcarrier indexes of −384 to −321, and the fourth value "−1" in the second phase rotation value may be applied to subcarriers having subcarrier indexes of −320 to −257. That is, the first to fourth values [1 −1 −1 −1] in the second phase rotation values may be applied to the first 80 MHz band in the 320 MHz band.

The fifth value "1" in the second phase rotation values may be applied to subcarriers having subcarrier indexes of −256 to −193, the sixth value "−1" in the second phase rotation value may be applied to subcarriers having subcarrier indexes of −192 to −129, the seventh value "−1" in the second phase rotation value may be applied to subcarriers having subcarrier indexes of −128 to −65, and the eighth value "−1" in the second phase rotation value may be applied to subcarriers having subcarrier indexes of −64 to −1. That is, the fifth to eighth values [1 −1 −1 −1] in the second phase rotation values may be applied to the second 80 MHz band in the 320 MHz band.

The ninth value "1" in the second phase rotation values may be applied to subcarriers having subcarrier indexes of 0 to 63, the tenth value "−1" in the second phase rotation value may be applied to subcarriers having subcarrier indexes of 64 to 127, the eleventh value "−1" in the second phase rotation value may be applied to subcarriers having subcarrier indexes of 128 to 191, and the twelfth value "−1" in the second phase rotation value may be applied to subcarriers having subcarrier indexes of 192 to 255. That is, the ninth to twelfth values [1 −1 −1 −1] in the second phase rotation values may be applied to the third 80 MHz band in the 320 MHz band.

The thirteenth value "1" in the second phase rotation values may be applied to subcarriers having subcarrier indexes of 256 to 319, the fourteenth value "−1" in the second phase rotation value may be applied to subcarriers having subcarrier indexes of 320 to 383, the fifteenth value "−1" in the second phase rotation value may be applied to subcarriers having subcarrier indexes of 384 to 447, and the sixteenth value "−1" in the second phase rotation value may be applied to subcarriers having subcarrier indexes of 448 to 511. That is, the thirteenth to sixteenth values [1 −1 −1 −1] in the second phase rotation values may be applied to the fourth 80 MHz band in the 320 MHz band.

For example, the third phase rotation values may be [1 −j −j 1]. Since the 320 MHz band has four 80 MHz bands, the third phase rotation values may be defined for each of the four 80 MHz bands.

The first value "1" in the third phase rotation values may be applied to the first 80 MHz band in the 320 MHz band, the second value "−j" in the third phase rotation values may be applied to the second 80 MHz band in the 320 MHz band, the third value "−j" in the third phase rotation values may be applied to the third 80 MHz band in the 320 MHz band, and the fourth value "1" in the third phase rotation values may be applied to the fourth 80 MHz band in the 320 MHz band.

The first phase rotation values may be obtained based on products of the second phase rotation values and the third phase rotation values. That is, the first phase rotation values can be obtained by multiplying the second phase rotation values by the third phase rotation values in accordance with frequency bands (or subcarrier indexes). Here, the first phase rotation values are [1 −1 −1 −1 −j j j j −j j j j 1 −1 −1−1]. By applying the first phase rotation values to the legacy preamble, an optimum PAPR with respect to the L-STF and the L-LTF can be ensured for transmission through the 320 MHz band in consideration of various RF capabilities.

As another example, the third phase rotation values may be [1 j j 1]. Since the 320 MHz band has four 80 MHz bands, the third phase rotation values may be defined for each of the four 80 MHz bands.

The first value "1" in the third phase rotation values may be applied to the first 80 MHz band in the 320 MHz band, the second value "j" in the third phase rotation values may be applied to the second 80 MHz band in the 320 MHz band, the third value "j" in the third phase rotation values may be applied to the third 80 MHz band in the 320 MHz band, and the fourth value "1" in the third phase rotation values may be applied to the fourth 80 MHz band in the 320 MHz band.

The first phase rotation values may be obtained based on products of the second phase rotation values and the third phase rotation values. That is, the first phase rotation values can be obtained by multiplying the second phase rotation values by the third phase rotation values in accordance with frequency bands (or subcarrier indexes). Here, the first phase rotation values are [1 −1 −1 −1 j −j −j −j j −j −j −j 1 −1 −1 −1]. By applying the first phase rotation values to the legacy preamble, an optimum PAPR with respect to the L-STF and the L-LTF can be ensured for transmission through the 320 MHz band in consideration of various RF capabilities.

The maximum transmission bandwidth supported by RF may be 80 MHz, 160 MHz, 240 MHz, or 320 MHz. When the maximum transmission bandwidth supported by RF is 80 MHz, the transmitting device can transmit the PPDU using one RF having 80 MHz capacity. When the maximum transmission bandwidth supported by RF is 160 MHz, the transmitting device can transmit the PPDU using two RFs each having 80 MHz capacity. When the maximum transmission bandwidth supported by RF is 240 MHz, the transmitting device can transmit the PPDU using three RFs each having 80 MHz capacity. When the maximum transmission bandwidth supported by RF is 320 MHz, the transmitting device can transmit the PPDU using four RFs each having 80 MHz capacity.

An optimum PAPR obtained based on the maximum transmission bandwidth supported by RF may be selected by comparing first to fourth PAPRs. That is, the transmitting device may extract maximum PAPR values by calculating PAPRs for RFs having various capacities and compare the extracted PAPR values to determine optimized phase rotation values. Here, the first phase rotation values have a unified form instead of a form having different values depending on the RFs having various capacities.

The first PAPR may be an optimum PAPR obtained when the maximum transmission bandwidth supported by RF is 80 MHz. The second PAPR may be an optimum PAPR obtained when the maximum transmission bandwidth supported by RF is 160 MHz. The third PAPR may be an optimum PAPR obtained when the maximum transmission bandwidth supported by RF is 240 MHz. The fourth PAPR may be an optimum PAPR obtained when the maximum transmission bandwidth supported by RF is 320 MHz The L-STF may be generated by applying the first phase rotation values to an L-STF sequence. Further, the L-LTF may be generated by applying the first phase rotation values to an L-LTF sequence.

The L-STF sequence may be a sequence obtained by repeating an L-STF sequence defined for a 20 MHz band. Since the L-STF is transmitted through the 320 MHz band, the L-STF sequence may be obtained by repeating the L-STF sequence of the 20 MHz band defined in legacy 802.11ax. Similarly, if the L-STF is transmitted through the 160 MHz band, the L-STF sequence of the 20 MHz band defined in legacy 802.11ax may be repeated twice. If the L-STF is transmitted through the 240 MHz band, the L-STF sequence of the 20 MHz band defined in legacy 802.11ax may be repeated three times.

The L-STF sequence defined for the 20 MHz band is sqrt(½)*[0 0 0 0 0 0 0 0 1+j 0 0 0 −1−j 0 0 0 1+j 0 0 0 −1−j 0 0 0 −1−j 0 0 0 1+j 0 0 0 0 0 0 0 −1−j 0 0 0 −1−j 0 0 0 1+j 0 0 0 1+j 0 0 0 1+j 0 0 0 1+j 0 0 0 0 0 0].

The L-LTF sequence may be a sequence obtained by repeating an L-LTF sequence defined for the 20 MHz band. Since the L-LTF is transmitted through the 320 MHz band, the L-LTF sequence may be obtained by repeating the L-LTF sequence of the 20 MHz band defined in legacy 802.11ax. Similarly, if the L-LTF is transmitted through the 160 MHz band, the L-LTF sequence of the 20 MHz band defined in legacy 802.11ax may be repeated twice. If the L-LTF is transmitted through the 240 MHz band, the L-LTF sequence of the 20 MHz band defined in legacy 802.11ax may be repeated three times.

The L-LTF sequence defined for the 20 MHz band is [0 0 0 0 0 1 1 −1 −1 1 1 −1 1 −1 1 1 1 1 1 1 −1 −1 1 1 −1 1 −1 1 1 1 1 0 1 −1 −1 1 1 −1 1 −1 1 −1 −1 −1 −1 −1 1 1 −1 −1 1 −1 1 −1 1 1 1 1 0 0 0 0 0].

In the above-described embodiment, even when the PPDU is transmitted through 80/160/240 MHz bands, phase rotation values may be defined and applied to the legacy preamble in the same manner.

The EHT-SIG may include EHT-SIG-A and EHT-SIG-B. The EHT-SIG-B may include the RU information. That is, the AP can signal the information about the tone plan in the 80/160/240/320 MHz through the EHT-SIG-B in the PPDU. Further, the EHT-STF, EHT-LTF, and data field included in the EHT field may be transmitted/received in a band (RU) according to the tone plan in 80/160/240/320 MHz, In addition, the EHT-SIG may be generated by applying the first phase rotation values or the second phase rotation values. If the EHT PPDU has the same preamble structure as that of 11ax, the same phase rotation values may be applied up to the EHT-SIG-B to generate the field.

What is claimed is:

1. A method for transmitting an extreme high throughput (EHT) physical protocol data unit (PPDU) in a WLAN system, the method comprising:
    generating, by a transmitting device, the EHT PPDU, the EHT PPDU including a legacy preamble and an EHT field; and
    transmitting, by the transmitting device, the EHT PPDU to a receiving device through a 320 MHz band based on a radio frequency (RF),
    wherein the legacy preamble includes a legacy-short training field (L-STF) and a legacy-long training field (L-LTF),
    the legacy preamble is generated by applying first phase rotation values,
    the first phase rotation values are obtained based on by multiplying second phase rotation values by third phase rotation values,
    the second phase rotation values are obtained by repeating phase rotation values defined for an 80 MHz band in an 802.11ax system 4 times, and
    the third phase rotation values are phase rotation values additionally applied in units of 80 MHz to the second phase rotation value.

2. The method of claim 1, wherein the 320 MHz band is composed of subcarriers having subcarrier indexes of −512 to 511,
    the second phase rotation values are [1 −1 −1 −1 1 −1 −1 1 1 −1 −1−1 1 −1 −1−1],
    the first value "1" in the second phase rotation values is applied to subcarriers having subcarrier indexes of −512 to −449, the second value "−1" in the second phase rotation value is applied to subcarriers having subcarrier indexes of −448 to −385,
the third value "−1" in the second phase rotation value is applied to subcarriers having subcarrier indexes of −384 to −321,
the fourth value "−1" in the second phase rotation value is applied to subcarriers having subcarrier indexes of −320 to −257,
the fifth value "1" in the second phase rotation values is applied to subcarriers having subcarrier indexes of −256 to −193,
the sixth value "−1" in the second phase rotation value is applied to subcarriers having subcarrier indexes of −192 to −129,
the seventh value "−1" in the second phase rotation value is applied to subcarriers having subcarrier indexes of −128 to −65,
the eighth value "−1" in the second phase rotation value is applied to subcarriers having subcarrier indexes of −64 to −1,
the ninth value "1" in the second phase rotation values is applied to subcarriers having subcarrier indexes of 0 to 63,
the tenth value "−1" in the second phase rotation value is applied to subcarriers having subcarrier indexes of 64 to 127,
the eleventh value "−1" in the second phase rotation value is applied to subcarriers having subcarrier indexes of 128 to 191,
the twelfth value "−1" in the second phase rotation value is applied to subcarriers having subcarrier indexes of 192 to 255,
the thirteenth value "1" in the second phase rotation values is applied to subcarriers having subcarrier indexes of 256 to 319,
the fourteenth value "−1" in the second phase rotation value is applied to subcarriers having subcarrier indexes of 320 to 383,
the fifteenth value "−1" in the second phase rotation value is applied to subcarriers having subcarrier indexes of 384 to 447,
the sixteenth value "−1" in the second phase rotation value is applied to subcarriers having subcarrier indexes of 448 to 511, and
the first phase rotation values are determined based a first optimum PAPR in the L-STF and the L-LTF, and a second optimum PAPR based on a maximum transmission bandwidth supported by the RF.

3. The method of claim 2, wherein the third phase rotation values are [1 −j −j 1],
the first value "1" in the third phase rotation values is applied to a first 80 MHz band in the 320 MHz band,
the second value "−j" in the third phase rotation values is applied to a second 80 MHz band in the 320 MHz band,
the third value "−j" in the third phase rotation values is applied to a third 80 MHz band in the 320 MHz band, and
the fourth value "1" in the third phase rotation values is applied to a fourth 80 MHz band in the 320 MHz band.

4. The method of claim 3, wherein the first phase rotation values are [1 −1 −1 −1 −j j j j −j j j j 1 −1 −1−1].

5. The method of claim 2, wherein the third phase rotation values are [1 j j 1],
the first value "1" in the third phase rotation values is applied to a first 80 MHz band in the 320 MHz band,
the second value "j" in the third phase rotation values is applied to a second 80 MHz band in the 320 MHz band,
the third value "j" in the third phase rotation values is applied to a third 80 MHz band in the 320 MHz band, and
the fourth value "1" in the third phase rotation values is applied to a fourth 80 MHz band in the 320 MHz band.

6. The method of claim 5, wherein the first phase rotation values are [1 −1 −1 −1 j −j −j −j j −j −j −j 1 −1 −1 −1].

7. The method of claim 1, wherein the maximum transmission bandwidth supported by RF is 80 MHz, 160 MHz, 240 MHz, or 320 MHz,
an optimum PAPR obtained based on the maximum transmission bandwidth supported by RF is selected by comparing first to fourth PAPRs,
the first PAPR is an optimum PAPR obtained when the maximum transmission bandwidth supported by RF is 80 MHz,
the second PAPR is an optimum PAPR obtained when the maximum transmission bandwidth supported by RF is 160 MHz,
the third PAPR is an optimum PAPR obtained when the maximum transmission bandwidth supported by RF is 240 MHz, and
the fourth PAPR is an optimum PAPR obtained when the maximum transmission bandwidth supported by RF is 320 MHz.

8. A transmitting device for transmitting an extreme high throughput (EHT) physical protocol data unit (PPDU) in a WLAN system, the transmitting device comprising:
a memory;
a transceiver; and
a processor operably connected to the memory and the transceiver,
wherein the processor is configured:
to generate the EHT PPDU, the EHT PPDU including a legacy preamble and an EHT field; and
to transmit the EHT PPDU to a receiving device through a 320 MHz band based on a radio frequency (RF),
wherein the legacy preamble includes a legacy-short training field (L-STF) and a legacy-long training field (L-LTF),
the legacy preamble is generated by applying first phase rotation values,
the first phase rotation values are obtained based on by multiplying second phase rotation values by third phase rotation values,
the second phase rotation values are obtained by repeating phase rotation values defined for an 80 MHz band in an 802.11ax system 4 times, and
the third phase rotation values are phase rotation values additionally applied in units of 80 MHz to the second phase rotation value.

9. The transmitting device of claim 8, wherein the 320 MHz band is composed of subcarriers having subcarrier indexes of −512 to 511,
the second phase rotation values are [1 −1 −1 −1 1 −1 −1−1 1 −1 −1−1 1 −1 −1−1],
the first value "1" in the second phase rotation values is applied to subcarriers having subcarrier indexes of −512 to −449,
the second value "−1" in the second phase rotation value is applied to subcarriers having subcarrier indexes of −448 to −385,
the third value "−1" in the second phase rotation value is applied to subcarriers having subcarrier indexes of −384 to −321, the fourth value "−1" in the second phase rotation value is applied to subcarriers having subcarrier indexes of −320 to −257, the fifth value "1" in the second phase rotation values is applied to subcarriers having subcarrier indexes of −256 to −193, the sixth value "−1" in the second phase rotation value is applied to subcarriers having subcarrier indexes of −192 to −129, the seventh value "−1" in the second phase rotation value is applied to subcarriers having subcarrier indexes of −128 to −65, the eighth value "−1" in the second phase rotation value is applied to subcarriers having subcarrier indexes of −64 to −1, the ninth value "1" in the second phase rotation values is applied to subcarriers having subcarrier indexes of 0 to 63, the tenth value "−1" in the second phase rotation value is applied to subcarriers having subcarrier indexes of 64 to 127, the eleventh value "−1" in the second phase rotation value is applied to subcarriers having subcarrier indexes of 128 to 191, the twelfth value "−1" in the second phase rotation value is applied to subcarriers having subcarrier indexes of 192 to 255, the thirteenth value "1" in the second phase rotation values is applied to subcarriers having subcarrier indexes of 256 to 319, the fourteenth value "−1" in the second phase rotation value is applied to subcarriers having subcarrier indexes of 320 to 383, the fifteenth value "−1" in the second phase rotation value is applied to subcarriers having subcarrier indexes of 384 to 447, the sixteenth value "−1" in the second phase rotation value is applied to subcarriers having subcarrier indexes of 448 to 511, and the first phase rotation values are determined based a first optimum PAPR in the L-STF and the L-LTF, and a second optimum PAPR based on a maximum transmission bandwidth supported by the RF.

10. The transmitting device of claim 9, wherein the third phase rotation values are [1 −j −j 1], the first value "1" in the third phase rotation values is applied to a first 80 MHz band in the 320 MHz band, the second value "−j" in the third phase rotation values is applied to a second 80 MHz band in the 320 MHz band, the third value "−j" in the third phase rotation values is applied to a third 80 MHz band in the 320 MHz band, and the fourth value "1" in the third phase rotation values is applied to a fourth 80 MHz band in the 320 MHz band.

11. The transmitting device of claim 10, wherein the first phase rotation values are [1 −1 −1 −1 −j j j j −j j j j 1 −1 −1 −1].

12. The transmitting device of claim 9, wherein the third phase rotation values are [1 j j 1], the first value "1" in the third phase rotation values is applied to a first 80 MHz band in the 320 MHz band, the second value "j" in the third phase rotation values is applied to a second 80 MHz band in the 320 MHz band, the third value "j" in the third phase rotation values is applied to a third 80 MHz band in the 320 MHz band, and the fourth value "1" in the third phase rotation values is applied to a fourth 80 MHz band in the 320 MHz band.

13. The transmitting device of claim 12, wherein the first phase rotation values are [1 −1 −1 −1 j −j −j −j j j −j −j −j 1 −1 −1 −1].

14. The transmitting device of claim 8, wherein the maximum transmission bandwidth supported by RF is 80 MHz, 160 MHz, 240 MHz, or 320 MHz, an optimum PAPR obtained based on the maximum transmission bandwidth supported by RF is selected by comparing first to fourth PAPRs, the first PAPR is an optimum PAPR obtained when the maximum transmission bandwidth supported by RF is 80 MHz, the second PAPR is an optimum PAPR obtained when the maximum transmission bandwidth supported by RF is 160 MHz, the third PAPR is an optimum PAPR obtained when the maximum transmission bandwidth supported by RF is 240 MHz, and the fourth PAPR is an optimum PAPR obtained when the maximum transmission bandwidth supported by RF is 320 MHz.

15. A method for receiving an extreme high throughput (EHT) physical protocol data unit (PPDU) in a WLAN system, the method comprising:

receiving, by a receiving device, the EHT PPDU from a transmitting device through a 320 MHz band based on a radio frequency (RF), the EHT PPDU including a legacy preamble and an EHT field; and decoding, by the receiving device, the EHT PPDU, wherein the legacy preamble includes a legacy-short training field (L-STF) and a legacy-long training field (L-LTF), the legacy preamble is generated by applying first phase rotation values, the first phase rotation values are obtained based on by multiplying second phase rotation values by third phase rotation values, the second phase rotation values are obtained by repeating phase rotation values defined for an 80 MHz band in an 802.11ax system 4 times, and the third phase rotation values are phase rotation values additionally applied in units of 80 MHz to the second phase rotation value.

* * * * *